US012576457B2

(12) United States Patent
Brookhyser et al.

(10) Patent No.: US 12,576,457 B2
(45) Date of Patent: Mar. 17, 2026

(54) LASER-PROCESSING APPARATUS, METHODS OF OPERATING THE SAME, AND METHODS OF PROCESSING WORKPIECES USING THE SAME

(71) Applicant: ELECTRO SCIENTIFIC INDUSTRIES, INC., Beaverton, OR (US)

(72) Inventors: James Brookhyser, Lake Oswego, OR (US); Jered Richter, Beaverton, OR (US)

(73) Assignee: ELECTRO SCIENTIFIC INDUSTRIES, INC., Beaverton, OR (US)

( * ) Notice: Subject to any disclaimer, the term of this patent is extended or adjusted under 35 U.S.C. 154(b) by 660 days.

(21) Appl. No.: 17/276,736

(22) PCT Filed: Jan. 3, 2020

(86) PCT No.: PCT/US2020/012219
§ 371 (c)(1),
(2) Date: Mar. 16, 2021

(87) PCT Pub. No.: WO2020/159666
PCT Pub. Date: Aug. 6, 2020

(65) Prior Publication Data
US 2022/0048135 A1     Feb. 17, 2022

Related U.S. Application Data

(60) Provisional application No. 62/854,579, filed on May 30, 2019, provisional application No. 62/832,064, (Continued)

(51) Int. Cl.
*B23K 26/067* (2006.01)
*B23K 26/0622* (2014.01)
(Continued)

(52) U.S. Cl.
CPC ...... *B23K 26/0676* (2013.01); *B23K 26/0624* (2015.10); *B23K 26/0648* (2013.01); (Continued)

(58) Field of Classification Search
CPC ........... B23K 26/0676; B23K 26/0624; B23K 26/0648; B23K 26/0652; B23K 26/082; (Continued)

(56) References Cited

U.S. PATENT DOCUMENTS 3,609,009 A    9/1971 Lohman et al.
4,912,487 A    3/1990 Porter et al.
(Continued)

FOREIGN PATENT DOCUMENTS

CN    106773072 A   *   5/2017
DE    102013201968 B4    8/2014
(Continued)

OTHER PUBLICATIONS

Teboho Bell, Darryl Naidoo, Sandile Ngcobo, Andrew Forbes, "Thermal lensing measurement from the coefficient of defocus aberration using Shack-Hartmann wavefront sensor," Proc. SPIE 9727, Laser Resonators, Microresonators, and Beam Control XVIII, 97271L (Apr. 22, 2016); doi: 10.1117/12.2205141 (Year: 2016).*
(Continued)

*Primary Examiner* — Jimmy Chou
*Assistant Examiner* — Thao Uyen Tran-Le
(74) *Attorney, Agent, or Firm* — Laurin T. Buettner

(57) ABSTRACT

Numerous embodiments are disclosed. In one, a laser-processing apparatus includes a positioner arranged within a beam path along which a beam of laser energy is propagatable. A controller may be used to control an operation of the positioner to deflect the beam path within first and second primary angular ranges, and to deflect the beam path to a plurality of angles within each of the first and second (Continued)

primary angular ranges. In another, an integrated beam dump system includes a frame; and a pickoff mirror and beam dump coupled to the frame. In still another, a wavefront correction optic includes a mirror having a reflective surface having a shape characterized by a particular ratio of fringe Zernike terms Z4 and Z9. Many more embodiments are disclosed.

16 Claims, 18 Drawing Sheets

Related U.S. Application Data filed on Apr. 10, 2019, provisional application No. 62/799,218, filed on Jan. 31, 2019.

(51) Int. Cl.
| | |
|---|---|
| *B23K 26/064* | (2014.01) |
| *B23K 26/082* | (2014.01) |
| *B23K 26/70* | (2014.01) |

(52) U.S. Cl.
CPC ........ *B23K 26/0652* (2013.01); *B23K 26/082* (2015.10); *B23K 26/704* (2015.10)

(58) Field of Classification Search
CPC .............. B23K 26/704; B23K 26/0626; B23K 26/0861; B23K 26/067; B23K 26/38; G02B 3/00
See application file for complete search history.

(56) References Cited

U.S. PATENT DOCUMENTS

| | | | |
|---|---|---|---|
| 5,633,747 A | 5/1997 | Nikoonahad | |
| 5,638,267 A | 6/1997 | Singhose et al. | |
| 5,751,585 A | 5/1998 | Cutler et al. | |
| 5,793,735 A * | 8/1998 | Oono ................... | G11B 7/1369 |
| | | | 369/112.02 |
| 5,798,927 A | 8/1998 | Cutler et al. | |
| 5,847,960 A | 12/1998 | Cutler et al. | |
| 5,917,300 A | 6/1999 | Tanquary et al. | |
| 5,963,569 A | 10/1999 | Baumgart et al. | |
| 6,034,349 A | 3/2000 | Ota | |
| 6,052,189 A * | 4/2000 | Fuse ................... | G01B 11/0608 |
| | | | 356/615 |
| 6,052,216 A | 4/2000 | Rolfe et al. | |
| 6,314,463 B1 | 11/2001 | Abbott et al. | |
| 6,403,920 B1 | 6/2002 | Muneyuki et al. | |
| 6,430,465 B2 | 8/2002 | Cutler | |
| 6,437,850 B2 | 8/2002 | Vernackt et al. | |
| 6,521,866 B1 | 2/2003 | Arai et al. | |
| 6,600,600 B2 | 7/2003 | Chen | |
| 6,606,998 B1 | 8/2003 | Gold | |
| 6,606,999 B2 | 8/2003 | Crooks et al. | |
| 6,674,564 B2 | 1/2004 | Vernackt et al. | |
| 6,700,698 B1 * | 3/2004 | Scott ................... | H01S 3/2325 |
| | | | 359/347 |
| 6,816,294 B2 | 11/2004 | Unrath et al. | |
| 6,931,991 B1 * | 8/2005 | Cheng ...................... | B41C 1/05 |
| | | | 101/401.1 |
| 6,947,454 B2 | 9/2005 | Sun et al. | |
| 7,019,891 B2 | 3/2006 | Johnson | |
| 7,027,199 B2 | 4/2006 | Johnson | |
| 7,133,182 B2 | 11/2006 | Johnson et al. | |
| 7,133,186 B2 | 11/2006 | Johnson | |
| 7,133,187 B2 | 11/2006 | Johnson | |
| 7,133,188 B2 | 11/2006 | Johnson | |
| 7,176,409 B2 | 2/2007 | Gross et al. | |
| 7,244,906 B2 | 7/2007 | Jordens et al. | |
| 7,245,412 B2 | 7/2007 | Bruland et al. | |
| 7,259,354 B2 | 8/2007 | Pailthorp et al. | |
| 7,521,650 B2 | 4/2009 | Mori et al. | |
| 7,605,343 B2 | 10/2009 | Lei et al. | |
| 7,611,745 B2 | 11/2009 | Nishikawa et al. | |
| 7,821,698 B2 | 10/2010 | Zeng et al. | |
| 7,834,293 B2 | 11/2010 | Wile et al. | |
| 8,022,332 B2 * | 9/2011 | Eda ..................... | B23K 26/0665 |
| | | | 219/121.73 |
| 8,026,158 B2 | 9/2011 | Bruland et al. | |
| 8,076,605 B2 | 12/2011 | Bruland et al. | |
| 8,229,304 B1 * | 7/2012 | Pepper ................... | H04B 10/61 |
| | | | 398/209 |
| 8,288,679 B2 | 10/2012 | Unrath | |
| 8,404,998 B2 | 3/2013 | Unrath et al. | |
| 8,497,450 B2 | 7/2013 | Bruland et al. | |
| 8,648,277 B2 | 2/2014 | Alpay et al. | |
| 8,680,430 B2 | 3/2014 | Unrath | |
| 8,847,113 B2 | 9/2014 | Unrath et al. | |
| 8,896,909 B2 | 11/2014 | Sandstrom et al. | |
| 8,928,853 B2 | 1/2015 | Lin et al. | |
| 9,259,802 B2 | 2/2016 | Willey et al. | |
| 2003/0024912 A1 | 2/2003 | Gross et al. | |
| 2003/0047546 A1 | 3/2003 | Gross et al. | |
| 2003/0184887 A1 | 10/2003 | Greywall et al. | |
| 2005/0270631 A1 * | 12/2005 | Johnson ................. | H01S 3/117 |
| | | | 359/305 |
| 2007/0075059 A1 | 4/2007 | Arai | |
| 2008/0212185 A1 * | 9/2008 | Fuse ................. | G02B 19/0014 |
| | | | 359/558 |
| 2010/0301023 A1 | 12/2010 | Unrath et al. | |
| 2012/0044455 A1 * | 2/2012 | Hirose .............. | G01B 9/02091 |
| | | | 250/201.4 |
| 2013/0010349 A1 * | 1/2013 | Cordingley .............. | G02F 1/33 |
| | | | 359/305 |
| 2014/0026351 A1 | 1/2014 | Willey et al. | |
| 2014/0083983 A1 | 3/2014 | Zhang et al. | |
| 2014/0196140 A1 | 7/2014 | Gong | |
| 2014/0263201 A1 | 9/2014 | Unrath | |
| 2014/0263212 A1 | 9/2014 | Zhang | |
| 2014/0263223 A1 | 9/2014 | Unrath | |
| 2014/0312013 A1 | 10/2014 | Frankel et al. | |
| 2014/0334514 A1 * | 11/2014 | Tanino ................... | H01S 3/076 |
| | | | 372/55 |
| 2015/0116798 A1 * | 4/2015 | Smithwick .......... | G03H 1/2205 |
| | | | 359/9 |
| 2015/0211986 A1 * | 7/2015 | Kuang .................. | G01N 21/27 |
| | | | 356/369 |
| 2016/0250714 A1 * | 9/2016 | Zhang ............... | B23K 26/0608 |
| | | | 219/121.61 |
| 2018/0029164 A1 * | 2/2018 | Kramer ............... | B23K 26/705 |
| 2018/0136541 A1 * | 5/2018 | Rafac ....................... | G02F 1/33 |
| 2018/0156947 A1 | 6/2018 | Staver et al. | |

FOREIGN PATENT DOCUMENTS

| | | | | | |
|---|---|---|---|---|---|
| JP | 2003053576 A | | 2/2003 | | |
| JP | 3463281 B2 | | 11/2003 | | |
| JP | 2004167545 A | | 6/2004 | | |
| JP | 2004195495 A | | 7/2004 | | |
| JP | 2005021947 A | | 1/2005 | | |
| JP | 2006281268 A | | 10/2006 | | |
| JP | 3872462 B2 | | 1/2007 | | |
| JP | 3876237 B2 | | 1/2007 | | |
| JP | 2012121038 A | | 6/2014 | | |
| JP | 2015135711 A | * | 7/2015 | | |
| TW | 201733728 A | | 10/2017 | | |
| WO | WO2007/113567 A1 | | 10/2007 | | |
| WO | WO2009/087392 A1 | | 7/2009 | | |
| WO | 2017006306 A1 | | 1/2017 | | |
| WO | WO2017/044646 A1 | | 3/2017 | | |
| WO | 2018126078 A1 | | 7/2018 | | |
| WO | WO-2019010345 A1 * | | 1/2019 | ......... | B23K 26/0624 |
| WO | WO2019/060590 A1 | | 3/2019 | | |

OTHER PUBLICATIONS

Balakshy et al., "Compensation of thermal effects in acousto-optic deflector", Proceedings vol. 2713, Fifth International Conference on Industrial Lasers and Laser Applications '95; (1996) https://doi.org/10.1117/12.234185 (Year: 1996).*

(56)            References Cited

OTHER PUBLICATIONS

Mantsevich et al., "Examination of the Temperature Influence on the Acousto-Optic Filters Performance", ISSN 0030-400X, Optics and Spectroscopy, 2017, vol. 122, No. 4, pp. 675-681. © Pleiades Publishing, Ltd., 2017, DOI: 10.1134/S0030400X17040166 (Year: 2017).*

International search report issued to on Jun. 1, 2020, 5 pages.

PCT/US2020/012219, written opinion, 15 pages.

Office Action issued for CN counterpart application No. 202080005766.2 issued Dec. 5, 2023 (12 pages).

Office Action issued for TW counterpart application No. PCT/US2023/018408 dated Aug. 9, 2023 (19 pages).

Office Action issued for JP counterpart application No. 2021-542372 dispatched Oct. 31, 2023 (4 pages).

Office Action report issued in TW counterpart application No. 113117781 dated Aug. 19, 2024. (14 pages).

Office Action report issued in EP counterpart application No. 20748524.4 dated Jul. 24, 2024. (5 pages).

Office Action issued for CN counterpart application No. 202080005766.2 issued Feb. 24, 2024 (13 pages).

* cited by examiner

1000

1000

2000

2000

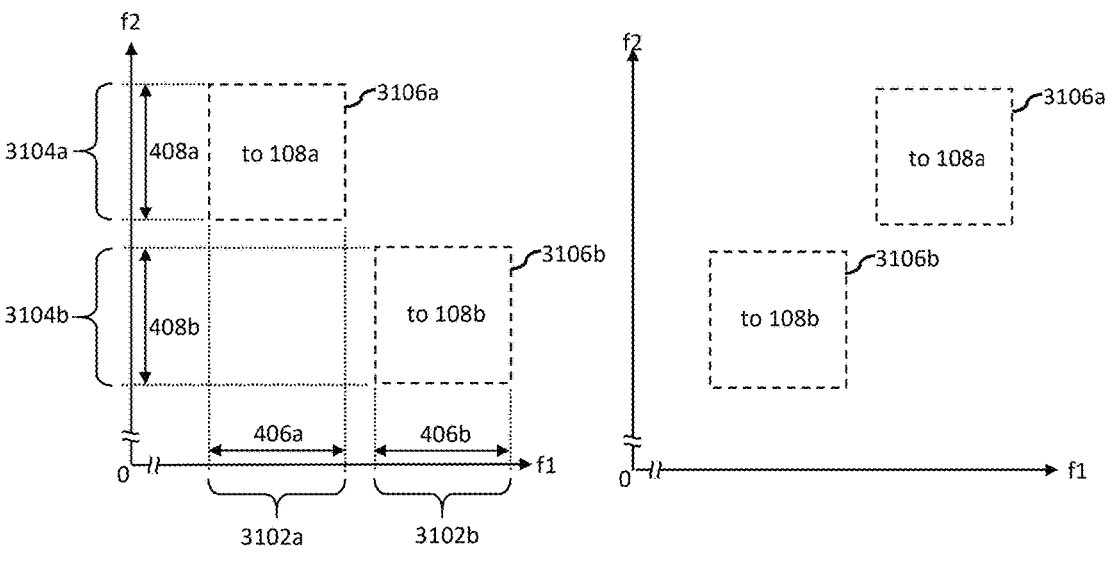
FIG. 31                    FIG. 32
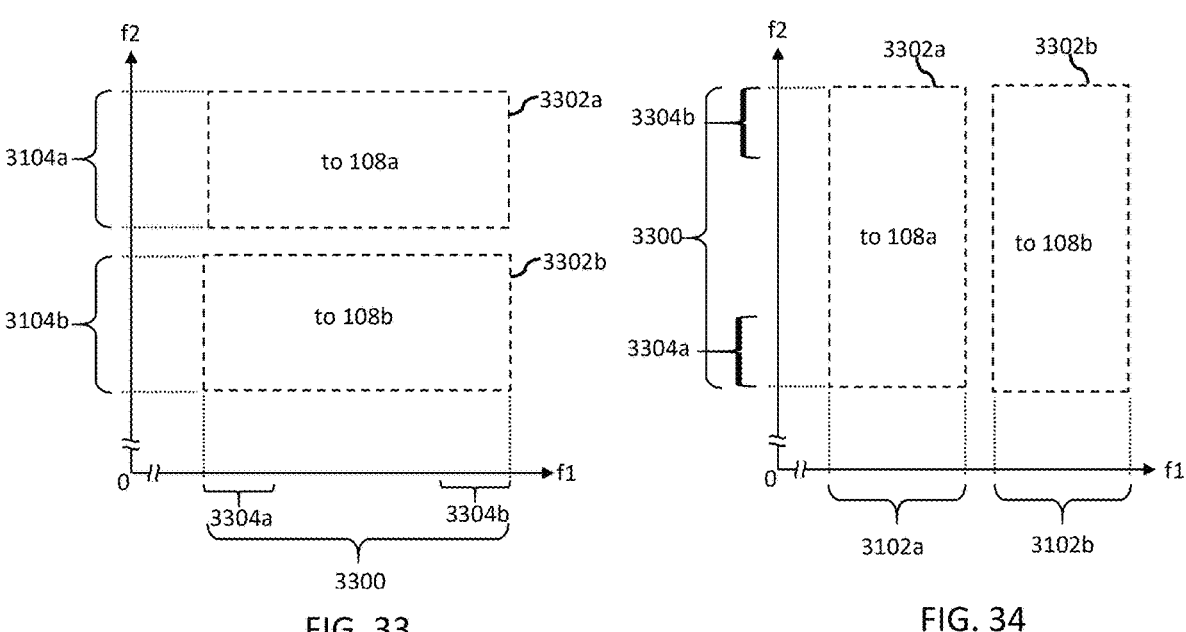
FIG. 33                    FIG. 34

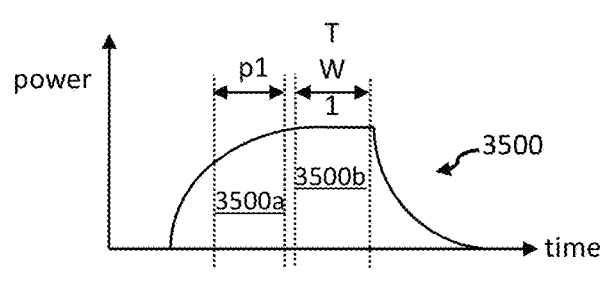
FIG. 35
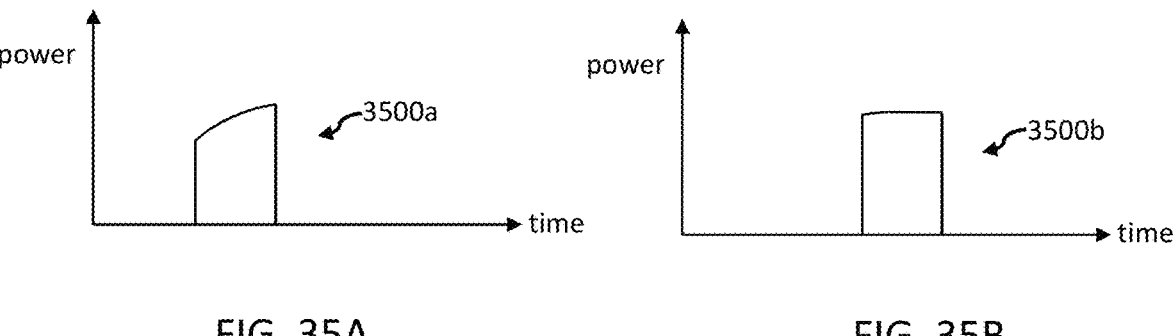
FIG. 35A                                        FIG. 35B
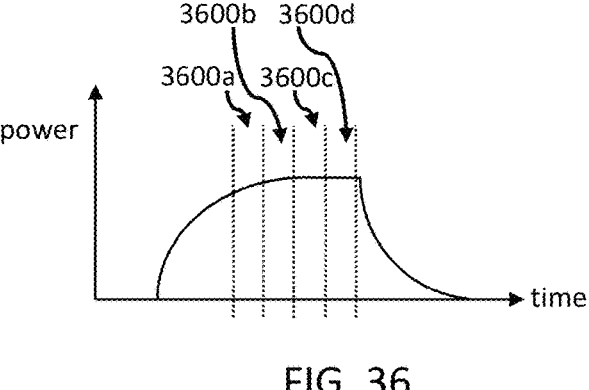
FIG. 36 slice period     time slice period     time slice period     time slice period     time slice period     time

LASER-PROCESSING APPARATUS, METHODS OF OPERATING THE SAME, AND METHODS OF PROCESSING WORKPIECES USING THE SAME

CROSS-REFERENCE TO RELATED APPLICATIONS

This application claims the benefit of U.S. Provisional Application No. 62/799,218, filed Jan. 31, 2019, U.S. Provisional Application No. 62/832,064, filed Apr. 10, 2019 and U.S. Provisional Application No. 62/854,579, filed May 30, 2019, each which is incorporated by reference in its entirety.

BACKGROUND

I. Technical Field

Embodiments described herein relate generally laser-processing apparatuses and components thereof and to techniques for operating the same.

II. Technical Background

Generally, laser-processing of a workpiece is accomplished by irradiating the workpiece with laser energy, to heat, melt, evaporate, ablate, crack, discolor, polish, roughen, carbonize, foam, or otherwise modify one or more properties or characteristics of one or more materials from which the workpiece is formed. For example, a workpiece such as a printed circuit board (PCB) can be subjected to laser-processing to form vias therein. In order to rapidly process workpieces, it can be desirable to generate laser energy using high-power laser sources, to rapidly change the location where the workpiece is irradiated with the laser energy, and to be able to rapidly change properties of the laser energy (e.g., in terms of pulse duration, pulse energy, pulse repetition rate, or the like), and the like. Furthermore, the wavelength of the laser energy used during laser-processing may be selected depending upon the type of workpiece to be processed. However, certain conventional components and techniques developed for laser-processing using laser energy of one particular wavelength range (e.g., wavelengths in the ultraviolet range of the electromagnetic spectrum) may not be appropriate to conduct the same laser-processing using laser energy of another particular wavelength range (e.g., wavelengths in the long wave infrared range of the electromagnetic spectrum). The embodiments discussed herein were developed in recognition of these and other problems discovered by the inventors.

SUMMARY

One embodiment of the present invention can be characterized as a laser-processing apparatus that includes a laser source operative to generate a beam of laser energy, wherein the beam of laser energy is propagatable along a beam path; a first positioner arranged within the beam path, wherein the first positioner is operative to deflect the beam path; and a controller coupled to the first positioner. The controller may be configured to control an operation of the first positioner to deflect the beam path within a first primary angular range and within a second primary angular range, wherein the second primary angular range does not overlap the first angular range and is not contiguous with the first primary angular range. The controller may further be configured to control an operation of the first positioner to deflect the beam path to a first plurality of angles within the first primary angular range and to a second plurality of angles within second primary angular range.

Another embodiment of the present invention can be characterized as an integrated beam dump system that includes a frame; a pickoff mirror coupled to the frame and configured reflect a beam of laser energy; and a beam dump coupled to the frame and configured to absorb the beam of laser energy.

Another embodiment of the present invention can be characterized as an integrated beam dump system that includes a frame having a first surface and at least one second surface. The first surface can be configured to reflect of a beam of laser energy, and the at least one second surface can be configured to absorb the beam of laser energy.

Another embodiment of the present invention can be characterized as a wavefront correction optic that includes a mirror having a reflective surface, wherein a shape of the reflective surface is characterized by fringe Zernike terms Z4 and Z9 and wherein a ratio of coefficients for the Z9 to Z4 terms is in a range from −0.1 to −0.3.

Another embodiment of the present invention can be characterized as a wavefront correction optic that includes a deformable mirror having a reflective surface; a body; and a pocket defined within the body. The body can include a deformable membrane region between the reflective surface and the pocket, and a central portion of the membrane region can have a first thickness and a peripheral portion of the membrane region has a second thickness greater than the first thickness.

Another embodiment of the present invention can be characterized as a wavefront correction optic that includes a deformable mirror having a reflective surface; a body including at least one rib; and a plurality of pockets defined within the body. The body can include a deformable membrane region between the reflective surface and the pocket, and the at least one rib can be interposed between the plurality of pockets.

Another embodiment of the present invention can be characterized as a wavefront correction optic system that includes a membrane-type deformable mirror having a pressurizable pocket; a pedestal coupled to the mirror and having a having at least one bore extending therethrough, wherein the at least one bore is in fluid communication with the pressurizable pocket; and a mount plate coupled to the pedestal and to an optical mount assembly.

Another embodiment of the present invention can be characterized as a system that includes a first optical component operative to transmit a beam of laser energy, wherein the first optical component is susceptible to thermal lensing; a wavefront compensation optic configured to correct wavefront aberrations in the beam of laser energy transmitted by the first optical component and attributable to the thermal lensing; and an optical relay system arranged and configured to relay an image of the first optical component at a first plane to a second plane. The wavefront compensation optic can be arranged at the second plane, and the first optical relay system can be configured such that a size of the image of the first optical component at the second plane is different from a size of the image of the first optical component at the first plane.

Another embodiment of the present invention can be characterized as a system that includes an acousto-optic deflector (AOD); a dispersion compensator including at least one selected from the group consisting of a prism and a grating; a first optical component optically coupled to the dispersion compensator at a location optically upstream of the dispersion compensator, the first optical component configured to magnify an incident beam of laser energy; and a second optical component optically coupled to the dispersion compensator and the AOD at a location optically between the dispersion compensator and the AOD, the second optical component configured to demagnify a beam of laser energy incident thereupon.

Another embodiment of the present invention can be characterized as a system that includes an acousto-optic deflector (AOD) operative to diffract an incident beam of laser energy and output the diffracted beam of laser energy along a beam path, wherein the AOD is operative to variably diffract the incident beam of laser energy to thereby deflect the beam path within a first angular range and within a second angular range; a first dispersion compensator including at least one selected from the group consisting of a prism and a grating, the first dispersion compensator optically coupled to the output of the AOD and arranged in the beam path deflected within the first angular range; and a second dispersion compensator including at least one selected from the group consisting of a prism and a grating, the second dispersion compensator optically coupled to the output of the AOD and arranged in the beam path deflected within the second angular range.

Another embodiment of the present invention can be characterized as a system that includes a laser source operative to generate a beam of laser energy, wherein the beam of laser energy is propagatable along a beam path; a positioner arranged within the beam path and operative to deflect the beam path, wherein the positioner includes a first acousto-optic deflector (AOD) and a second AOD optically coupled to an output of the first AOD; and a controller coupled to the positioner, wherein the controller is configured to operate the first AOD and the second AOD, during at least one slice period, to temporally-divide the beam of laser energy into at least one pulse slice.

BRIEF DESCRIPTION OF THE DRAWINGS

In FIG. 7, the u-, v- and w-axes are mutually orthogonal to one another.

In FIG. 10, the u-, v- and w-axes are mutually orthogonal to one another.

FIGS. 31, 32, 33 and 34 illustrates graphs showing exemplary frequency ranges by which the first and second AODs of the first positioner can be driven, according to some embodiments.

FIGS. 35, 35A, 35B, 36, 37, 38, 39, 40 and 41 schematically illustrate techniques for implementing pulse slicing, according to some embodiments.

DETAILED DESCRIPTION

Figure 1:
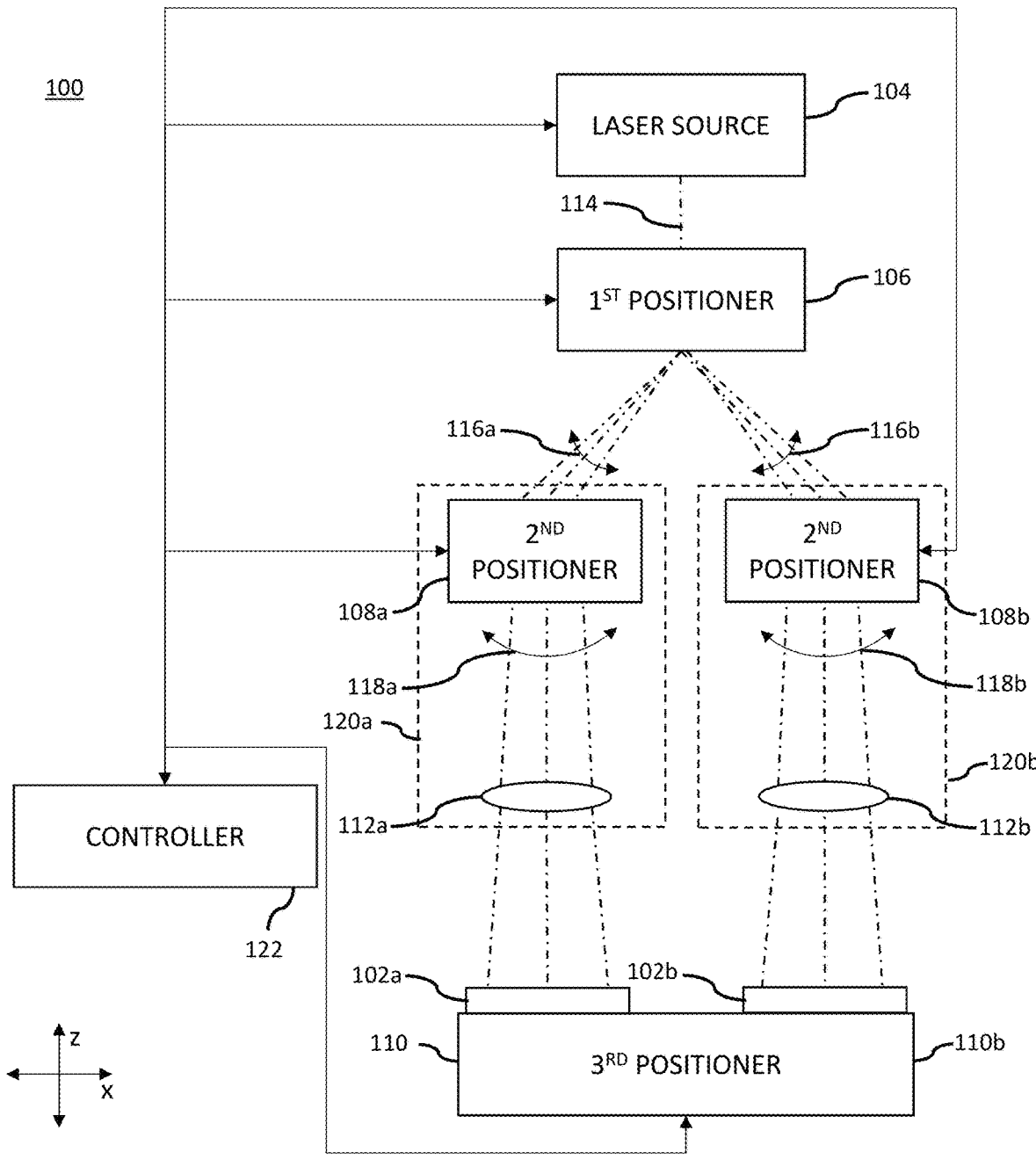
FIG. 1 schematically illustrates a multi-head laser-processing apparatus according to one embodiment.

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

The section headings used herein are for organizational purposes only and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

I. OVERVIEW

Embodiments described herein relate generally to methods and apparatuses for laser-processing (or, more simply, "processing") a workpiece. Generally the processing is accomplished, either in whole or in part, by irradiating the workpiece with laser radiation, to heat, melt, evaporate, ablate, crack, discolor, polish, roughen, carbonize, foam, or otherwise modify one or more properties or characteristics of one or more materials from which the workpiece is formed (e.g., in terms of chemical composition, atomic structure, ionic structure, molecular structure, electronic structure, microstructure, nanostructure, density, viscosity, index of refraction, magnetic permeability, relative permittivity, texture, color, hardness, transmissivity to electromagnetic radiation, or the like or any combination thereof). Materials to be processed may be present at an exterior of the workpiece prior to or during processing, or may be located completely within the workpiece (i.e., not present at an exterior of the workpiece) prior to or during processing.

Specific examples of processes that may be carried out by the disclosed apparatus for laser processing include via drilling or other hole formation, cutting, perforating, welding, scribing, engraving, marking (e.g., surface marking, sub-surface marking, etc.), laser-induced forward transfer, cleaning, bleaching, bright pixel repair (e.g., color filter darkening, modification of OLED material, etc.), decoating, surface texturing (e.g., roughening, smoothing, etc.), or the like or any combination thereof. Thus, one or more features on that may be formed on or within a workpiece, as a result of the processing, can include openings, slots, vias or other holes, grooves, trenches, scribe lines, kerfs, recessed regions, conductive traces, ohmic contacts, resist patterns, human- or machine-readable indicia (e.g., comprised of one or more regions in or on the workpiece having one or more visually or texturally distinguishing characteristics), or the like or any combination thereof. Features such as openings, slots, vias, holes, etc., can have any suitable or desirable shape (e.g., circular, elliptical, square, rectangular, triangular, annular, or the like or any combination thereof) when viewed from a top plan view. Further, features such as openings, slots, vias, holes, etc., can extend completely through the workpiece (e.g., so as to form so-called "through vias," "through holes," etc.) or only partially through the workpiece (e.g., so as to form so-called "blind vias," "blind holes," etc.).

Workpieces that may be processed can be generically characterized being formed of one or more metals, polymers, ceramics, composites, or any combination thereof (e.g., whether as an alloy, compound, mixture, solution, composite, etc.). Accordingly, materials that may be processed include one or more metals such as Al, Ag, Au, Cr, Cu, Fe, In, Mg, Mo, Ni, Pt, Sn, Ti, or the like, or any combination thereof (e.g., whether as an alloy, composite, etc.), conductive metal oxides (e.g., ITO, etc.), transparent conductive polymers, ceramics, waxes, resins, interlayer dielectric materials (e.g., silicon dioxide, silicon nitride, silicon oxynitride, etc., low-k dielectric materials such as methyl silsesquioxane (MSQ), hydrogen silsesquioxane (HSQ), fluorinated tetraethyl orthosilicate (FTEOS), or the like or any combination thereof), organic dielectric materials (e.g., SILK, benzocyclobutene, Nautilus, (all manufactured by Dow), polyfluorotetraethylene, (manufactured by DuPont), FLARE, (manufactured by Allied Chemical), etc., or the like or any combination thereof), semiconductor or optical device substrate materials (e.g., $Al_2O_3$, AlN, BeO, Cu, GaAS, GaN, Ge, InP, Si, $SiO_2$, SiC, $Si_{1-x}Ge_x$ (where $0.0001 < x < 0.9999$), or the like, or any combination or alloy thereof), glass (e.g., fused quartz, soda-lime-silica glass, sodium borosilicate glass, lead oxide glass, aluminosilicate glass, germanium oxide glass, aluminate glass, phosphate glass, borate glass, chalcogenide glass, amorphous metal, or the like or any combination thereof), sapphire, polymeric materials (e.g., polyamide, polyimide, polyester, polyethylene naphthalate (PEN), polyethylene terephthalate (PET), polyacetal, polycarbonate, modified polyphenylene ether, polybutylene terephthalate, polyphenylene sulfide, polyether sulfone, polyether imide, polyether ether ketone, liquid crystal polymer, acrylonitrile butadiene styrene, or any compound, composite or alloy thereof), leather, paper, build-up materials (e.g., AJINOMOTO Build-up Film, also known as "ABF", etc.), solder resist, or the like or any composite, laminate, or other combination thereof.

Specific examples of workpieces that may be processed include, panels of printed circuit boards (PCBs) (also referred to herein as "PCB panels"), PCBs, PCB laminates (e.g., FR4, High Tg Epoxy, BT, polyimide, or the like or any combination thereof), PCB laminate prepregs, substrate-like PCBs (SLPs), panels of flexible printed circuits (FPCs) (also referred to herein as "FPC panels"), FPCs, coverlay films, integrated circuits (ICs), IC substrates, IC packages (ICPs), light-emitting diodes (LEDs), LED packages, semiconductor wafers, electronic or optical device substrates, interposers, lead frames, lead frame blanks, display substrates (e.g., substrates having TFTs, color filters, organic LED (OLED) arrays, quantum dot LED arrays, or the like or any combination thereof, formed thereon), lenses, mirrors, turbine blades, powders, films, foils, plates, molds (e.g., wax molds, molds for injection-molding processes, investment-casting processes, etc.), fabrics (woven, felted, etc.), surgical instruments, medical implants, consumer packaged goods, shoes, bicycles, automobiles, automotive or aerospace parts (e.g., frames, body panels, etc.), appliances (e.g., microwaves, ovens, refrigerators, etc.), device housings (e.g., for watches, computers, smartphones, tablet computers, wearable electronic devices, or the like or any combination thereof).

II. SYSTEM—OVERVIEW

FIG. 1 schematically illustrates a laser-processing apparatus in accordance with one embodiment of the present invention.

Referring to the embodiment shown in FIG. 1, a laser-processing apparatus 100 (also referred to herein simply as an "apparatus") for processing workpieces 102a and 102b (each generically referred to as a "workpiece 102") can be characterized as including a laser source 104 for generating a beam of laser energy, a first positioner 106, a plurality of second positioners (e.g., second positioners 108a and 108b, each generically referred to as a "second positioner 108"), a third positioner 110 and a plurality of scan lenses (e.g., scan lens 112a and 112b, each generically referred to as a "scan lens 112"). Although FIG. 1 illustrates an embodiment in which the laser-processing apparatus 100 includes two second positioners 108, it will be appreciated that numerous embodiments disclosed herein can be applied to a laser-processing apparatus that includes only a single second positioner 108, or to more than two second positioners 108.

A scan lens 112 and a corresponding second positioner 108 can, optionally, be integrated into a common housing or "scan head." For example, scan lens 112a and a corresponding second positioner 108 (i.e., second positioner 108a) can be integrated into a common scan head 120a. Likewise, scan lens 112b and a corresponding second positioner 108 (i.e., second positioner 108b) can be integrated into a common scan head 120b. As used herein, each of scan head 120a and scan head 120b is also generically referred to herein as a "scan head 120."

Although FIG. 1 illustrates a single third positioner 110 commonly supporting a plurality of workpieces 102, it will be appreciated that a plurality of third positioners 110 can be provided (e.g., to each support a different workpiece 102, to support a common workpiece 102, or the like or any combination thereof). In view of the description that follows, however, it should be recognized that inclusion of any second positioner 108 or the third positioner 110 is optional if the function provided by any second positioner 108 or third positioner 110 is not required.

As discussed in greater detail below, the first positioner 106 is operative to diffract, reflect, refract, or otherwise deflect the beam of laser energy so as to deflect a beam path 114 to any of the second positioners 108. As used herein, the term "beam path" refers to the path along which laser energy in the beam of laser energy travels as it propagates from the laser source 104 to a scan lens 112. When deflecting the beam path 114 to the second positioner 108a, the beam path 114 can be deflected by any angle (e.g., as measured relative to the beam path 114 incident upon the first positioner 106) within a first range of angles (also referred to herein as a "first primary angular range 116a"). Likewise, when deflecting the beam path 114 to the second positioner 108b, the beam path 114 can be deflected by any angle (e.g., as measured relative to the beam path 114 incident upon the first positioner 106) within a second range of angles (also referred to herein as a "second primary angular range 116b"). As used herein, each of the first primary angular range 116a and the second primary angular range 116b can also generically referred to herein as a "primary angular range 116." Generally, the first primary angular range 116a does not overlap with, and is not contiguous with, the second primary angular range 116b. The first primary angular range 116a may be larger than, smaller than or equal to the second primary angular range 116b. As used herein, the act of deflecting the beam path 114 within one or more of the primary angular ranges 116 is referred to herein as "beam branching."

Each second positioner 108 is operative to diffract, reflect, refract, or the like, or any combination thereof, the beam of laser energy generated by the laser source 104 and deflected by the first positioner 106 (i.e., to "deflect" the beam of laser energy) so as to deflect the beam path 114 to a corresponding scan lens 112. For example, the second positioner 108a can deflect the beam path 114 to scan lens 112a. Likewise, the second positioner 108b can deflect the beam path 114 to scan lens 112b. When deflecting the beam path 114 to the scan lens 112a, the second positioner 108a can deflect the beam path 114 by any angle (e.g., as measured relative to the optical axis of the scan lens 112a) within a first range of angles (also referred to herein as a "first secondary angular range 118a"). Likewise, when deflecting the beam path 114 to the scan lens 112b, the second positioner 108b can deflect the beam path 114 by any angle (e.g., as measured relative to the optical axis of the scan lens 112b) within a second range of angles (also referred to herein as a "second secondary angular range 118b"). The first secondary angular range 118a may be larger than, smaller than or equal to the second secondary angular range 118b.

Laser energy deflected to a scan lens 112 is typically focused by the scan lens 112 and transmitted to propagate along a beam axis so as to be delivered to a workpiece 102. For example, laser energy deflected to scan lens 112a is delivered to workpiece 102a and laser energy transmitted deflected to scan lens 112b is delivered to workpiece 102b. Laser energy delivered to a workpiece 102 may be characterized as having a Gaussian-type spatial intensity profile or a non-Gaussian-type (i.e., "shaped") spatial intensity profile (e.g., a "top-hat" spatial intensity profile, a super-Gaussian spatial intensity profile, etc.).

Although FIG. 1 illustrates a plurality of workpieces 102, each of which arranged so as to be intersected by a different beam axis, it will be appreciated that a single, larger workpiece 102 can be processed by laser energy that has been delivered from multiple scan lenses. Further, although FIG. 1 illustrates a plurality of scan lenses 112, each of which is arranged so as to transmit laser energy propagating along a beam path that has been deflected by a different second positioner 108, it will be appreciated that the apparatus 100 can be configured (e.g., with a mirror, prism, beam splitter, or the like or any combination thereof) such that laser energy propagating along beam paths deflected by multiple second positioners 108 are transmitted by a common scan lens 112.

As used herein, the term "spot size" refers to the diameter or maximum spatial width of the beam of laser energy delivered at a location (also referred to as a "process spot," "spot location" or, more simply, a "spot") where the beam axis intersects a region of the workpiece 102 that is to be, at least partially, processed by the delivered beam of laser energy. For purposes of discussion herein, spot size is measured as a radial or transverse distance from the beam axis to where the optical intensity drops to, at least, $1/e^2$ of the optical intensity at the beam axis. Generally, the spot size of the beam of laser energy will be at a minimum at the beam waist. Once delivered to the workpiece 102, laser energy within the beam can be characterized as impinging the workpiece 102 at a spot size in a range from 2 μm to 200 μm. It will be appreciated, however, that the spot size can be made smaller than 2 μm or larger than 200 μm. Thus, the beam of laser energy delivered to the workpiece 102 can have a spot size greater than, less than, or equal to 2 μm, 3 μm, 5 μm, 7 μm, 10 μm, 15 μm, 30 μm, 35 μm, 40 μm, 45 μm, 50 μm, 55 μm, 80 μm, 100 μm, 150 μm, 200 μm, etc., or between any of these values.

The apparatus 100 may also include one or more other optical components (e.g., beam traps, beam expanders, beam shapers, beam splitters, apertures, filters, collimators, lenses, mirrors, prisms, polarizers, phase retarders, diffractive optical elements (commonly known in the art as DOEs), refractive optical elements (commonly known in the art as ROEs), or the like or any combination thereof) to focus, expand, collimate, shape, polarize, filter, split, combine, crop, absorb, or otherwise modify, condition, direct, etc., the beam of laser energy as it propagates along beam path 114. To the extent that optical components such as beam expanders, lenses, beam splitters, prisms, dichroic filters, windows, waveplates, DOEs, ROEs, etc., are formed of bulk transparent materials (which may, optionally, be coated one or more anti-reflection coatings, or the like) intended to transmit an incident beam of laser energy, such optical components are generically referred to herein as "transmissive optical components." As used herein, the collection of positioners and other optical components can, when assembled together into the laser-processing apparatus 100, be considered to constitute a "beam path assembly."

A. Laser Source

In one embodiment, the laser source 104 is operative to generate laser pulses. As such, the laser source 104 may include a pulse laser source, a CW laser source, a QCW laser source, a burst mode laser, or the like or any combination thereof. In the event that the laser source 104 includes a QCW or CW laser source, the laser source 104 may be operated in a pulsed mode, or may be operated in a non-pulsed mode but further include a pulse gating unit (e.g., an acousto-optic (AO) modulator (AOM), a beam chopper, etc.) to temporally modulate beam of laser radiation output from the QCW or CW laser source. Although not illustrated, the apparatus 100 may optionally include one or more harmonic generation crystals (also known as "wavelength conversion crystals") configured to convert a wavelength of light output by the laser source 104. In another embodiment, however, the laser source 104 may be provided as a QCW laser source or a CW laser source and not include a pulse gating unit. Thus, the laser source 104 can be broadly characterized as operative to generate a beam of laser energy, which may manifested as a series of laser pulses or as a continuous or quasi-continuous laser beam, which can thereafter be propagated along the beam path 114. Although many embodiments discussed herein make reference to laser pulses, it should be recognized that continuous or quasi-continuous beams may alternatively, or additionally, be employed whenever appropriate or desired.

Laser energy output by the laser source 104 can have one or more wavelengths in the ultraviolet (UV), visible or infrared (IR) range of the electromagnetic spectrum. Laser energy in the UV range of the electromagnetic spectrum may have one or more wavelengths in a range from 10 nm (or thereabout) to 385 nm (or thereabout), such as 100 nm, 121 nm, 124 nm, 157 nm, 200 nm, 334 nm, 337 nm, 351 nm, 380 nm, etc., or between any of these values. Laser energy in the visible, green range of the electromagnetic spectrum may have one or more wavelengths in a range from 500 nm (or thereabout) to 560 nm (or thereabout), such as 511 nm, 515 nm, 530 nm, 532 nm, 543 nm, 568 nm, etc., or between any of these values. Laser energy in the IR range of the electromagnetic spectrum may have one or more wavelengths in a range from 750 nm (or thereabout) to 15 μm (or thereabout), such as 600 nm to 1000 nm, 752.5 nm, 780 nm to 1060 nm, 799.3 nm, 980 nm, 1047 nm, 1053 nm, 1060 nm, 1064 nm, 1080 nm, 1090 nm, 1152 nm, 1150 nm to 1350 nm, 1540 nm, 2.6 μm to 4 μm, 4.8 μm to 8.3 μm, 9.4 μm, 10.6 μm, etc., or between any of these values.

When the beam of laser energy is manifested as a series of laser pulses, the laser pulses output by the laser source 104 can have a pulse width or pulse duration (i.e., based on the full-width at half-maximum (FWHM) of the optical power in the pulse versus time) that is in a range from 10 fs to 900 ms. It will be appreciated, however, that the pulse duration can be made smaller than 10 fs or larger than 900 ms. Thus, at least one laser pulse output by the laser source 104 can have a pulse duration less than, greater than or equal to 10 fs, 15 fs, 30 fs, 50 fs, 100 fs, 150 fs, 200 fs, 300 fs, 500 fs, 600 fs, 750 fs, 800 fs, 850 fs, 900 fs, 950 fs, 1 ps, 2 ps, 3 ps, 4 ps, 5 ps, 7 ps, 10 ps, 15 ps, 25 ps, 50 ps, 75 ps, 100 ps, 200 ps, 500 ps, 1 ns, 1.5 ns, 2 ns, 5 ns, 10 ns, 20 ns, 50 ns, 100 ns, 200 ns, 400 ns, 800 ns, 1000 ns, 2 μs, 5 μs, 10 μs, 15 μs, 20 μs, 25 μs, 30 μs, 40 μs, 50 μs, 100 μs, 300 μs, 500 μs, 900 μs, 1 ms, 2 ms, 5 ms, 10 ms, 20 ms, 50 ms, 100 ms, 300 ms, 500 ms, 900 ms, 1 s, etc., or between any of these values.

Laser pulses output by the laser source 104 can have an average power in a range from 5 mW to 50 kW. It will be appreciated, however, that the average power can be made smaller than 5 mW or larger than 50 kW. Thus, laser pulses output by the laser source 104 can have an average power less than, greater than or equal to 5 mW, 10 mW, 15 mW, 20 mW, 25 mW, 50 mW, 75 mW, 100 mW, 300 mW, 500 mW, 800 mW, 1 W, 2 W, 3 W, 4 W, 5 W, 6 W, 7 W, 10 W, 15 W, 18 W, 25 W, 30 W, 50 W, 60 W, 100 W, 150 W, 200 W, 250 W, 500 W, 2 kW, 3 kW, 20 kW, 50 kW, etc., or between any of these values.

Laser pulses can be output by the laser source 104 at a pulse repetition rate in a range from 5 kHz to 5 GHz. It will be appreciated, however, that the pulse repetition rate can be less than 5 kHz or larger than 5 GHz. Thus, laser pulses can be output by the laser source 104 at a pulse repetition rate less than, greater than or equal to 5 kHz, 50 kHz, 100 kHz, 175 kHz, 225 kHz, 250 kHz, 275 kHz, 500 kHz, 800 kHz, 900 kHz, 1 MHz, 1.5 MHz, 1.8 MHz, 1.9 MHz, 2 MHz, 2.5 MHz, 3 MHz, 4 MHz, 5 MHz, 10 MHz, 20 MHz, 50 MHz, 60 MHz, 100 MHz, 150 MHz, 200 MHz, 250 MHz, 300 MHz, 350 MHz, 500 MHz, 550 MHz, 600 MHz, 900 MHz, 2 GHz, 10 GHz, etc., or between any of these values.

In addition to wavelength, average power and, when the beam of laser energy is manifested as a series of laser pulses, pulse duration and pulse repetition rate, the beam of laser energy delivered to the workpiece 102 can be characterized by one or more other characteristics such as pulse energy, peak power, etc., which can be selected (e.g., optionally based on one or more other characteristics such as wavelength, pulse duration, average power and pulse repetition rate, etc.) to irradiate the workpiece 102 at the process spot at an optical intensity (measured in W/cm²), fluence (measured in J/cm²), etc., sufficient to process the workpiece 102 (e.g., to form one or more features).

Examples of types of lasers that the laser source 104 may be characterized as gas lasers (e.g., carbon dioxide lasers, carbon monoxide lasers, excimer lasers, etc.), solid-state lasers (e.g., Nd:YAG lasers, etc.), rod lasers, fiber lasers, photonic crystal rod/fiber lasers, passively mode-locked solid-state bulk or fiber lasers, dye lasers, mode-locked diode lasers, pulsed lasers (e.g., ms-, ns-, ps-, fs-pulsed lasers), CW lasers, QCW lasers, or the like or any combination thereof. Depending upon their configuration, gas lasers (e.g., carbon dioxide lasers, etc.) may be configured to operate in one or more modes (e.g., in CW mode, QCW mode, pulsed mode, or any combination thereof). Specific examples of laser sources that may be provided as the laser source 104 include one or more laser sources such as: the BOREAS, HEGOA, SIROCCO or CHINOOK series of lasers manufactured by EOLITE; the PYROFLEX series of lasers manufactured by PYROPHOTONICS; the PALADIN Advanced 355, DIAMOND series (e.g., DIAMOND E, G, J-2, J-3, J-5 series), the FLARE NX, MATRIX QS DPSS, MEPHISTO Q, AVIA LX, AVIA NX, RAPID NX, HYPER-RAPID NX, RAPID, HELIOS, FIDELITY, MONACO, OPERA, or RAPID FX series of lasers manufactured by COHERENT; the ASCEND, EXCELSIOR, EXPLORER, HIPPO, NAVIGATOR, QUANTA-RAY, QUASAR, SPIRIT, TALON, or VGEN series of lasers manufactured by SPECTRA PHYSICS; the PULSTAR- or FIRESTAR-series lasers manufactured by SYNRAD; the TRUFLOW-series of lasers (e.g., TRUFLOW 2000, 2600, 3000, 3200, 3600, 4000, 5000, 6000, 6000, 8000, 10000, 12000, 15000, 20000), TRUCOAX series of lasers (e.g., TRUCOAX 1000) or the TRUDISK, TRUPULSE, TRUDIODE, TRUFIBER, or TRUMICRO series of lasers, all manufactured by TRUMPF; the FCPA μJEWEL or FEMTOLITE series of lasers manufactured by IMRA AMERICA; the TANGER-INE and SATSUMA series lasers (and MIKAN and T-PULSE series oscillators) manufactured by AMPLITUDE SYSTEMES; CL, CLPF, CLPN, CLPNT, CLT, ELM, ELPF, ELPN, ELPP, ELR, ELS, FLPN, FLPNT, FLT, GLPF, GLPN, GLR, HLPN, HLPP, RFL, TLM, TLPN, TLR, ULPN, ULR, VLM, VLPN, YLM, YLPF, YLPN, YLPP, YLR, YLS, FLPM, FLPMT, DLM, BLM, or DLR series of lasers manufactured by IPG PHOTONICS (e.g., including the GPLN-100-M, GPLN-500-QCW, GPLN-500-M, GPLN-500-R, GPLN-2000-S, etc.), or the like or any combination thereof.

B. First Positioner

Generally, the first positioner 106 is operative to impart movement of the beam axis relative to the workpiece 102 along the X-axis (or direction), a Y-axis (or direction), or a combination thereof (e.g., by deflecting of the beam path 114 within the first primary angular range 116a, within the second primary angular range 116b, or a combination thereof). Although not illustrated, the Y-axis (or Y-direction) will be understood to refer to an axis (or direction) that is orthogonal to the illustrated X- and Z-axes (or directions).

In one embodiment, the operation of the first positioner 106 can be controlled to deflect the beam path 114 to the second positioner 108a (e.g., during a first branch period) and then to deflect the beam path 114 to the second positioner 108b (e.g., during a second branch period following the first branch period), or vice-versa or any combination thereof. In another example, the operation of the first positioner 106 can be controlled to simultaneously deflect the beam path 114 to the second positioner 108a and the second positioner 108b. In the embodiments discussed herein, the duration of the first branch period may be greater than, less than, or equal to the duration of the second branch period. The duration of each of the first branch period and the second branch period can be greater than, equal to or less than the positioning period of the first positioner 106. In one embodiment, the duration of each of the first branch period and the second branch period can be characterized as an integer multiple of the positioning period of the first positioner 106 (where the integer can be any integer such as 1, 2, 3, 4, 5, 10, 20, 50, 100, etc., or between any of these values). See this section below for a further discussion regarding the "positioning period" of the first positioner 106. In some embodiments, the duration of each branch period, is greater than, equal to or less than 200 μs, 125 μs, 100 μs, 50 μs, 33 μs, 25 μs, 20 μs, 13.3 μs, 12.5 μs, 10 μs, 4 μs, 2 μs, 1.3 μs, 1 μs, 0.2 μs, 0.1 μs, 0.05 μs, 0.025 μs, 0.02 μs, 0.013 μs, 0.01 μs, 0.008 μs, 0.0067 μs, 0.0057 μs, 0.0044 μs, 0.004 μs, etc., or between any of these values.

When the beam of laser energy output by the laser source 104 is manifested as a series of laser pulses, each branch period may have a duration greater than or equal to the pulse duration of laser pulses within the beam of laser energy. In another embodiment, however, one or more branch periods may have a duration that is less than the pulse duration of laser pulses within the beam of laser energy. In such an embodiment, the act of beam branching can result in temporally-dividing a laser pulse and, so, can also be referred to as "pulse slicing." Pulse slicing will be described in greater detail below, and can be implemented in conjunction with beam branching, or can be implemented separately from beam branching. That is, pulse slicing can be effected while operating the first positioner 106 to deflect the beam path 114 by different angles within a single primary angular range 116 (e.g., within the first primary angular range 116a or within the second primary angular range 116b). Thus, pulse slicing can be implemented in conjunction with beam branching, or can be implemented separately from beam branching, and the period during which a laser pulse is temporally-divided can be generically referred to as a "slice period." Although the pulse slicing techniques are described herein as being applied to temporally-divide a laser pulse, it will be appreciated that these techniques can likewise be applied to temporally-divide a beam of laser energy manifested as a continuous or quasi-continuous laser beam.

Movement of the beam axis relative to the workpiece 102, as imparted by the first positioner 106, is generally limited such that the process spot can be scanned, moved or otherwise positioned within a first scan field projected by a scan lens 112. Generally, and depending upon one or more factors such as the configuration of the first positioner 106, the location of the first positioner 106 along the beam path 114, the beam size of the beam of laser energy incident upon the first positioner 106, the spot size, etc., the first scan field may extend, in any of the X- or Y-directions, to a distance that is less than, greater than or equal to 0.01 mm, 0.04 mm, 0.1 mm, 0.5 mm, 1.0 mm, 1.4 mm, 1.5 mm, 1.8 mm, 2 mm, 2.5 mm, 3.0 mm, 3.5 mm, 4.0 mm, 4.2 mm, 5 mm, 10 mm, 25 mm, 50 mm, 60 mm, etc., or between any of these values. As used herein, the term "beam size" refers to the diameter or width of the beam of laser energy, and can be measured as a radial or transverse distance from the beam axis to where the optical intensity drops to $1/e^2$ of the optical intensity at the axis of propagation along the beam path 114. A maximum dimension of the first scan field (e.g., in the X- or Y-directions, or otherwise) may be greater than, equal to or less than a maximum dimension (as measured in the X-Y plane) of a feature (e.g., an opening, a recess, a via, a trench, etc.) to be formed in the workpiece 102.

Generally, the first positioner 106 can be provided as a galvanometer mirror system, an AO deflector (AOD) system, an electro-optic (EO) deflector (EOD) system, a fast-steering mirror (FSM) system, or the like or any combination thereof. AODs of AOD systems generally include an AO cell formed of a material such as crystalline germanium (Ge), gallium arsenide (GaAs), wulfenite (PbMoO$_4$), tellurium dioxide (TeO$_2$), crystalline quartz, glassy SiO$_2$, arsenic trisulfide (As$_2$S$_3$), lithium niobate (LiNbO$_3$), or the like or any combination thereof. EODs of EOD systems generally include an EO cell formed of lithium niobate, potassium tantalite niobate, etc. To the extent that AO cells and EO cells are configured to transmit an incident beam of laser energy, the AO and EO cells can be considered to be types of transmissive optical components.

The first positioner 106 can be characterized as having a "first positioning rate," which refers to the rate with which the first positioner 106 positions the process spot at any location within the first scan field (thus moving the beam axis). For example, the first positioning rate can be greater than, equal to or less than 8 kHz, 10 kHz, 20 kHz, 30 kHz, 40 kHz, 50 kHz, 75 kHz, 80 kHz, 100 kHz, 250 kHz, 500 kHz, 750 kHz, 1 MHz, 5 MHz, 10 MHz, 20 MHz, 40 MHz, 50 MHz, 75 MHz, 100 MHz, 125 MHz, 150 MHz, 175 MHz, 200 MHz, 225 MHz, 250 MHz, etc., or between any of these values. This range is also referred to herein as the first positioning bandwidth. During operation of the first positioner 106, drive signals can be repeatedly applied to the first positioner 106, and the first positioning bandwidth corresponds (e.g., is equal to, or at least substantially equal to) the rate with which the drive signals are applied. The rate with which the drive signals are applied is also referred to as the "update rate" or "refresh rate." The inverse of the first positioning rate is herein referred to as the "first positioning period," and thus refers to the minimum amount of time that elapses before the position of the process spot is changed from one location within the first scan field to another location within the first scan field. Thus, the first positioner 106 can be characterized as having a first positioning period that is greater than, equal to or less than 200 µs, 125 µs, 100 µs, 50 µs, 33 µs, 25 µs, 20 µs, 15 µs, 13.3 µs, 12.5 µs, 10 µs, 4 µs, 2 µs, 1.3 µs, 1 µs, 0.2 µs, 0.1 µs, 0.05 µs, 0.025 µs, 0.02 µs, 0.013 µs, 0.01 µs, 0.008 µs, 0.0067 µs, 0.0057 µs, 0.0044 µs, 0.004 µs, etc., or between any of these values.

i. Embodiments Concerning AOD Systems as the First Positioner, Generally

In one embodiment, the first positioner 106 is provided as an AOD system including at least one (e.g., one, two, three, four, five, six, etc.) single-element AOD, at least one (e.g., one, two, three, four, five, six, etc.) multi-element AOD, or the like or any combination thereof. An AOD system including only one AOD is herein referred to as a "single-cell AOD system," and an AOD system including more than one AOD is herein referred to as a "multi-cell AOD system." As used herein, a "single-element" AOD refers to an AOD having only one ultrasonic transducer element acoustically coupled to the AO cell, whereas a "multi-element" AOD includes at least two ultrasonic transducer elements acoustically coupled to a common AO cell. The AOD system may be provided as single-axis AOD system (e.g., operative to deflect the beam axis along a single axis) or as a multi-axis AOD system (e.g., operative to deflect the beam axis along one or more axes, such as along the X-axis, along the Y-axis, or any combination thereof) by deflecting the beam path 114 in a corresponding manner. Generally, a multi-axis AOD system can be provided as a single- or multi-cell AOD system. A multi-cell, multi-axis AOD system typically includes multiple AODs, each operative to deflect the beam axis along a different axis. For example, a multi-cell, multi-axis system can include a first AOD (e.g., a single- or multi-element AOD system) operative to deflect the beam axis along one axis (e.g., along the X-axis), and a second AOD (e.g., a single- or multi-element AOD) operative to deflect the beam axis along a second axis (e.g., along the Y-axis). A single-cell, multi-axis system typically includes a single AOD operative to deflect the beam axis along two axes (e.g., along the X- and Y-axes). For example, a single-cell, multi-axis system can include at least two ultrasonic transducer elements acoustically coupled to orthogonally-arranged planes, facets, sides, etc., of a common AO cell.

As will be recognized by those of ordinary skill, AO technologies (e.g., AODs, AOMs, etc.) utilize diffraction effects caused by one or more acoustic waves propagating through the AO cell (i.e., along a "diffraction axis" of the AOD) to diffract an incident optical wave (i.e., a beam of laser energy, in the context of the present application) contemporaneously propagating through the AO cell (i.e., along an "optical axis" within the AOD). Diffracting the incident beam of laser energy produces a diffraction pattern that typically includes zeroth- and first-order diffraction peaks, and may also include other higher-order diffraction peaks (e.g., second-order, third-order, etc.). As is known in the art, the portion of the diffracted beam of laser energy in the zeroth-order diffraction peak is referred to as a "zeroth-order" beam, the portion of the diffracted beam of laser energy in the first-order diffraction peak is referred to as a "first-order" beam, and so on. Generally, the zeroth-order beam and other diffracted-order beams (e.g., the first-order beam, etc.) propagate along different beam paths upon exiting the AO cell (e.g., through an optical output side of the AO cell). For example, the zeroth-order beam propagates along a zeroth-order beam path, the first-order beam propagates along a first-order beam path, and so on.

Acoustic waves are typically launched into the AO cell by applying an RF drive signal (e.g., from one or more drivers of the first positioner 106) to the ultrasonic transducer element. Thus, the AOD system can be driven by applying an RF drive signal to one or more ultrasonic transducer elements of the AOD system. Characteristics of the RF drive signal (e.g., amplitude, frequency, phase, etc.) can be controlled (e.g., based on one or more control signals output by the controller 122, a component-specific controller, or the like or any combination thereof) to adjust the manner with which the incident optical wave is diffracted. For example, the frequency of the applied RF drive signal will determine the angle to which the beam path 114 is deflected. As is known in the art, the angle, Θ, by which the beam path 114 is deflected is can be calculated as follows:

$$\theta = \frac{\lambda \cdot f}{v}$$

where λ is the optical wavelength of beam of laser energy, f is the frequency of the applied RF drive signal, and v is the velocity of the acoustic wave in the AO cell. If the frequency of the applied RF drive signal is composed of multiple frequencies, then the beam path 114 will be deflected simultaneously by multiple angles.

The first-order beam path exiting the AO cell can typically be regarded as the beam path 114 that has been rotated or deflected within the AO cell. Unless otherwise expressly stated herein, the beam path 114 exiting the AO cell corresponds to the first-order beam path. The axis (also referred to herein as the "rotation axis") about which the beam path 114 exiting the AO cell is rotated (e.g., relative to the beam path 114 as it is incident upon the AO cell) is orthogonal to both the diffraction axis of the AO cell and the optical axis along which the incident beam of laser energy propagates within the AO cell when the AOD is operated or driven to diffract the incident beam of laser energy. The AOD thus deflects an incident beam path 114 within a plane (also referred to herein as a "plane of deflection") that contains (or is otherwise generally parallel to) the diffraction axis of the AO cell and the optical axis within the AO cell. The spatial extent across which an AOD can deflect the beam path 114 within the plane of deflection is herein referred to as the "scan field" of that AOD. Accordingly, the first scan field of the first positioner 106 can be considered to correspond to the scan field of a single AOD (e.g., in the event the first positioner 106 includes a single AOD) or to correspond to combined scan fields of multiple AODs (e.g., in the event the first positioner 106 includes multiple AODs).

It will be appreciated that the material from which the AO cell is formed will depend upon the wavelength of the laser energy that propagates along the beam path 114 so as to be incident upon the AO cell. For example, a material such as crystalline germanium can be used where the wavelength of laser energy to be deflected is in a range from 2 μm (or thereabout) to 20 μm (or thereabout), materials such as gallium arsenide and arsenic trisulfide can be used where the wavelength of the beam of laser energy to be deflected is in a range from 1 μm (or thereabout) to 11 μm (or thereabout), and materials such as glassy $SiO_2$, quartz, lithium niobate, wulfenite, and tellurium dioxide can be used where the wavelength of laser energy to be deflected is in a range from 200 nm (or thereabout) to 5 μm (or thereabout).

C. Second Positioner

Generally, the second positioner 108 is operative to impart movement of the beam axis relative to the workpiece 102 along the X-axis (or direction), the Y-axis (or direction), or a combination thereof (e.g., by deflecting the beam path 114 within the first secondary angular range 118a or within the second secondary angular range 118b).

Movement of the beam axis relative to the workpiece 102, as imparted by the second positioner 108, is generally limited such that the process spot can be scanned, moved or otherwise positioned within a second scan field projected by a scan lens 112. Generally, and depending upon one or more factors such as the configuration of the second positioner 108, the location of the second positioner 108 along the beam path 114, the beam size of the beam of laser energy incident upon the second positioner 108, the spot size, etc., the second scan field may extend, in any of the X- or Y-directions to a distance that is greater than a corresponding distance of the first scan field. In view of the above, the second scan field may extend, in any of the X- or Y-directions, to a distance that is less than, greater than or equal to 1 mm, 25 mm, 50 mm, 75 mm, 100 mm, 250 mm, 500 mm, 750 mm, 1 cm, 25 cm, 50 cm, 75 cm, 1 m, 1.25 m, 1.5 m, etc., or between any of these values. A maximum dimension of the second scan field (e.g., in the X- or Y-directions, or otherwise) may be greater than, equal to or less than a maximum dimension (as measured in the X-Y plane) of a feature (e.g., an opening, a recess, a via, a trench, a scribe line, a conductive trace, etc.) to be formed in the workpiece 102.

In view of the configuration described herein, it should be recognized that movement of the beam axis imparted by the first positioner 106 can be superimposed by movement of the beam axis imparted by the second positioner 108. Thus, the second positioner 108 is operative to scan the first scan field within the second scan field.

Generally, the positioning rate with which the second positioner 108 is capable of positioning the process spot at any location within the second scan field (thus moving the beam axis within the second scan field and/or scanning the first scan field within the second scan field) spans a range (also referred to herein as the "second positioning bandwidth") that is less than the first positioning bandwidth. In one embodiment, the second positioning bandwidth is in a range from 500 Hz (or thereabout) to 8 kHz (or thereabout). For example, the second positioning bandwidth can be greater than, equal to or less than 500 Hz, 750 Hz, 1 kHz, 1.25 kHz, 1.5 kHz, 1.75 kHz, 2 kHz, 2.5 kHz, 3 kHz, 3.5 kHz, 4 kHz, 4.5 kHz, 5 kHz, 5.5 kHz, 6 kHz, 6.5 kHz, 7 kHz, 7.5 kHz, 8 kHz, etc., or between any of these values.

In one embodiment, the second positioner 108 can be provided as a galvanometer mirror system including two galvanometer mirror components, i.e., a first galvanometer mirror component (e.g., an X-axis galvanometer mirror component) arranged to impart movement of the beam axis relative to the workpiece 102 along the X-axis and a second galvanometer mirror component (e.g., a Y-axis galvanometer mirror component) arranged to impart movement of the beam axis relative to the workpiece 102 along the Y-axis. In another embodiment, however, the second positioner 108 may be provided as a galvanometer mirror system including only a single galvanometer mirror component arranged to impart movement of the beam axis relative to the workpiece 102 along the X- and Y-axes. In yet other embodiments, the second positioner 108 may be provided as a rotating polygon mirror system, etc. It will thus be appreciated that, depending on the specific configuration of the second positioner 108 and the first positioner 106, the second positioning bandwidth may be greater than or equal to the first positioning bandwidth.

D. Third Positioner

The third positioner 110 is operative to impart movement of a workpiece 102 (e.g., workpieces 102a and 102b) relative to the scan lens 112, and, consequently, impart movement of the workpiece 102 relative to the beam axis. Movement of a workpiece 102 relative to the beam axis is generally limited such that the process spot can be scanned, moved or otherwise positioned within a third scan field. Depending upon one or more factors such as the configuration of the third positioner 110, the third scan field may extend, in the X-direction, the Y-direction, or any combination thereof, to a distance that is greater than or equal to a corresponding distance of the second scan field. Generally, however, a maximum dimension of the third scan field (e.g., in the X- or Y-directions, or otherwise) will be greater than or equal to a corresponding maximum dimension (as measured in the X-Y plane) of any feature to be formed in the workpiece 102. Optionally, the third positioner 110 may be operative to move the workpiece 102 relative to the beam axis within a scan field that extends in the Z-direction (e.g., over a range between 1 mm and 50 mm). Thus, the third scan field may extend along the X-, Y- and/or Z-directions.

In view of the configuration described herein, it should be recognized that movement of the process spot relative to the workpiece 102 (e.g., as imparted by the first positioner 106 and/or the second positioner 108) can be superimposed by movement of the workpiece 102 as imparted by the third positioner 110. Thus, the third positioner 110 is operative to scan the first scan field and/or second scan field within the third scan field. Generally, the positioning rate with which the third positioner 110 is capable of positioning the workpiece 102 at any location within the third scan field (thus moving the workpiece 102, scanning the first scan field within the third scan field, and/or scanning the second scan field within the third scan field) spans a range (also referred to herein as the "third positioning bandwidth") that is less than the second positioning bandwidth. In one embodiment, the third positioning bandwidth is less than 500 Hz (or thereabout). For example, the third positioning bandwidth can be equal to or less than 500 Hz, 250 Hz, 150 Hz, 100 Hz, 75 Hz, 50 Hz, 25 Hz, 10 Hz, 7.5 Hz, 5 Hz, 2.5 Hz, 2 Hz, 1.5 Hz, 1 Hz, etc., or between any of these values.

In one embodiment, the third positioner 110 is provided as one or more linear stages (e.g., each capable of imparting translational movement to the workpiece 102 along the X-, Y- and/or Z-directions), one or more rotational stages (e.g., each capable of imparting rotational movement to the workpiece 102 about an axis parallel to the X-, Y- and/or Z-directions), or the like or any combination thereof. In one embodiment, the third positioner 110 includes an X-stage for moving the workpiece 102 along the X-direction, and a Y-stage supported by the X-stage (and, thus, moveable along the X-direction by the X-stage) for moving the workpiece 102 along the Y-direction.

Although not shown, the apparatus 100 may, optionally, include a fixture (e.g., a chuck) coupled to a stage of the third positioner 110. The fixture can include a support region and A workpiece 102 can be mechanically clamped, fixed, held, secured to the fixture or be otherwise supported by the fixture within the support region. In one embodiment, a workpiece 102 can be clamped, fixed, held, secured or be otherwise supported so as to directly contact a main, typically flat, support surface of the fixture. In another embodiment, a workpiece 102 can be clamped, fixed, held, secured or be otherwise supported so as to be spaced apart from the support surface of the fixture. In one embodiment, a workpiece 102 can be fixed, held, or secured by way of a force (e.g., an electrostatic force, a vacuum force, a magnetic force) selectively applied to the workpiece 102 from the fixture, or otherwise present between the workpiece 102 and the fixture.

As described thus far, the apparatus 100 could employ a so-called "stacked" positioning system as the third positioner 110, which enables the workpiece 102 to be moved while positions of other components such as the first positioner 106, second positioner 108, scan lens 112, etc., are kept stationary within the apparatus 100 (e.g., via one or more supports, frames, etc., as is known in the art) relative to the workpiece 102. In another embodiment, the third positioner 110 may be arranged and operative to move one or more components such as the first positioner 106, second positioner 108, scan lens 112, or the like or any combination thereof, and the workpiece 102 may be kept stationary.

In yet another embodiment, the third positioner 110 can be provided as a so-called "split-axis" positioning system in which one or more components such as the first positioner 106, second positioner 108, scan lens 112, or the like or any combination thereof, are carried by one or more linear or rotational stages (e.g., mounted on a frame, gantry, etc.) and the workpiece 102 is carried by one or more other linear or rotational stages. In such an embodiment, the third positioner 110 includes one or more linear or rotational stages arranged and operative to move one or more components such as the scan head (e.g., including the second positioner 108 and scan lens 112) and one or more linear or rotational stages arranged and operative to move the workpiece 102. For example, the third positioner 110 may include a Y-stage for imparting movement of the workpiece 102 along the Y-direction and an X-stage for imparting movement of the scan head along the X-direction. Some examples of split-axis positioning systems that may be beneficially or advantageously employed in the apparatus 100 include any of those disclosed in U.S. Pat. Nos. 5,751,585, 5,798,927, 5,847,960, 6,606,999, 7,605,343, 8,680,430, 8,847,113, or in U.S. Patent App. Pub. No. 2014/0083983, or any combination thereof, each of which is incorporated herein by reference in its entirety.

In one embodiment in which the third positioner 110 includes a Z-stage, the Z-stage may be arranged and configured to move the workpiece 102 along the Z-direction. In this case, the Z-stage may be carried by one or more of the other aforementioned stages for moving or positioning the workpiece 102, may carry one or more of the other aforementioned stages for moving or positioning the workpiece 102, or any combination thereof. In another embodiment in which the third positioner 110 includes a Z-stage, the Z-stage may be arranged and configured to move the scan head along the Z-direction. Thus, in the case where the third positioner 110 is provided as a split-stage positioning system, the Z-stage may carry, or be carried by, the X-stage. Moving the workpiece 102 or the scan head along the Z-direction can result in a change in spot size at the workpiece 102.

In still another embodiment, one or more components such as the first positioner 106, second positioner 108, scan lens 112, etc., may be carried by an articulated, multi-axis robotic arm (e.g., a 2-, 3-, 4-, 5-, or 6-axis arm). In such an embodiment, the second positioner 108 and/or scan lens 112 may, optionally, be carried by an end effector of the robotic arm. In yet another embodiment, the workpiece 102 may be carried directly on an end effector of an articulated, multi-axis robotic arm (i.e., without the third positioner 110). In still another embodiment, the third positioner 110 may be carried on an end effector of an articulated, multi-axis robotic arm.

D. Scan Lens

The scan lens 112 (e.g., provided as either a simple lens, or a compound lens) is generally configured to focus the beam of laser energy directed along the beam path, typically so as to produce a beam waist that can be positioned at or near the desired process spot. The scan lens 112 may be provided as an non-telecentric f-theta lens (as shown), a telecentric f-theta lens, an axicon lens (in which case, a series of beam waists are produced, yielding a plurality of process spots displaced from one another along the beam axis), or the like or any combination thereof.

In one embodiment, the scan lens 112 is provided as a fixed-focal length lens and is coupled to a scan lens positioner (e.g., a lens actuator, not shown) operative to move the scan lens 112 (e.g., so as to change the position of the beam waist along the beam axis). For example, the lens actuator may be provided as a voice coil operative to linearly translate the scan lens 112 along the Z-direction. In this case, the scan lens 112 may be formed of a material such as fused silica, optical glass, zinc selenide, zinc sulfide, germanium, gallium arsenide, magnesium fluoride, etc. In another embodiment, the scan lens 112 is provided as a variable-focal length lens (e.g., a zoom lens, or a so-called "liquid lens" incorporating technologies currently offered by COGNEX, VARIOPTIC, etc.) capable of being actuated (e.g., via a lens actuator) to change the position of the beam waist along the beam axis. Changing the position of the beam waist along the beam axis can result in a change in spot size at the workpiece 102.

In an embodiment in which the apparatus 100 includes a lens actuator, the lens actuator may be coupled to the scan lens 112 (e.g., so as to enable movement of the scan lens 112 within the scan head, relative to the second positioner 108). Alternatively, the lens actuator may be coupled to the scan head 120 (e.g., so as to enable movement of the scan head itself, in which case the scan lens 112 and the second positioner 108 would move together). In another embodiment, the scan lens 112 and the second positioner 108 are integrated into different housings (e.g., such that the housing in which the scan lens 112 is integrated is movable relative to the housing in which the second positioner 108 is integrated).

F. Controller

Generally, the apparatus 100 includes one or more controllers, such as controller 122, to control, or facilitate control of, the operation of the apparatus 100. In one embodiment, the controller 122 is communicatively coupled (e.g., over one or more wired or wireless, serial or parallel, communications links, such as USB, RS-232, Ethernet, Firewire, Wi-Fi, RFID, NFC, Bluetooth, Li-Fi, SERCOS, MARCO, EtherCAT, or the like or any combination thereof) to one or more components of the apparatus 100, such as the laser source 104, the first positioner 106, the second positioner 108, third positioner 110, the lens actuator, the scan lens 112 (when provided as a variable-focal length lens), the fixture, etc., which are thus operative in response to one or more control signals output by the controller 122.

For example, the controller 122 may control an operation of the first positioner 106, the second positioners 108, or the third positioner 110, or any combination thereof, to impart relative movement between the beam axis and the workpiece so as to cause relative movement between the process spot and the workpiece 102 along a path or trajectory (also referred to herein as a "process trajectory") within the workpiece 102. It will be appreciated that any two of these positioners, or all three of these positioners, may be controlled such that two positioners (e.g., the first positioner 106 and the second positioner 108, the first positioner 106 and the third positioner 110, or the second positioner 108 and the third positioner 110), or all three positioners simultaneously impart relative movement between the process spot and the workpiece 102 (thereby imparting a "compound relative movement" between the beam axis and the workpiece). Of course, at any time, it is possible to control only one positioner (e.g., the first positioner 106, the second positioner 108 or the third positioner 110) to impart relative movement between the process spot and the workpiece 102 (thereby imparting a "non-compound relative movement" between the beam axis and the workpiece).

In one embodiment, the controller 122 may control an operation of the first positioner 106 to deflect the beam path 114 within each primary angular range 116 in a manner that imparts compound relative movement (e.g., in coordination with a corresponding second positioner 108, in coordination with the third positioner 110, or any combination thereof) or non-compound relative movement between the beam axis and each workpiece 102 so as to cause relative movement between the process spot and the workpiece 102 along a process trajectory within the workpiece 102. For example, the operation of the first positioner 106 can be controlled to deflect the beam path 114 within the first primary angular range 116a in a manner that imparts compound relative movement (e.g., in coordination with corresponding second positioner 108a, in coordination with the third positioner 110, or any combination thereof) or non-compound relative movement between the beam axis and the workpiece 102a so as to cause relative movement between the process spot and the workpiece 102a along a first process trajectory within the workpiece 102a. Likewise, the operation of the first positioner 106 can be controlled to deflect the beam path 114 within the second primary angular range 116b in a manner that imparts compound relative movement (e.g., in coordination with corresponding second positioner 108b, in coordination with the third positioner 110, or any combination thereof) or non-compound relative movement between the beam axis and the workpiece 102b so as to cause relative movement between the process spot and the workpiece 102b along a second process trajectory within the workpiece 102b. The first process trajectory may be the same as, or different from, the second process trajectory.

In another embodiment, the controller 122 may control an operation of the first positioner 106 to deflect the beam path 114 within each primary angular range 116 in a manner that compensates for tracking errors introduced by any corresponding second positioner 108. For example, the operation of the first positioner 106 can be controlled to deflect the beam path 114 within the first primary angular range 116a in a manner that compensates for tracking errors introduced by corresponding second positioner 108a. Likewise, the operation of the first positioner 106 can be controlled to deflect the beam path 114 within the second primary angular range 116b in a manner that compensates for tracking errors introduced by corresponding second positioner 108b.

Some other examples of operations that one or more of the aforementioned components can be controlled to perform include any operations, functions, processes, and methods, etc., as disclosed in aforementioned U.S. Pat. Nos. 5,751, 585, 5,847,960, 6,606,999, 8,680,430, 8,847,113, or as disclosed in U.S. Pat. Nos. 4,912,487, 5,633,747, 5,638,267, 5,917,300, 6,314,463, 6,430,465, 6,600,600, 6,606,998, 6,816,294, 6,947,454, 7,019,891, 7,027,199, 7,133,182, 7,133,186, 7,133,187, 7,133,188, 7,244,906, 7,245,412, 7,259,354, 7,611,745, 7,834,293, 8,026,158, 8,076,605, 8,288,679, 8,404,998, 8,497,450, 8,648,277, 8,896,909, 8,928,853, 9,259,802, or in U.S. Patent App. Pub. Nos. 2014/0026351, 2014/0196140, 2014/0263201, 2014/0263212, 2014/0263223, 2014/0312013, or in German Patent No. DE102013201968B4, or in International Patent Pub. No. WO2009/087392, or any combination thereof, each of which is incorporated herein by reference in its entirety. In another example, the controller 122 may control an operation of any positioner that includes one or more AODs (e.g., in some embodiments, the first positioner 106, the second positioner 108, or a combination thereof) to change the spot shape or spot size of the beam of laser energy delivered to the process spot (e.g., by chirping an RF signal applied to one or more ultrasonic transducer elements of the one or more AODs, by applying a spectrally-shaped RF signal to one or more ultrasonic transducer elements of the one or more AODs, or the like or any combination thereof) as, for example, disclosed in International Patent Pub. No. WO2017/044646A1, which is incorporated herein by reference in its entirety. The applied RF signal may be chirped linearly, or non-linearly, in any desired or suitable manner. For example, the applied RF signal may be chirped at a first rate and then at a second rate to diffract a beam of laser energy transiting the AO cell in two different manners. In this case, the first rate may be slower than or faster than the second rate.

Generally, the controller 122 includes one or more processors operative to generate the aforementioned control signals upon executing instructions. A processor can be provided as a programmable processor (e.g., including one or more general purpose computer processors, microprocessors, digital signal processors, or the like or any combination thereof) operative to execute the instructions. Instructions executable by the processor(s) may be implemented software, firmware, etc., or in any suitable form of circuitry including programmable logic devices (PLDs), field-programmable gate arrays (FPGAs), field-programmable object arrays (FPOAs), application-specific integrated circuits (ASICs)—including digital, analog and mixed analog/digital circuitry—or the like, or any combination thereof. Execution of instructions can be performed on one processor, distributed among processors, made parallel across processors within a device or across a network of devices, or the like or any combination thereof.

In one embodiment, the controller 122 includes tangible media such as computer memory, which is accessible (e.g., via one or more wired or wireless communications links) by the processor. As used herein, "computer memory" includes magnetic media (e.g., magnetic tape, hard disk drive, etc.), optical discs, volatile or non-volatile semiconductor memory (e.g., RAM, ROM, NAND-type flash memory, NOR-type flash memory, SONOS memory, etc.), etc., and may be accessed locally, remotely (e.g., across a network), or a combination thereof. Generally, the instructions may be stored as computer software (e.g., executable code, files, instructions, etc., library files, etc.), which can be readily authored by artisans, from the descriptions provided herein, e.g., written in C, C++, Visual Basic, Java, Python, Tel, Perl, Scheme, Ruby, assembly language, hardware description language (e.g., VHDL, VERILOG, etc.), etc. Computer software is commonly stored in one or more data structures conveyed by computer memory.

Although not shown, one or more drivers (e.g., RF drivers, servo drivers, line drivers, power sources, etc.) can be communicatively coupled to an input of one or more components such as the laser source 104, the first positioner 106, the second positioner 108, the third positioner 110, the lens actuator, the scan lens 112 (when provided as a variable-focal length lens), the fixture, etc., for controlling such components. Accordingly, one or more components such as the laser source 104, the first positioner 106, the second positioner 108, the third positioner 110, the lens actuator, the scan lens 112 (when provided as a variable-focal length lens), the fixture, etc., can be considered to also include any suitable driver, as is known in the art. Each of such drivers would typically include an input communicatively coupled to the controller 122 and the controller 122 is operative to generate one or more control signals (e.g., trigger signals, etc.), which can be transmitted to the input(s) of one or more drivers associated with one or more components of the apparatus 100. Components such as the laser source 104, first positioner 106, second positioner 108, third positioner 110, lens actuator, the scan lens 112 (when provided as a variable-focal length lens), fixture, etc., are thus responsive to control signals generated by the controller 122.

Although not shown, one or more additional controllers (e.g., component-specific controllers) may, optionally, be communicatively coupled to an input of a driver communicatively coupled to a component (and thus associated with the component) such as the laser source 104, the first positioner 106, the second positioner 108, the third positioner 110, the lens actuator, the scan lens 112 (when provided as a variable-focal length lens), the fixture, etc. In this embodiment, each component-specific controller can be communicatively coupled to the controller 122 and be operative to generate, in response to one or more control signals received from the controller 122, one or more control signals (e.g., trigger signals, etc.), which can then be transmitted to the input(s) of the driver(s) to which it is communicatively coupled. In this embodiment, a component-specific controller may be operative as similarly described with respect to the controller 122.

In another embodiment in which one or more component-specific controllers are provided, the component-specific controller associated with one component (e.g., the laser source 104) can be communicatively coupled to the component-specific controller associated with one component (e.g., the first positioner 106, etc.). In this embodiment, one or more of the component-specific controllers can be operative to generate one or more control signals (e.g., trigger signals, etc.) in response to one or more control signals received from one or more other component-specific controllers.

III. EXAMPLE EMBODIMENTS CONCERNING THE FIRST POSITIONER

A. Embodiments Concerning AOD Systems

Figures 2, 3:
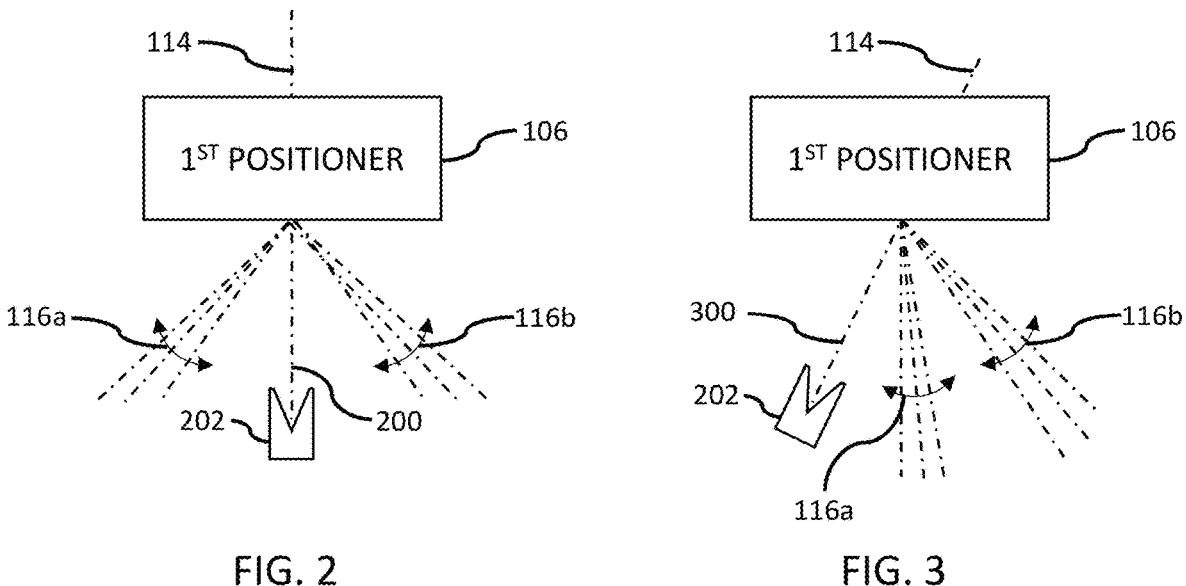
FIGS. 2 and 3 schematically illustrate beam path deflection schemes that can be implemented using the first positioner, according to some embodiments.

Referring to FIG. 2, when the first positioner 106 is provided as an AOD system (e.g., as discussed above), the first positioner 106 can be operated to implement a beam path deflection scheme in which the zeroth-order beam path 200 is located between the first primary angular range 116a and the second primary angular range 116b. In this deflection scheme, the first positioner 106 can be operated or driven (e.g., in response to an applied RF drive signal having a particular frequency) to deflect the beam path 114 within the first primary angular range 116a or the second primary angular range 116b by reversing the phase of the applied RF drive signal. In the illustrated embodiment, a beam trap 202 is arranged so as to absorb laser energy propagating along beam path 200.

Referring to FIG. 3, when the first positioner 106 is provided as an AOD system (e.g., as discussed above), the first positioner 106 can be operated to implement a beam path deflection scheme in which the zeroth-order beam path 300 is not located between the first primary angular range 116a and the second primary angular range 116b. In this deflection scheme, the first positioner 106 can be operated or driven (e.g., in response to an applied RF drive signal having a particular frequency) to deflect the incident beam path 114 within the first primary angular range 116a or the second primary angular range 116b by changing the frequency of the applied RF drive signal and without reversing the phase of the applied RF drive signal. In the illustrated embodiment, the beam trap 202 is arranged so as to absorb laser energy propagating along beam path 300.

In any of the embodiments discussed above with respect to FIGS. 2 and 3, the first positioner 106 may be provided as a single-axis AOD system or as multi-axis AOD system. Depending upon the construction of the AOD within any AOD system (e.g., as discussed above), the AOD can be characterized as a longitudinal-mode AOD or as a shear-mode AOD and be operative to diffract a beam of laser energy that is linearly polarized or circularly polarized. Thus depending upon the wavelength of the beam of laser energy and upon the material from which the AO cell of any AOD in the AOD system is formed, any AOD therein can be oriented such that the diffraction axis of the AO cell in the AOD is parallel or perpendicular to (or at least substantially parallel or perpendicular to) the plane of polarization of the beam of laser energy that is incident thereto. For example, if the wavelength of the beam of laser energy is in the ultraviolet or visible green ranges of the electromagnetic spectrum and the AO cell of an AOD is formed of a material such as quartz, then the AOD can be oriented such that the diffraction axis of the AO cell is perpendicular to (or at least substantially perpendicular to) the plane of polarization of the beam of laser energy that is incident thereto. In another example, if the wavelength of the beam of laser energy is in the so-called mid- or long-wavelength infrared ranges of the electromagnetic spectrum (i.e., wavelengths spanning a range from 3 μm (or thereabout) to 15 μm (or thereabout)) and the AO cell of an AOD is formed of a material such as crystalline germanium, then the AOD can be oriented such that the diffraction axis of the AO cell is parallel to (or at least substantially parallel to) the plane of polarization of the beam of laser energy that is incident thereto.

Figure 4:
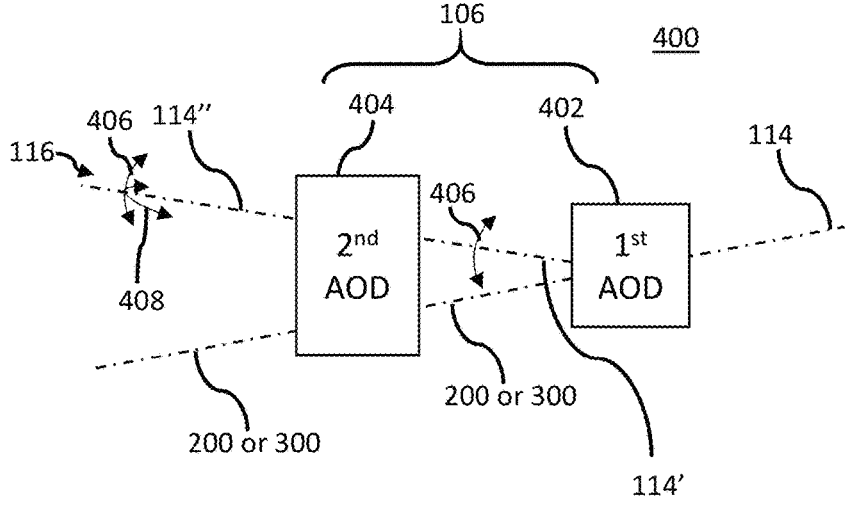
FIG. 4 schematically illustrates a multi-axis AOD system that may be incorporated into the first positioner, according to one embodiment.

With reference to FIG. 4, the multi-axis AOD system may be provided as a multi-cell, multi-axis AOD system 400 that includes a first AOD 402 and a second AOD 404. Both the first AOD 402 and the second AOD 404 may be provided in any manner as described above. The first AOD 402 is arranged and operative to rotate an incident beam of laser energy (e.g., propagating along beam path 114) about a first rotation axis by any angle (e.g., as measured relative to the beam path 114 incident upon the first AOD 402) within a first range of angles (also referred to herein as a "first AOD angular range 406"), so as to transmit a first-order beam propagating along a deflected beam path 114'. Likewise, the second AOD 404 is arranged and operative to rotate an incident beam of laser energy transmitted by the first AOD 402 (which may be a zeroth-order beam, a first-order beam, or the like or any combination thereof) about a second rotation axis by any angle (e.g., as measured relative to the beam path 114' incident upon the second AOD 404) within a second range of angles (also referred to herein as a "second AOD angular range 408"), so as to transmit a first-order beam propagating along a deflected beam path 114". As will be appreciated, each of the beam path 114' and beam path 114" represent specific instances of a path along which the beam of laser energy can propagate; therefore, each of the beam path 114' and beam path 114" can also be generically referred to herein as "beam path 114."

Generally, the second AOD 404 is oriented relative to the first AOD 402 such that the second rotation axis is different from the first rotation axis. For example, the second rotation axis can be orthogonal to, or oblique relative to, the first rotation axis. In another embodiment, however, the second AOD 404 is oriented relative to the first AOD 402 such that the second rotation axis is parallel to (or at least substantially parallel to) the first rotation axis. In this case, one or more optical components can be arranged in the beam path 114' to rotate the plane of deflection of the first AOD 402 (e.g., by 90 degrees, or thereabout) such that the plane of deflection of the first AOD 402, when projected onto the second AOD 404, is rotated (e.g., by 90 degrees, or thereabout) relative to the orientation of the plane of deflection of the second AOD 404. See, e.g., Int'l. Pub. No. WO 2019/060590 A1 for examples of how the plane of deflection may be rotated as discussed above.

Generally, the AO cells in the first AOD 402 is formed of a material that can be either the same as, or different from the AO cell in the second AOD 404. Further, the type of acoustic wave the first AOD 402 uses (i.e., shear-mode or longitudinal-mode) to deflect an incident beam of laser energy can be either same as, or different the type of acoustic wave the second AOD 404 uses to deflect an incident beam of laser energy.

It will be appreciated that the AOD system 400 can be operated at any time such that only the first AOD 402 generates a first-order beam, only the second AOD 404 generates a first-order beam, or both the first AOD 402 and the second AOD 404 generates a first-order beam. Accordingly, the deflection of the beam path 114 produced by the first positioner 106 can be considered to result from only the deflection obtained from beam path 114', from only the deflection obtained from beam path 114" or from the superposition of the deflections obtained from beam paths 114' and 114". Likewise, the primary angular range 116 can be considered to be only the first AOD angular range 406, only the second AOD angular range 408 or a superposition of the first AOD angular range 406 and the second AOD angular range 408. Lastly, the primary angular range 116 illustrated in FIG. 4, can be any of first primary angular range 116a or the second primary angular range 116b shown in any of FIG. 2 or 3.

In the embodiment illustrated in FIG. 4, the zeroth-order beam exiting the first AOD 402 is transmitted into the second AOD 404, and the zeroth-order beam transmitted by the second AOD 404 can be absorbed by a beam trap (not shown). Nevertheless, in another embodiment, the zeroth-order beam transmitted by the first AOD 402 can be intercepted (e.g., by a beam trap or mirror, not shown, interposed between the first AOD 402 and the second AOD 404) to prevent laser energy propagating from the first AOD 402 along the zeroth-order beam path from being transmitted into the second AOD 404. Intercepting the zeroth-order beam as described above can be desirable if the first AOD 402 has a relatively high diffraction efficiency and can be kept on for the full duration of a laser pulse. However, keeping the first AOD 402 on for the full pulse duration can increase the average thermal load on the first AOD 402 and the second AOD 404 since the thermal load on the two AODs are often relatively equal so the second AOD 404 can compensate for the first AOD 402. The increased thermal load the AODs can cause potentially-undesirable beam distortion (e.g., due to thermal lensing).

Notwithstanding the above, transmitting the zeroth-order beam into the second AOD 404 can sometimes help to maintain the AO cell of the second AOD 404 at the same temperature as (or close to the same temperature as) the AO cell of the first AOD 402. Transmitting the zeroth-order beam into the second AOD 404 can also help to a maintain a relatively uniform temperature distribution within a region the AO cell of the second AOD 404 through which the beam of laser energy transits during operation of the second AOD 404, thereby eliminating or otherwise reducing undesirable effects such as thermal lensing, beam drift, etc., during operation of the second AOD 404. In view of the above, transmitting the zeroth-order beam into the second AOD 404 can be particularly advantageous when the material from which the AO cell is formed has a relatively high absorption coefficient at the wavelength of the beam of laser energy that is to be deflected. For example, crystalline germanium is known to have a relatively high absorption coefficient at wavelengths in the mid- to long-wavelength infrared ranges of the electromagnetic spectrum (e.g., as compared to the absorption coefficient of quartz at wavelengths in the near-UV to visible wavelength ranges of the electromagnetic spectrum).

When the first positioner 106 is provided as an AOD system, such as the AOD system 400, the first positioner 106 may optionally include one or more other additional optical components, such as a beam trap, beam expander, beam shaper, aperture, filter, collimator, lens, mirror, phase retarder, polarizer, or the like or any combination thereof.

B. Embodiments Concerning Beam Dump Systems, Generally

In some embodiments, the first positioner 106 includes one or more beam dump systems to capture and absorb (i.e., trap) laser energy propagating along unwanted beam paths from an AOD. Conventionally, unwanted laser energy propagating from an AOD is diverted using a pickoff mirror, which reflects the laser energy (e.g., from a reflective surface thereof) to a remotely-located beam trap. Laser energy may be reflected either directly to the beam trap from the pickoff mirror, or indirectly via one or more additional relay mirrors. The pickoff mirror and the beam trap (and any relay mirrors therebetween) constitute a beam dump system.

Figure 5:
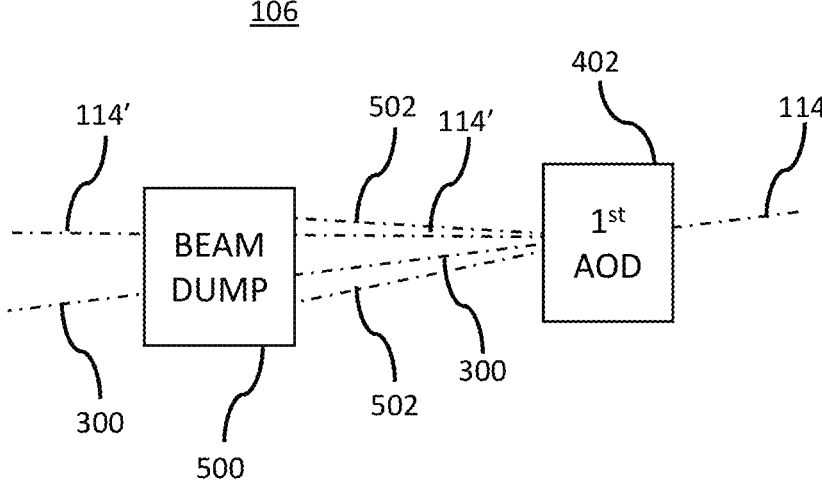
FIGS. 5 and 6 schematically illustrate how beam dump systems may be incorporated into the first positioner, according to some embodiments.

Referring to FIG. 5, the first positioner 106 may include a beam dump system 500 (also referred to herein as a "first beam dump system") arranged at the optical output side of the first AOD 402. The first AOD 402 is typically operated to diffract an incident beam of laser energy to thereby produce zeroth- and first-order beams propagating out of the first AOD 402 along the zeroth- and first-order beam paths 300 and 114', respectively. Often, one or more beams of other diffraction orders are also produced, each of which may propagate out of the first AOD 402 along one or more other beam paths, generically labelled in FIG. 5 at 502. The beam dump system 500 is configured to trap laser energy propagating along beam paths, such as any of beam paths 502, while permitting laser energy propagating along the zeroth- and first-order beam paths 300 and 114', respectively to continue to propagate (e.g., to the second AOD 404). In another embodiment, the beam dump system 500 may be also configured to trap laser energy propagating along the zeroth-order beam path 300 (i.e., to prevent laser energy from propagating to the second AOD 404).

Figure 6:
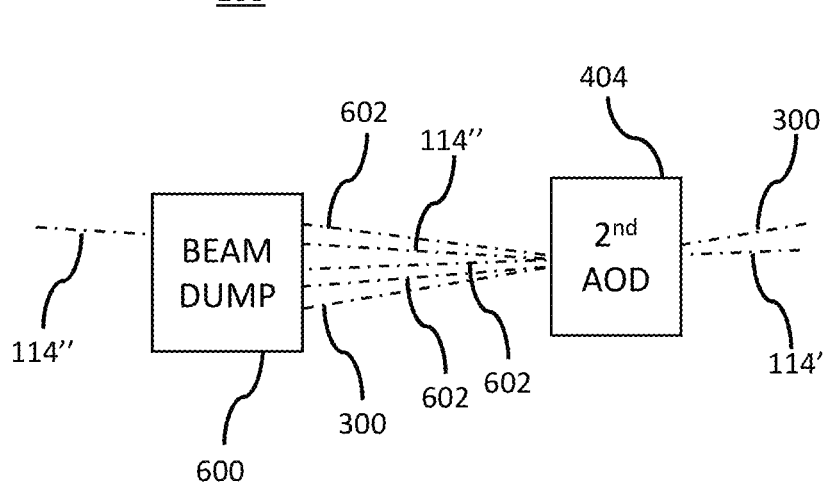

Referring to FIG. 6, the first positioner 106 may include a beam dump system 600 (also referred to herein as a "second beam dump system") arranged at the optical output side of the second AOD 404. The second AOD 404 is typically operated to diffract an incident beam of laser energy (e.g., propagating from the first AOD 402 along the first-order beam path 114', and, optionally, propagating from the first AOD 402 along the zeroth-order beam path 300). During operation of the second AOD 404, the incident beam of laser energy propagating along beam path 114' is diffracted to produce a first-order beam propagating out of the second AOD 404 along the first-order beam path 114". As with the first AOD 402, one or more beams of other diffraction orders may also be produced during operation of the second AOD 404, each of which may propagate out of the second AOD 404 along one or more other beam paths, generically labelled in FIG. 6 at 602. In addition, at least a portion of the beam of laser energy propagating from the first AOD 402 along the zeroth-order beam path 300 may propagate from the second AOD 404 along the zeroth-order beam path 300. The beam dump system 600 is configured to trap laser energy propagating along beam paths such as beam paths 300 and 602 while permitting laser energy propagating along the first-order beam path 114" to continue to propagate (e.g., to a second positioner 108).

In one embodiment, the first positioner 106 includes both the first beam dump system 500 and the second beam dump system 600. In another embodiment, however, the first positioner 106 may include the first beam dump system 500 but not the second beam dump system 600, or may include the second beam dump system 600 but not the first beam dump system 500. Although the first beam dump system 500 and second beam dump system 600 (each generically referred to herein as a "beam dump system") are described herein as incorporated within a first positioner 106 provided as the multi-cell, multi-axis AOD system 400, it will be appreciated that any number of the beam dump systems described herein may be incorporated in a first positioner 106 including only one AOD, or may be used conjunction with other optical components such as prisms, lenses, galvanometer mirror systems, fast-steering mirror systems, or the like or any combination thereof.

i. Example Embodiments Concerning Beam Dump Systems

In one embodiment, the pickoff mirror and the beam trap (and any relay mirrors therebetween) of a beam dump system are provided as physically separate components, each of which are separately provided and mounted (e.g., by means of screws, adhesives, clamps, or the like or any combination thereof) onto a common optical breadboard, etc. While this provides a flexible solution, alignment of these components relative to one another can be a difficult and time-consuming process.

In addressing the aforementioned potential problems associated with separately-provided components of a beam dump system, a beam dump system according to another embodiment can integrate the pickoff mirror, beam trap, and any intervening relay mirrors are (and, optionally, pre-aligned) into a common package. Such a beam dump system (also referred to herein as an "integrated beam dump system") can then be easily incorporated into the beam path assembly in any suitable manner known in the art, where the only alignment to be done is to align an optical input of the integrated beam dump system with any unwanted beam paths.

In one example embodiment, an integrated beam dump system can include one or more separately-provided pickoff mirrors, one or more beam traps and, optionally, one or more relay mirrors between a pickoff mirror and a beam trap, all mounted (e.g., by means of screws, adhesives, clamps, or the like or any combination thereof) to a common structure such as an optical breadboard. As is known in the art, an optical breadboard is a generally plate-like structure formed of a material such as steel, brass, aluminum or an aluminum alloy, carbon fiber reinforced polymer composite, etc., and which provides a planar surface to which optical components can be mounted (e.g., by means of screws, adhesive, clamps, or the like or any combination thereof). The optical breadboard can then, in turn, be mounted into the beam path assembly of the laser-processing apparatus 100.

In another example embodiment, the common structure to which the separately-provided components are mounted may be a frame (e.g., formed from a material such as steel, brass, aluminum or an aluminum alloy, copper or copper alloy, carbon fiber reinforced polymer composite, etc.). In this case, the frame provides multiple surfaces (at least two of which are not coplanar) to which different ones of the separately-provided components can be individually mounted (e.g., by means of screws, adhesives, clamps, or the like or any combination thereof). The frame can be fabricated in any suitable or desired manner known in the art, e.g., by CNC milling, casting, welding, vacuum bagging, compression molding, or the like or any combination thereof.

In another example embodiment, the frame may be provided or otherwise processed in such a manner so as to form one or more reflective surfaces (e.g., suitable to function as a pickoff mirror, a relay mirror, or any combination thereof), one or more optically absorptive surfaces or structures (e.g., suitable to function as a beam trap or portion thereof), or the like or any combination thereof. For example, when the frame is formed of a metallic material such as steel, brass, aluminum or an aluminum alloy, copper or copper alloy, etc., a surface of the frame can be ground and/or polished (e.g., chemically, mechanically, or any combination thereof) to form a reflective surface. In another example, and regardless of the material from which the frame is formed, a surface of the frame can be coated (e.g., via an electroplating process, an electroless plating process, a vacuum deposition process, or the like or any combination thereof) with a material that is reflective to the wavelength of light in a beam of laser energy incident upon the surface. Exemplary materials that may be coated onto the frame to form a reflective surface include aluminum, gold, silver, copper, or the like or any combination thereof.

In another example, when the frame is formed of a metallic material such as steel, aluminum or an aluminum alloy, copper or copper alloy, etc., a surface of the frame can be etched, roughened, oxidized, anodized, etc., to form a surface or other structure that suitably absorbs an incident beam of laser energy (e.g., suitable to function as a beam trap or portion thereof). In another example, and regardless of the material from which the frame is formed, a surface of the frame can be coated (e.g., via an electroplating process, an electroless plating process, a vacuum deposition process, a painting process, or the like or any combination thereof) with a material that is suitably absorptive to a beam of laser energy incident thereto.

Depending upon one or more factors such as the construction of the beam trap, and the power and wavelength of the beam of the laser energy absorbed by the beam trap, the beam trap may heat undesirably as laser energy is absorbed. Accordingly, the integrated beam dump system may include one or more cooling systems thermally coupled to the beam trap and configured to remove heat therefrom. Examples of suitable cooling systems include heat sinks, heat pipes, Peltier heat pumps, water blocks, or the like or any combination thereof. In one embodiment, one or more cooling systems can be thermally coupled to the optical breadboard or the frame. In another embodiment, one or more cooling systems can be integrally formed with, or otherwise mechanically coupled to, the optical breadboard or frame.

ii. Example Embodiments Concerning Integrated Beam Dump Systems

Figure 7:
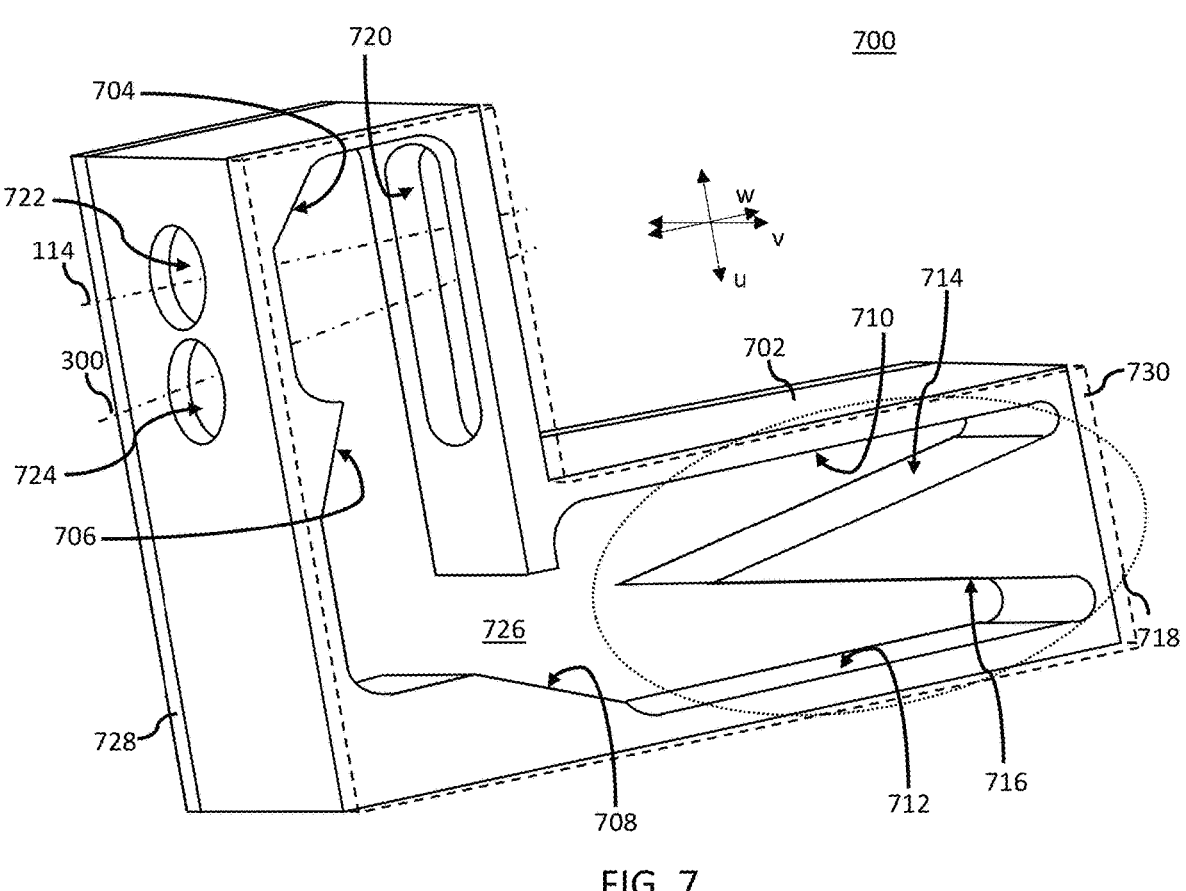
FIG. 7 is a perspective view, in an arbitrary u/v/w coordinate system, schematically illustrating an integrated beam dump system according to one embodiment.

Referring to FIG. 7, an integrated beam dump system, such as integrated beam dump system 700, can include a frame 702 formed from a material such as steel, brass, aluminum or an aluminum alloy, copper or copper alloy, or the like or any combination thereof. The frame 702 can be formed by any suitable or desired process known in the art (e.g., by CNC milling, casting, welding, or the like or any combination thereof) to form a plurality of surfaces, such as surfaces 704, 706, 708, 710, 712, 714 and 716. Generally, surfaces 704, 706 and 708 are provided as reflective surfaces and surfaces 710, 712, 714 and 716 are provided as optically absorptive surfaces. For example, and as discussed in greater detail with respect to FIGS. 8 and 9, surfaces 704 and 706 can function as pickoff mirrors, surface 708 can function as a relay mirror and surfaces 710, 712, 714 and 716 can be arranged relative to one another so as to form a beam trap 718. Thus, surfaces 704 and 706 can divert laser energy propagating along unwanted beam paths to the surface 708, which reflects the diverted laser energy to the beam trap 718.

Surfaces 704, 706 and 708 can be made reflective either during formation of the frame 702 or after the frame 702 is formed. For example, after the frame 702 is formed, the surfaces 704, 706 and 708 can be made reflective by performing one or more grinding or polishing operations (e.g., as discussed above) on regions of the frame 702 where one or more of the surfaces 704, 706 and 708 are formed, by coating one or more of the surfaces 704, 706 and 708 with a suitably reflective material (e.g., as discussed above), or the like or any combination thereof.

Surfaces 710, 712, 714 and 716 can be made absorptive either during formation of the frame 702 or after the frame 702 is formed. For example, the frame 702 can be formed such that surfaces 704, 706, 708, 710, 712, 714 and 716 are reflective and, thereafter, the surfaces 704, 706 and 708 can be masked to prevent a subsequent process (e.g., including one or more etching operations, roughening operations, oxidizing operations, anodizing operations, coating operations, or the like or any combination thereof) applied to the frame 702 from rendering the surfaces 704, 706 and 708 optically absorptive. Exemplary masking materials that can be used to mask the surfaces 704, 706 and 708 include tape, wax, lacquer, masking resins, etc., as is known in the art. After the surfaces 704, 706 and 708 have been appropriately masked, one or more operations may be performed (e.g., as discussed above) to render the surfaces 710, 712, 714 and 716 optically absorptive. Thereafter, the mask material can be removed from the still-reflective surfaces 704, 706 and 708.

In one embodiment, the frame 702 can be formed by machining (e.g., CNC milling) a block (e.g., formed of aluminum or aluminum oxide) and the resulting surfaces of the frame 702 can be anodized to form an anodic oxide layer of sufficient thickness to at least partially (or at least substantially) absorb an incident beam of laser energy. Generally, the minimum thickness that the anodic oxide layer should be to provide desired optical absorption of laser energy will depend upon the wavelength of the laser energy to be absorbed. For example, an anodic oxide layer formed to a thickness of at least 45 μm has been found sufficient to provide suitable absorption of laser energy at a wavelength of 9.4 μm. After anodizing the frame 702, regions of the frame 702 where one or more of the surfaces 704, 706 and 708 are formed can be ground and/or polished to remove the anodic oxide layer and thus form surfaces that are suitably reflective. Alternatively, the surfaces 704, 706 and 708 can be masked (e.g., as described above) prior to anodizing the frame 702 and the masking material can be removed after the unmasked portions of the frame 702 (e.g., surfaces 710, 712, 714 and 716) have been suitably anodized.

Figure 8:
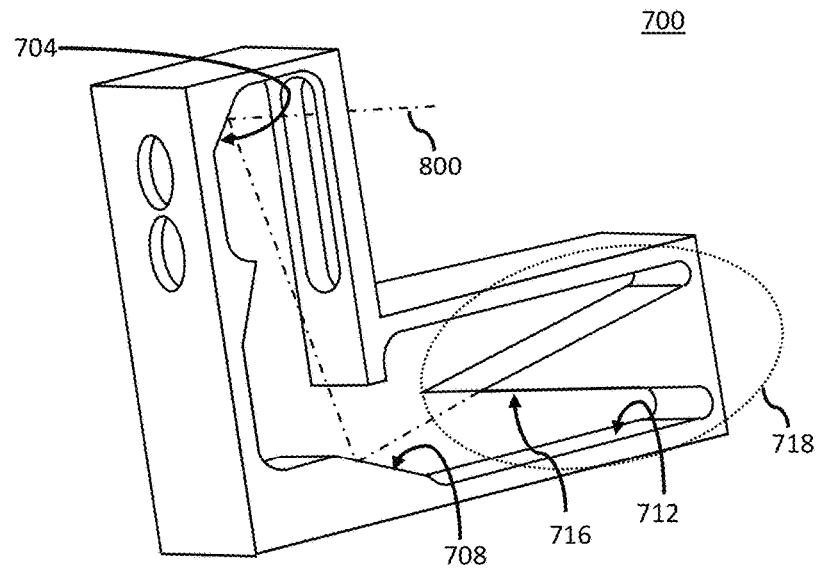
FIGS. 8 and 9 are perspective views illustrating exemplary beam paths along which laser energy can propagate within the integrated beam dump system shown in FIG. 7 to become trapped thereby.

Referring to FIG. 8, surface 704 can function as a pickoff mirror to divert laser energy propagating along an unwanted beam path (e.g., beam path 800, propagating from the first AOD 402 or the second AOD 404) to surface 708. Surface 708 can function as a relay mirror to reflect laser energy, reflected by the surface 704, to the beam trap 718 (e.g., to surface 716) where the laser energy is absorbed. Although FIG. 8 illustrates the beam path 800 as terminating at surface 716 (thus suggesting that all laser energy propagating along beam path 800 is absorbed), it will be appreciated that some laser energy may be reflected at surface 716. In this case, the laser energy would be reflected from surface 716 to surface 712, where the remaining laser energy would either be completely absorbed or partially reflected back to surface 716, where it would be at least partially absorbed.

Figure 9:
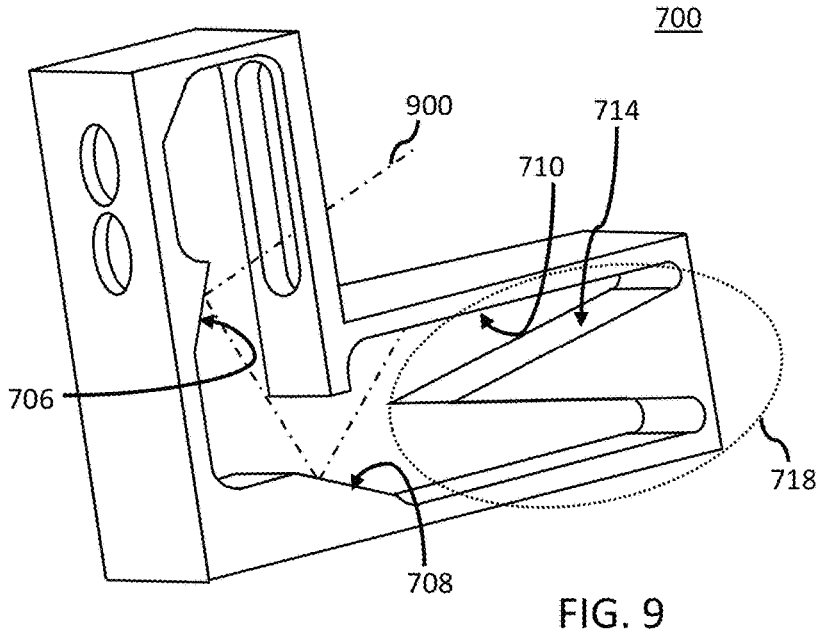

Similarly, with reference to FIG. 9, surface 706 can function as a pickoff mirror to divert laser energy propagating along an unwanted beam path (e.g., beam path 900, propagating from the first AOD 402 or the second AOD 404) to surface 708. Surface 708 can function as a relay mirror to reflect laser energy, reflected by the surface 704, to the beam trap 718 (e.g., to surface 710) where the laser energy is absorbed. Although FIG. 9 illustrates the beam path 900 as terminating at surface 710 (thus suggesting that all laser energy propagating along beam path 900 is absorbed), it will be appreciated that some laser energy may be reflected at surface 710. In this case, the laser energy would be reflected from surface 710 to surface 714, where the remaining laser energy would either be completely absorbed or partially reflected back to surface 710, where it would be at least partially absorbed.

Referring back to FIG. 7, the frame 702 may further include an opening 720 that functions as the optical input of the integrated beam dump system 700. As shown, the opening 720 is arranged and sized such that laser energy propagating along any beam path from the first AOD 402 or the second AOD 404 (e.g., along beam path 114 or 300, as shown in FIG. 7, or along other beam paths such as beam paths 800 or 900 as shown in FIG. 8 or 9, respectively, or any combination thereof) can be transmitted therethrough. The frame 702 may further include openings 722 and 724 that each function as an optical output of the integrated beam dump system 700. Specifically, opening 722 is arranged and sized so as to permit laser energy propagating along beam path 114 to be transmitted therethrough. Likewise, opening 724 is arranged and sized so as to permit laser energy propagating along beam path 300 to be transmitted therethrough.

Figure 10:
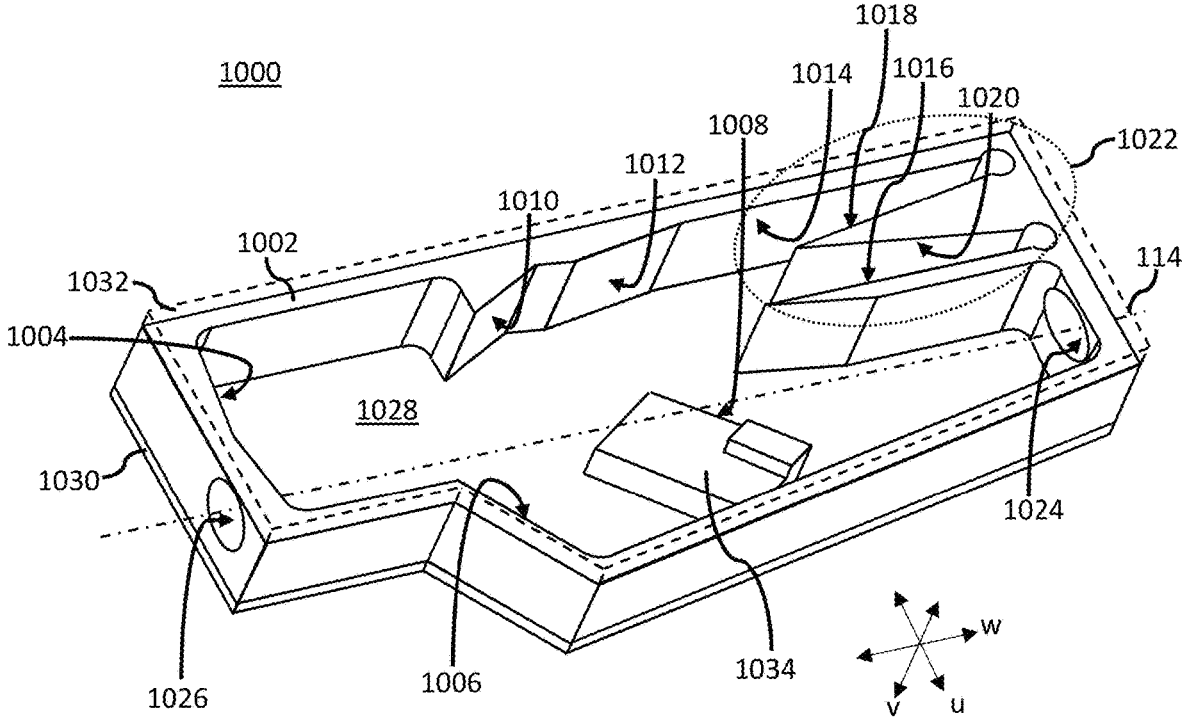
FIG. 10 is a perspective view, in an arbitrary u/v/w coordinate system, schematically illustrating an integrated beam dump system according to another embodiment.

Referring to FIG. 10, an integrated beam dump system, such as integrated beam dump system 1000, can include a frame 1002 formed from a material such as steel, brass, aluminum or an aluminum alloy, copper or copper alloy, or the like or any combination thereof. The frame 1002 can be formed by any suitable or desired process known in the art (e.g., in any manner as described above with respect to frame 702) to form a plurality of surfaces, such as surfaces 1004, 1006, 1008, 1010, 1012, 1014, 1016, 1018 and 1020. Generally, surfaces 1004, 1006, 1008, 1010 and 1012 are provided as reflective surfaces and surfaces 1014, 1016, 1018 and 1020 are provided as optically absorptive surfaces. Any of surfaces 1004, 1006, 1008, 1010 and 1012 can be formed in any manner (e.g., in the same or similar manner as discussed with respect to surfaces 704, 706 and 708) so as be suitably reflective of an incident beam of laser energy. Likewise, any of surfaces 1014, 1016, 1018 and 1020 can be formed in any manner (e.g., in the same or similar manner as discussed with respect to surfaces 710, 712, 714 and 716) so as be suitably absorptive of an incident beam of laser energy. Accordingly, and as discussed in greater detail with respect to FIGS. 11 to 14, surfaces 1004, 1006 and 1008 can function as pickoff mirrors, surfaces 1010 and 1012 can function as relay mirrors and surfaces 1014, 1016, 1018 and 1020 can be arranged relative to one another so as to form a beam trap 1022. Thus, surfaces 1004, 1006 and 1008 can divert laser energy propagating along unwanted beam paths. In particular, surface 1004 is configured to reflect incident laser energy directly to the beam trap 1020 whereas surfaces 1006 and 1008 are configured to reflect incident laser energy to the surfaces 1010 and 1012, respectively. In turn, surfaces 1010 and 1012 are each configured to reflect the diverted laser energy to the beam trap 1022.

Figure 11:
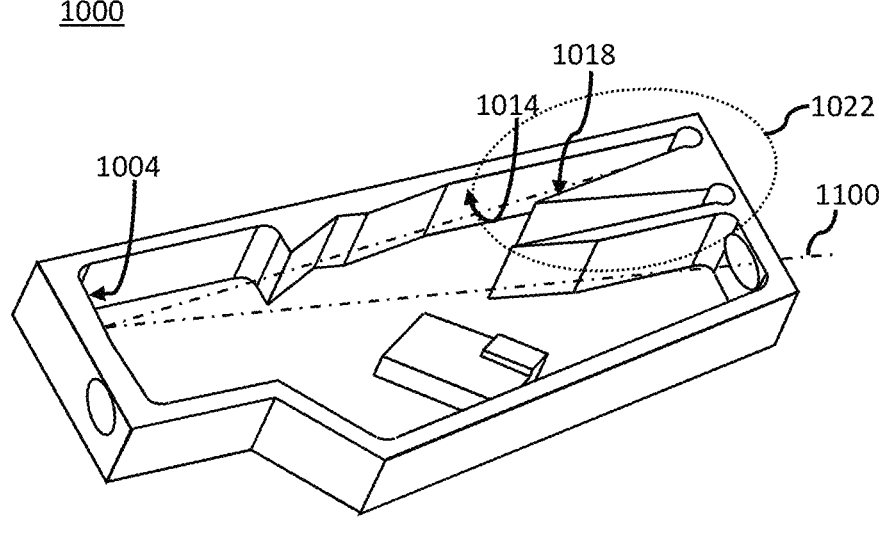
FIGS. 11 to 14 are perspective views illustrating exemplary beam paths along which laser energy can propagate within the integrated beam dump system shown in FIG. 10 to become trapped thereby.

Referring to FIG. 11, surface 1004 can function as a pickoff mirror to divert laser energy propagating along an unwanted beam path (e.g., beam path 1100, propagating from the first AOD 402 or the second AOD 404), to surface 1014. Although FIG. 11 illustrates the beam path 1100 as terminating at surface 1014 (thus suggesting that all laser energy propagating along beam path 1100 is absorbed), it will be appreciated that some laser energy may be reflected at surface 1014. In this case, the laser energy would be reflected from surface 1014 to surface 1018, where the remaining laser energy would either be completely absorbed or partially reflected back to surface 1014, where it would be at least partially absorbed.

Figure 12:
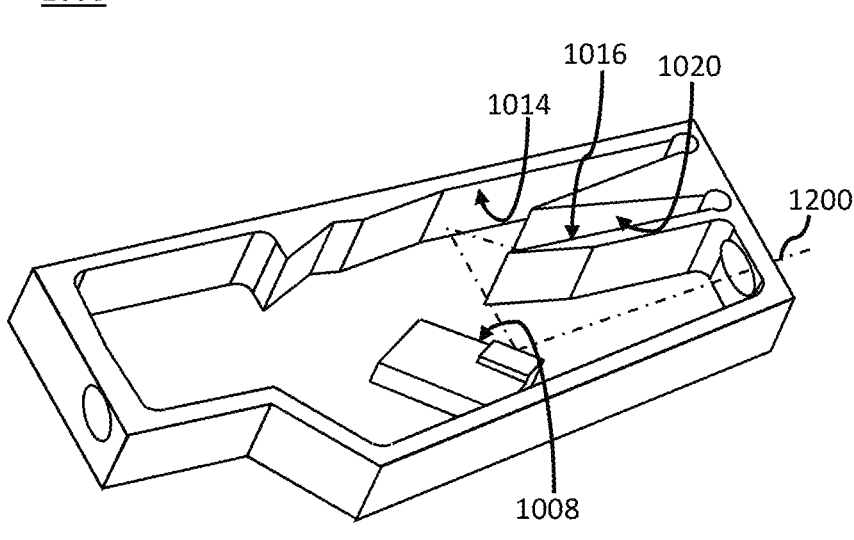

Similarly, with reference to FIG. 12, surface 1008 can function as a pickoff mirror to divert laser energy propagating along an unwanted beam path (e.g., beam path 1200, propagating from the first AOD 402 or the second AOD 404), to surface 1014. Although FIG. 12 illustrates the beam path 1200 as terminating at surface 1016 (thus suggesting that some of the laser energy propagating along beam path 1200 is reflected by surface 1014 and that all of such reflected laser energy propagating along beam path 1200 is absorbed at surface 1016), it will be appreciated that some laser energy may be reflected at surface 1016. In this case, the laser energy would most likely be reflected from surface 1016 to surface 1020, where the remaining laser energy would either be completely absorbed or partially reflected back to surface 1016, where it would be at least partially absorbed.

Figure 13:
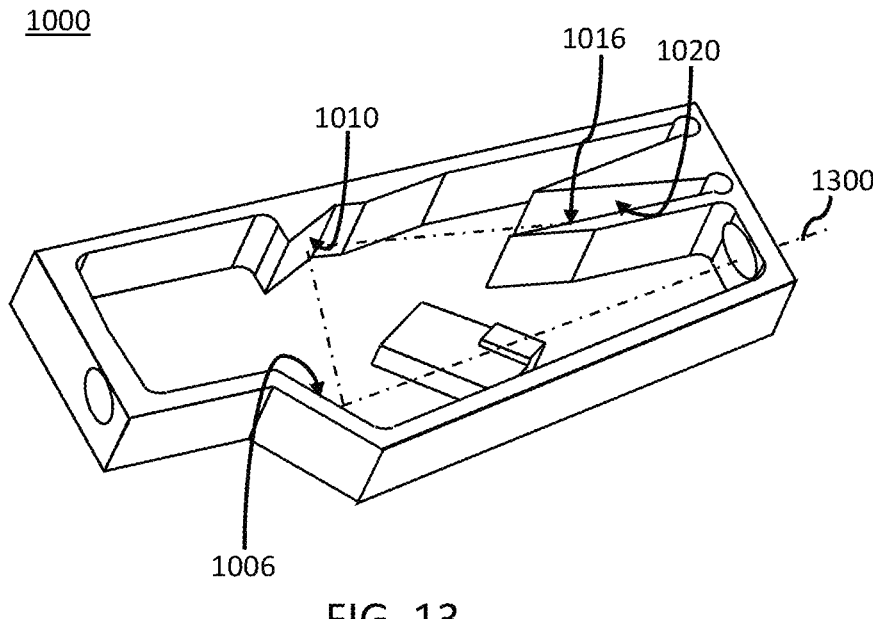

Referring to FIG. 13, surface 1006 can function as a pickoff mirror to divert laser energy propagating along an unwanted beam path (e.g., beam path 1300, propagating from the first AOD 402 or the second AOD 404) to surface 1010. Surface 1010 can function as a relay mirror to reflect laser energy, reflected by the surface 1004, to the beam trap 1022 (e.g., to surface 1016) where the laser energy is absorbed. Although FIG. 13 illustrates the beam path 1300 as terminating at surface 1016 (thus suggesting that all laser energy propagating along beam path 1300 is absorbed), it will be appreciated that some laser energy may be reflected at surface 1016. In this case, the laser energy would be reflected from surface 1016 to surface 1020, where the remaining laser energy would either be completely absorbed or partially reflected back to surface 1016, where it would be at least partially absorbed.

Figure 14:
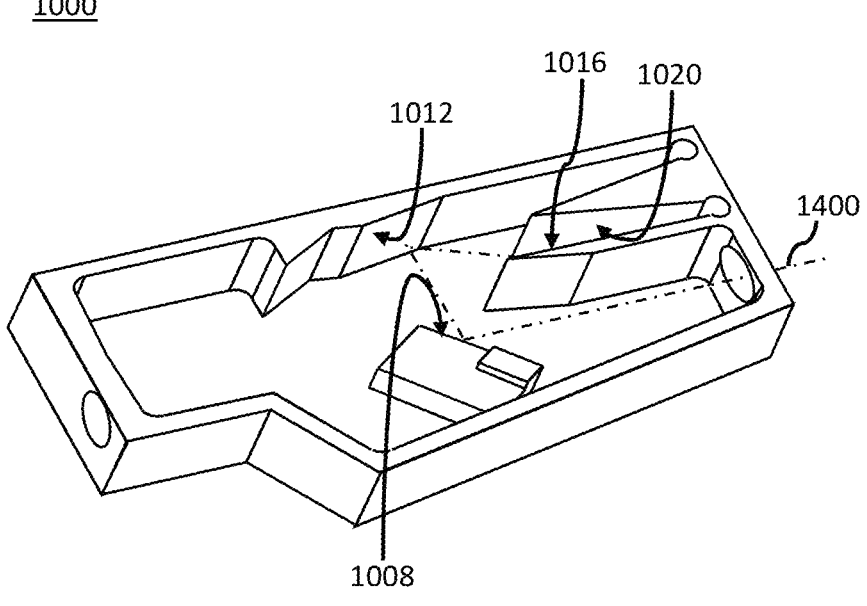

Similarly, with reference to FIG. 14, surface 1008 can function as a pickoff mirror to divert laser energy propagating along an unwanted beam path (e.g., beam path 1400, propagating from the first AOD 402 or the second AOD 404) to surface 1012. Surface 1012 can function as a relay mirror to reflect laser energy, reflected by the surface 1008, to the beam trap 1022 (e.g., to surface 1016) where the laser energy is absorbed. Although FIG. 14 illustrates the beam path 1400 as terminating at surface 1016 (thus suggesting that all laser energy propagating along beam path 1400 is absorbed), it will be appreciated that some laser energy may be reflected at surface 1016. In this case, the laser energy would be reflected from surface 1016 to surface 1020, where the remaining laser energy would either be completely absorbed or partially reflected back to surface 1016, where it would be at least partially absorbed.

Referring back to FIG. 10, the frame 1002 may further include an opening 1024 that functions as the optical input of the integrated beam dump system 1000. As shown, the opening 1024 is arranged and sized such that laser energy propagating along any beam path from the first AOD 402 or the second AOD 404 (e.g., along beam path 114, as shown in FIG. 10, or along other beam paths such as beam paths 1100, 1200, 1300 or 1400 as shown in FIG. 11, 12, 13 or 14, respectively, or any combination thereof) can be transmitted therethrough. The frame 1002 may further include opening 1026 that functions as an optical output of the integrated beam dump system 1000. Specifically, opening 1026 is arranged and sized so as to permit laser energy propagating only along beam path 114 to be transmitted therethrough. In the integrated beam dump system 1000, the zeroth-order beam path 300 (e.g., propagating from the first AOD 402 or the second AOD 404) is diverted and sent to the beam trap 1022. In this case, the zeroth-order beam path 300 may be represented by the beam path 1200 or 1300, for example.

In view of the discussion above with respect to the integrated beam dump systems 700 and 1000, it will be appreciated that the aforementioned surfaces provided by the frames 702 and 1002 define an interior region through which laser energy can propagate to a respective beam trap. For example, the aforementioned surfaces provided by the frame 702 define an interior region 726, and the aforementioned surfaces provided by the frame 1002 define an interior region 1028. To prevent or otherwise minimize the undesirable entry of dust or other particles or objects from entering into these interior regions, any of the integrated beam dump systems 700 or 1000 can, optionally, include one or more plate that span the interior region. For example, the integrated beam dump system 700 can include a first plate 726 coupled to the frame 702 (e.g., at a first side thereof), a second plate 728 (shown in FIG. 7 in dashed lines) coupled (e.g., by means of screws, adhesives, clamps, or the like or any combination thereof) to the frame 702 (e.g., at a second side thereof, opposite the first side), or a combination thereof. Likewise, the integrated beam dump system 1000 can include a first plate 1030 coupled to the frame 1002 (e.g., at a first side thereof), a second plate 1032 (shown in FIG. 10 in dashed lines) coupled (e.g., by means of screws, adhesives, clamps, or the like or any combination thereof) to the frame 1002 (e.g., at a second side thereof, opposite the first side), or a combination thereof. With respect to the integrated beam dump system 1000, although the frame 1002 has been described above as providing the surface 1008, the surface 1008 may be provided by a block (e.g., block 1034) that is coupled (e.g., by means of screws, adhesives, clamps, or the like or any combination thereof) to the first plate 1030.

In one embodiment, any of the aforementioned plates coupled to a frame of the integrated beam dump system 700 or 1000 may be formed of a thermally-conductive material (e.g., steel, brass, aluminum or an aluminum alloy, copper or copper alloy, or the like or any combination thereof) so as to conduct heat away from an associated beam trap (i.e., beam trap 718 or 1022). In another embodiment, one or more cooling systems (e.g., a heat sink, heat pipe, Peltier heat pump, water block, or the like or any combination thereof) may be coupled to, or otherwise completely or partially integrated into, one or more of the plates 728, 730, 1030 or 1032.

C. Embodiments Concerning Phase Retarders, Generally

Depending on the type of AOD included in the first positioner 106, it can be desirable to rotate the plane of polarization of light (i.e., the plane in which the electric field oscillates) in the first-order beam path transmitted by the AOD. Rotating the plane of polarization will be desired if the amount of RF drive power required to diffract a significant portion of an incident beam of laser energy into the first-order beam is highly dependent on the polarization state of the beam of laser energy being deflected. Further, if each AOD in a multi-cell AOD system includes an AO cell formed of the same material, and if each AOD in the multi-cell AOD system uses the same type of acoustic wave to deflect an incident beam of laser energy, and if it is desirable to have the polarization state of light in the first-order beam transmitted by a first AOD in the multi-cell AOD system (e.g., the first AOD 402 in the multi-axis AOD system 400) be linear and be oriented in a particular direction relative to the diffraction axis of a second AOD in the multi-cell AOD system (e.g., the second AOD 404 in the multi-axis AOD system 400), then it would be similarly desirable to have the polarization state of light in the first-order beam transmitted by the second AOD be rotated with respect to the polarization state of the light in the first-order beam transmitted by the first AOD just as the orientation of the second AOD is rotated with respect to an orientation of the first AOD.

Examples of phase retarders that may be incorporated into the first positioner 106 include one or more transmissive phase retarders (e.g., a half-wave plate, a quarter-wave plate, an eighth-wave plate, or the like or any combination thereof), one or more reflective phase retarders (e.g., configured to impart a 180 degree phase shift, a 90 degree phase shift, or the like or any combination thereof), or the like or any combination thereof. Generally, if needed, one or more phase retarders can be inserted into the beam path (e.g., a first-order beam path or otherwise) of a beam of laser energy incident upon an AOD to align the plane of polarization of a linearly polarized beam of laser energy incident upon the AOD with the diffraction axis of the AO cell in the AOD. For example, one or more phase retarders may be arranged in the beam path 114', at a location between the first AOD and the second AOD, to align the plane of polarization of a linearly polarized beam of laser energy exiting the first AOD that will become incident upon the second AOD with the diffraction axis of the AO cell in the second AOD.

D. Embodiments Concerning Compensation of Wavefront Distortion, Generally

Often, a transmissive optical component will absorb some amount of light that is incident upon it. When the incident light is a high-power beam of laser energy, the absorbed light can heat the material from which the transmissive optical component is formed. Sometimes, when a beam of laser energy has a non-uniform spatial intensity profile (e.g., as with a Gaussian-type spatial intensity profile), different regions of the beam will heat different parts of the transmissive optical component to different temperatures. For example, the central region of a beam having a Gaussian-type spatial intensity distribution will heat one region of a transmissive optical component more than a peripheral region of the beam. Because the index of refraction for many materials from which transmissive optical components are formed varies with temperature (known as the thermooptic effect), the wavefront of a high-power beam of laser energy will be modified as it propagates through the transmissive optical component. In addition, the relatively hot region of the transmissive optical component can bulge (as a result of thermal expansion), and such bulging can cause the shape of the transmissive optical component to resemble that of a lens. Changes in the index of refraction can also be caused by thermally-induced mechanical stresses within the transmissive optical component (known as the photoelastic effect). As used herein, the act of heating different parts of the transmissive optical component differently can also be referred to as "differential heating" of the transmissive optical component. Differential heating of a transmissive optical component can also be effected by means other than from absorption of laser energy. For example, a transmissive optical component can be placed near a source of heat. Transmissive optical components such as EO or AO cells can be differentially heated when, for example, the systems in which they are incorporated are operated. As is known in the art, differential heating of a transmissive optical component can induce differential changes in the index of refraction within the transmissive optical component, an effect known as "thermal lensing." Thermal lensing can undesirably focus, defocus, or otherwise distort the wavefront of the beam of laser energy as it propagates along the beam path 114, through the beam path assembly.

One way to address the potentially-deleterious effects associated thermal lensing is to use transmissive optical components that are substantially transparent to wavelengths of light in the incident beam of laser energy (i.e., such that thermal lensing does not occur). Another technique is to simply lower the power in the beam of laser energy. However, these approaches can be difficult or impossible to implement if no substantially transparent transmissive optical component exists, or if the workpiece cannot be processed as desired using a relatively low-power beam of laser energy. Thus, according to some embodiments described in more detail below, one or more optical components (herein referred to as "wavefront compensation optics") can be arranged in the beam path 114 to compensate (i.e., either completely or partially compensate) for wavefront distortion that can be induced by thermal lensing within one or more transmissive optical components of the beam path assembly.

In the embodiments described herein, the beam of laser energy input to a transmissive optical component is typically axially-symmetric (i.e., round, or at least substantially round), and distortion induced by the thermal lensing is often dominated by one or more phase aberrations, which are also axially-symmetric. The phase aberration imparted on the wavefront of a beam of laser energy can be described by a combination of Zernike polynomials with appropriate magnitudes of their coefficients as is known in the art. That is:

$$\Phi(\rho, \theta) = \sum_j a_j Z_j(\rho, \theta)$$

where $\rho$ is the normalized radial coordinate from the center of the aperture being considered (where, in this context, "normalized" means $\rho$ takes a value of 1 at the edge of the aperture being considered), $\theta$ is the angular coordinate within the aperture being considered, $a_j$ is the coefficient value of the $j^{th}$ Zernike polynomial term with units of distance (e.g., in units of $\lambda$, where $\lambda$ is the optical wavelength of light in the beam of laser energy, as discussed above), and $Z_j$ is the $j^{th}$ Zernike polynomial term.

For purposes of discussion herein, the $j^{th}$ Zernike polynomial terms will be described using the "fringe" (also known as the "University of Arizona") numbering and normalization scheme. Since the following terms are of most concern, they are stated explicitly in Table 1 below.

TABLE 1

| j | $Z_j(\rho, \theta)$ |
|---|---|
| 1 | 1 |
| 4 | $2\rho^2 - 1$ |
| 9 | $6\rho^4 - 6\rho^2 + 1$ |
| 16 | $20\rho^6 - 30\rho^4 + 12\rho^2 - 1$ |

The reader will note that these terms are radially-symmetric and, therefore, $Z_j(\rho, \theta)$ is not dependent upon $\theta$.

Through experiments performed by the applicant it has been discovered that, when a beam of laser energy having a Gaussian-type spatial intensity profile heats the bulk transparent material of a transmissive optical component to induce thermal lensing within the transmissive optical component, the sign of the coefficient for the $Z_9$ term is nearly always opposite the sign of that the $Z_4$ term, the magnitude of the coefficient for the $Z_9$ term tends to be smaller than the magnitude of that for the $Z_4$ term, and the ratio of the coefficients of the $Z_9$ to $Z_4$ terms does not change appreciably as the amount of laser power absorbed changes. As such, independent and arbitrary correction of coefficients for the $Z_4$ and $Z_9$ terms is not strictly necessary. These observations depend somewhat on the arbitrary choice of the aperture size over which to define the fringe Zernike polynomial fit, but aperture sizes ranging from slightly less than, to about double, the $4\sigma$ width of the beam of laser energy are the most useful (for a perfect Gaussian beam, the $4\sigma$ width is equivalent to the full width of the beam at the off center points with $1/e^2$ of the intensity at the peak).

Figure 15:
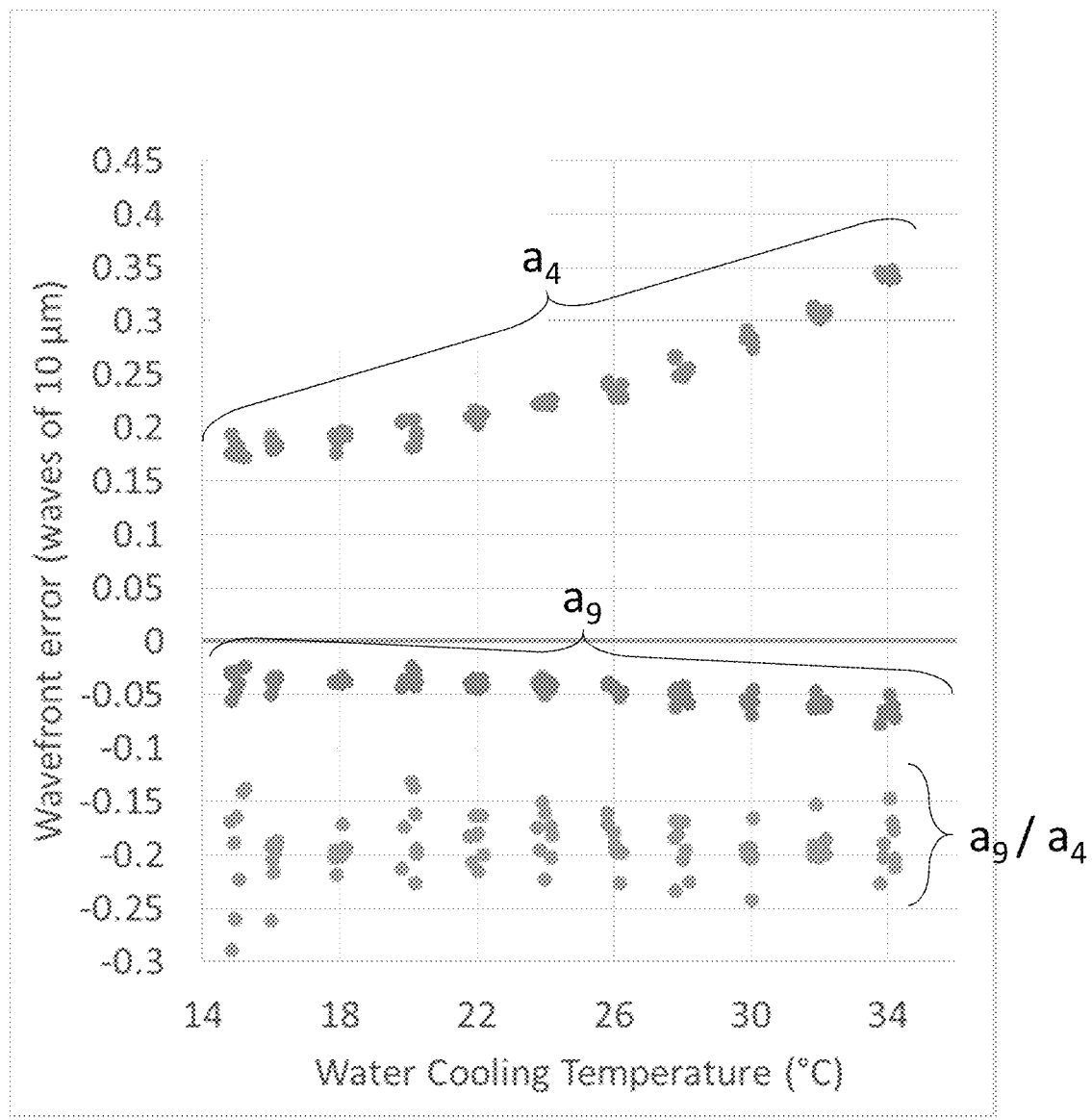
FIG. 15 illustrates a graph of showing an experimentally-determined dependence of coefficients for fringe Zernike polynomial terms $Z_4$ and $Z_9$ terms (and their ratio) on the temperature of a bulk transparent material.

For example, FIG. 15 illustrates a graph of one set of experimental results showing how coefficients for the $Z_4$ and $Z_9$ terms (and how their ratio) change with the temperature of a bulk transparent material formed of a block of crystalline germanium (e.g., of the type used to form an AO cell). In this case, a beam of laser energy, generated from a $CO_2$ laser source, and having a wavelength in a range from 8 μm to 12 μm and a constant power, was illuminated onto the germanium block. The temperature of the germanium block was varied by changing temperature of cooling water circulating around the germanium block as the block was illuminated by the beam of laser energy. Thus, the amount of laser energy absorbed by the germanium block increased with increasing temperature of the cooling water. From the graph illustrated in FIG. 15, it can be seen that the sign of the coefficient for the $Z_9$ term (i.e., the data labeled "$a_9$") is always opposite the sign of that the $Z_4$ term (i.e., the data labeled "$a_4$"), and the magnitude of the coefficient for the $Z_9$ term tends to be smaller than the magnitude of that for the $Z_4$ term. It can also be seen that the ratio of the coefficients of the $Z_9$ to $Z_4$ terms (i.e., the data labeled "$a_9/a_4$") does not change appreciably. It should be noted that the data in the graph was based on observations where the aperture was about 1.6 times the $4\sigma$ width of the incident beam of laser energy.

Although a specific discussion concerning thermal lensing has been made above with respect to a combination of bulk transparent material formed of crystalline germanium and a high-power beam of laser energy having a wavelength in a range from 8 μm to 12 μm, it will be appreciated that thermal lensing can also be observed in other bulk transparent materials used to form AO cells such as tellurium dioxide (e.g., depending upon one or more factors such as the presence of impurities in the bulk transparent material, the power of the beam of laser energy propagating through the bulk transparent material, the wavelength of the beam of laser energy propagating through the bulk transparent material, or the like or any combination thereof). Further, although specific discussion concerning thermal lensing has been made above with respect to bulk transparent materials used in AO cells, it will be appreciated that thermal lensing can also be observed in other transparent optical components such as lenses, beam splitters, prisms, dichroic filters, windows, waveplates, DOEs, ROEs, etc., are formed of bulk transparent materials (which may, optionally, be coated one or more anti-reflection coatings, or the like), as well as other optical components such as laser gain media. Accordingly, the techniques for correcting, or compensating for, wavefront aberrations a beam of laser energy caused by thermal lensing are generally applicable to correcting wavefront aberrations in a beam of laser energy generated by the laser source 104, regardless of in which transparent optical component the thermal lensing was induced.

i. Example Embodiments Concerning Wavefront Compensation Optics

Having discussed the nature of aberrations in the beam of laser energy that may be induced by thermal lensing, numerous embodiments of wavefront compensation optics, which can be disposed in the beam path 114 to compensate for the aberrations, are discussed below. Generally, however, a wavefront compensation optic can be provided as one or more optical components such as one or more lenses, mirrors, or the like or any combination thereof.

In one embodiment, a wavefront compensation optic can be provided as a reflective optical component (e.g., a spherical or otherwise curved mirror) having a reflective surface with a shape characterized by fringe Zernike terms (e.g., $Z_4$, $Z_9$, $Z_{16}$, or the like or any combination thereof), wherein coefficients for the fringe Zernike terms are selected so as to compensate for wavefront distortion in the beam of laser energy. The reflective surface can be shaped by any suitable technique known in the art (e.g., by high precision diamond turning of a mirror, by precision polishing of the mirror substrate with magnetorheological methods (MRF polishing), etc.).

In another embodiment, a wavefront compensation optic can be provided as a transmissive optical component (e.g., a spherical lens, or the like) having refractive surfaces with a shape characterized by fringe Zernike terms (e.g., $Z_4$, $Z_9$, $Z_{16}$, or the like or any combination thereof), wherein coefficients for the fringe Zernike terms are selected so as to compensate for wavefront distortion in the beam of laser energy. In another embodiment, the transmissive optical component can include two more spherical lenses set some distance apart to generate a desired value of the coefficient for the $Z_9$ term.

In yet another embodiment, a wavefront compensation optic can be provided as a combination of one or more reflective optical components (e.g., provided as discussed above) and one or more transmissive optical components (e.g., provided as discussed above). In this case, any amount of compensation of the coefficient for the $Z_4$ term can be accomplished on one or more surfaces of one or more transmissive optical components and compensation of the coefficient for the $Z_9$ term can be accomplished by one or more surfaces of one or more reflective optical components.

The reflective and transmissive optical components discussed above typically provide a static compensation for the effects generated by thermal lensing within a transmissive optical component and, so, are considered to be examples of a "static wavefront compensation optic." In another embodiment, a wavefront compensation optic can provide dynamic compensation for the effects generated by thermal lensing within a transmissive optical component and, so, can be considered a "dynamic wavefront compensation optic." In this case, a dynamic wavefront compensation optic can include one or more variable-focal length lenses or lens assemblies, one or more deformable mirrors, one or more optically-transmissive spatial light modulators, either alone or in any combination. Example types of deformable mirrors include a segmented-type deformable mirror (i.e., comprised of independently-actuatable flat mirror segments, which can optionally be formed by MEMS techniques) and a membrane-type deformable mirror (i.e., comprised of a reflective membrane that can be deformed in any manner known in the art, mechanically, pneumatically, hydraulically, mechanically, etc.), and the like. A dynamic wavefront compensation optic can also include one or more fixed-focal length lenses or lens assemblies, or more non-deformable mirrors, or the like or any combination thereof, which may be moveable relative to one another (e.g., one or more zoom lenses).

Regardless of the type(s) of optical components in the wavefront compensation optic, the wavefront compensation optic can be configured to compensate for any wavefront distortion that: (a) has been accumulated by the beam of laser energy at one or more locations in the beam path 114 "optically upstream" of the wavefront compensation optic (i.e., prior to propagating to the wavefront compensation optic); (b) is expected to be accumulated by the beam of laser energy at one or more locations in the beam path 114 "optically downstream" of the wavefront compensation optic (i.e., after propagating from the wavefront compensation optic); or (c) any combination of (a) and (b). As used herein, wavefront distortion that has been accumulated by the beam of laser energy prior to propagating to the wavefront compensation optic is also referred to as "actual wavefront distortion" and wavefront distortion that is expected to be accumulated by the beam of laser energy after propagating from the wavefront compensation optic is also referred to as "expected wavefront distortion."

a. Example Embodiments Concerning Membrane-Type Deformable Mirrors

Figures 16, 16A:
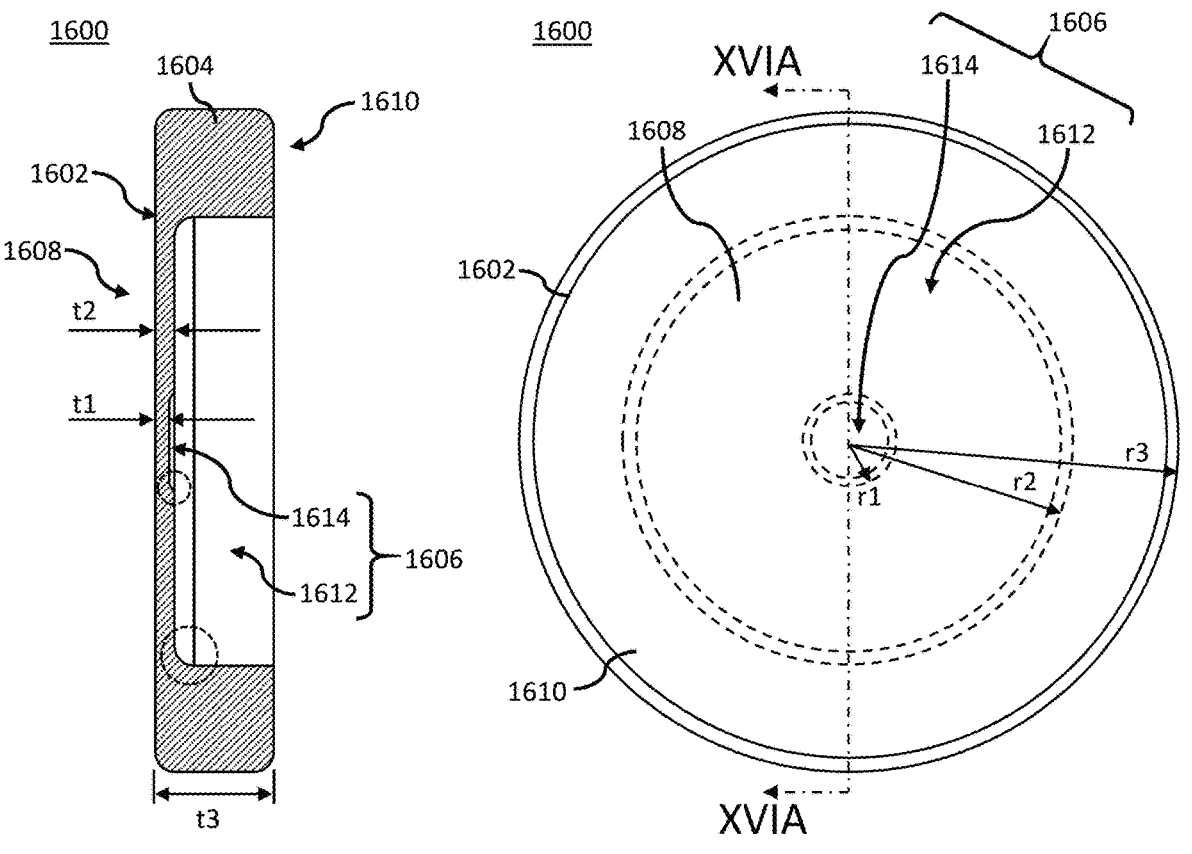
FIG. 16 schematically illustrates a plan view of a wavefront compensation optic, according to one embodiment.
FIG. 16A schematically illustrates a cross-section view of the wavefront compensation optic shown in FIG. 16, taken along line XVIA-XVIA of FIG. 16.

In one embodiment, and with reference to FIGS. 16 and 16A, a membrane-type deformable mirror can be provided as mirror 1600. Generally, the mirror 1600 includes a reflective surface 1602, a body 1604 and a pocket 1606 formed in the body 1604 (e.g., extending from a back surface of the body toward the reflective surface 1602). Thus, the body 1604 can be characterized as including a relatively thin membrane region 1608 (e.g., formed between the reflective surface 1602 and the pocket 1606) and a relatively thick peripheral region 1610 (e.g., surrounding the perimeter of the pocket 1606). In one embodiment, the body 1604 can be formed of a material such as copper, and the reflective surface 1602 can be formed of the same material as the body 1604 (e.g., the body 1604 can be polished to form the reflective surface 1602), or the reflective surface 1602 can be formed as a film or other coating formed on the body 1604.

The membrane region 1608 is configured so as to be deformed by changing the pressure within the pocket 1606. For example, and with reference to FIG. 17, the mirror 1600 may be coupled to a pedestal 1700 (e.g., via an adhesive, one or more welds, one or more clamps, one or more screws, or the like or any combination thereof) so as to form a seal extending along the periphery of the pocket 1606 (i.e., where the peripheral region 1610 of the mirror 1600 is biased against or adhered to a surface 1702 of the pedestal 1700. The pedestal 1700 includes bore 1704, through which a fluid (e.g., air) can travel so as to pressurize or depressurize the pocket 1606, as is known in the art. When the pocket 1606 is not sufficiently pressurized (e.g., when the pressure within the pocket 1606 is equal to the ambient pressure of the environment outside the pocket 1606), the reflective surface 1602 is substantially planar. When the pocket 1606 is sufficiently pressurized (e.g., when the pressure within the pocket 1606 is greater than the ambient pressure of the environment outside the pocket 1606, by a predetermined threshold amount), the shape of the reflective surface 1602 changes so as to have at least substantially the same characteristics as the wavefront distortion (actual wavefront distortion, expected wavefront distortion, or any combination thereof) which are sought to be compensated. The geometry of the membrane region 1608 can be configured to ensure that, as the reflective surface 1602 changes, coefficients for the fringe Zernike terms which can be used to characterize the shape of the reflective surface 1602 (e.g., $Z_4$, $Z_9$, $Z_{16}$, or the like or any combination thereof) change so as to compensate for wavefront distortion (actual wavefront distortion, expected wavefront distortion, or any combination thereof) in the beam of laser energy.

Generally, control of the pressure within the pocket 1606 can be effected by one or more control elements such as a regulator (e.g., a fixed pressure regulator or a variable pressure regulator, etc.), a control valve (e.g., an electronically-controllable control valve responsive to one or more command signals output by the controller 122 or other controller), or the like or any combination thereof. The control element can be an to direct pressurized air into the pocket 1606 (e.g., when the laser source 104 is operated to generate a beam of laser energy to process a workpiece) and to depressurize the pocket 1606 (e.g., when the laser source 104 is turned off, when the laser source 104 is operated to generate a low-power beam laser energy to facilitate alignment, etc.). In this case, a first end of a hose (e.g., a pneumatic hose, a hydraulic hose, etc.) is typically coupled to the pedestal 1700 so as to be in fluid communication with the bore 1704, and a second end of the hose (opposite the first end) is in fluid communication with the control element.

In one embodiment, the apparatus 100 may, optionally, include a laser power monitor, a wavefront sensor, or the like or any combination thereof, arranged (e.g., at a location optically upstream of the first positioner 106, at a location optically midstream between the first positioner 106 and the second positioner 108, at a location optically downstream of the second positioner 108, or the like or any combination thereof) and configured to generate a measurement signal representative of the power (in the case of the laser power monitor), the wavefront (in the case of the wavefront sensor), etc., of the beam of laser energy. Measurement signals can be output to the controller 122, to a component-specific controller associated with the regulator or control valve, or the like or any combination thereof. Based on the received measurement signal, the controller (whether the controller 122 or the component-specific controller associated with the regulator or control valve) can then output a control signal to the regulator and/or to the control valve to increase the pressure within the pocket 1606 when the measurement signal indicates that the power of the beam of laser energy has, for example, increased beyond a predetermined threshold power, has a predetermined wavefront, etc.

Referring back to FIGS. 16 and 16A, the geometry of the membrane region 1608 can, in one embodiment, be configured to ensure that coefficients for one or more of the aforementioned fringe Zernike terms which can be used to characterize the shape of the reflective surface 1602 have a linear (or at least a substantially linear or otherwise very linear) dependence on the pressure within the pocket 1606. Generally, the pressure within the pocket 1606 can vary from 0 psi (or thereabout) to 85 psi (or thereabout). In another embodiment, the geometry of the membrane region 1608 can be configured to ensure that the ratio between coefficients for at least two of the aforementioned fringe Zernike terms which can be used to characterize the shape of the reflective surface 1602 (also referred to herein as the "compensation ratio") is within a predetermined range. For example, geometry of the membrane region 1608 can be configured to ensure that the compensation ratio of the coefficient for the $Z_9$ term to the coefficient for the $Z_4$ term (i.e., $Z_9$:$Z_4$) is in a range from −0.1 to −0.3 (e.g., in a range from −0.15 to −0.25, in a range from −0.18 to −0.23, in a range from −0.19 to −0.22, in a range from −0.19 to −0.21 or the like). The compensation ratio may vary within the aforementioned range based on the pressure within the pocket 1606, or may be constant (or at least substantially constant) irrespective of the pressure within the pocket 1606.

In view of the above, the membrane region 1608 can be at least substantially circular when viewed in plan view (i.e., as shown in FIG. 16), and a central portion of the membrane region 1608 can have a first thickness, t1, that is less than a second thickness, t2, of a peripheral portion of the membrane region 1608. The membrane region 1608 can be characterized as having a first radius, r1, and the aforementioned central portion of the membrane region 1608 (i.e., the portion of the membrane region 1608 having the first thickness, t1) can be characterized as having a second radius, r2. The first thickness, t1, can be in a range from 0.8 mm (or thereabout) to 0.3 mm (or thereabout), e.g., 0.5 mm (or thereabout). The second thickness, t2, can be in a range from 1.0 mm (or thereabout) to 2.0 mm (or thereabout), e.g., 1.5 mm (or thereabout). The first radius, r1, can be in a range from 3.0 mm (or thereabout) to 4.0 mm (or thereabout), e.g., 3.5 mm (or thereabout). The second radius, r2, can be in a range from 16.0 mm (or thereabout) to 18.0 mm (or thereabout), e.g., 17.0 mm (or thereabout). Generally, the mirror 1600 itself can be characterized as having a third radius, r3, that is greater than the second radius r2, and the peripheral region 1610 of the mirror 1600 will have a third thickness, t3, that is much greater than the second thickness, t2. For example, the third radius, r3, can be in a range from 24 mm (or thereabout) to 26 mm (or thereabout) (e.g., 25 mm, or thereabout) and the third thickness, t3, can be in a range from 8 mm (or thereabout) to 10 mm (or thereabout) (e.g., 10 mm, or thereabout). FIG. 16A illustrates small radii (e.g., radii within regions enclosed by the dashed circles) where two different surfaces would otherwise meet. These radii can reduce the stress on the mirror substrate at these regions, and reduce the likelihood that cracks will form and propagate from these regions. The presence of the radii can be expected to increase the longer service life of the mirror 1600 in terms of the number of on-and-off pressure cycles that the mirror 1600 can withstand before permanently changing the shape of the mirror.

In one embodiment, the mirror 1600 is formed by obtaining a disk-shaped body (e.g., having front and back surfaces that are, at least, generally parallel to one another) and then machining the body from the back surface to form the pocket 1606 which, as illustrated, includes a first cavity 1612 and a second cavity 1614. After forming the pocket 1606, the front surface of the body is polished flat by one or more suitable techniques known in the art (e.g., flat polishing, diamond turning, magnetorheological finishing (MRF), or the like or any combination thereof). Optionally, the polished front surface can be coated with one or more high-reflectance coatings suitable for reflecting a high-power beam of laser energy.

In another embodiment, the mirror 1600 can be formed as discussed above, but instead of machining the body to form the first cavity 1612 and the second cavity 1614, only the first cavity 1612 need be formed to form the membrane region 1608. Subsequently, one or more stiffeners of any suitable shape, stiffness, thickness, and material can be bonded to the surface of the first cavity 1612 opposite the desired reflective surface 1602. The shape, stiffness, thickness, and material of the stiffener(s) can be selected to ensure that the membrane region 1608 deforms in a manner so as to compensate for wavefront distortion (actual wavefront distortion, expected wavefront distortion, or any combination thereof) in the beam of laser energy in the manner discussed above. In another embodiment, the mirror 1600 can be formed by mounting a deformable, reflective membrane to a cylinder.

Constructed as described above, the reflective surface 1602 of the membrane-type deformable mirror 1600 deforms so as to take a shape (or range of shapes) that can be characterized by combinations of radially-symmetric fringe Zernike polynomials such as $Z_4$ and $Z_9$. In other embodiments, the construction of the membrane-type deformable mirror 1600 can be modified in any suitable manner known in the art such that the shape of the reflective surface 1602, once deformed, can be suitably characterized by a single symmetric fringe Zernike polynomial (e.g., $Z_9$).

Figure 18:
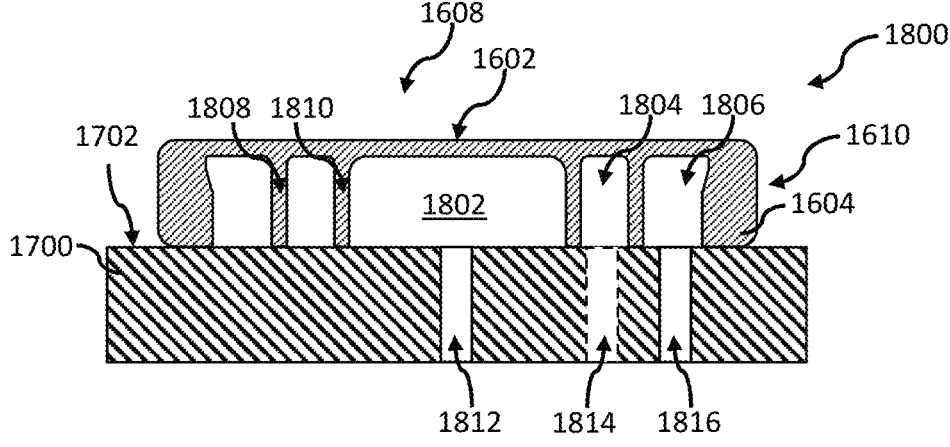
FIGS. 18 and 19 schematically illustrate cross-section views of wavefront compensation optics, according to other embodiments, each coupled to a pedestal.

For example, and with reference to FIG. 18, a membrane-type deformable mirror can be provided as mirror 1800. Mirror 1800 can be provided as similarly discussed with respect to mirror 1600; however, mirror 1800 can include multiple pockets, such as pockets 1802, 1804 and 1806. Pockets 1804 and 1806 are annular in shape, and extend along the perimeter of pocket 1802. The pockets 1802, 1804 and 1806 are radially separated from each other by a pair of annular ribs 1808 and 1810 extending from a back surface of the deformable region 1608. The pockets 1802, 1804 and 1806 (and, thus, the ribs 1808 and 1810) can be formed by any suitable technique (e.g., by machining the back surface of the body from which the mirror 1800 is made). In another embodiment, the pockets 1802, 1804 and 1806 can be formed by first machining a single cavity in the back surface of the body from which the mirror 1800 is made, and then bonding the annular ribs 1808 and 1810 to the back surface of the deformable region 1608.

When mirror 1800 is suitably coupled to a pedestal 1700 (e.g., via an adhesive, one or more welds, one or more clamps, one or more screws, or the like or any combination thereof), the peripheral region 1610 of the mirror 1800, as well as the ribs 1808 and 1810, are biased against or adhered to a surface 1702 of the pedestal 1700. As a result, a plurality of seals are formed, which extend along the peripheries of the pockets 1802, 1804 and 1806 (i.e., where one or more ribs are biased against or adhered to surface 1702, and where the peripheral region 1610 is biased against or adhered to surface 1702).

As shown in FIG. 18, the pedestal 1700 is provided with a first bore 1812, an optional second bore 1814 and a third bore 1816. The first bore 1812 is in fluid communication with the pocket 1802, the second bore 1814 (if present) is in fluid communication with the pocket 1804 and the third bore 1816 is in fluid communication with the pocket 1806. Control of the pressure within pocket 1802 and pocket 1806 can be effected using one or more hoses (e.g., connected to each of the first bore 1812 and the third bore 1816) and one or more control elements (e.g., connected to a hose) as exemplarily described above. If present, the second bore 1814 is open to the external environment such that the pocket 1804 is in fluid communication with the ambient environment outside the pocket 1804. In one embodiment, the pressure within pocket 1802 can be controlled independently of the pressure within the pocket 1806. In another embodiment, the pressure within pocket 1802 can be controlled in a manner that is dependent upon the pressure within the pocket 1806, or vice-versa. For example, the first bore 1812 can be coupled to a different control element than the second bore 1816. In another example, the first bore 1812 and the second bore 1816 can be commonly coupled to the same control element which, in turn, is operable to pressurize or depressurize the pocket 1802 relative to the pocket 1806, or vice-versa, or is operable to commonly pressurize or depressurize the pocket 1802 and the pocket 1806.

When the pockets 1802 and 1806 are not sufficiently pressurized (e.g., when the pressure within the pockets 1802 and 1806 is equal to the ambient pressure of the external environment outside the pockets 1802 and 1806), the reflective surface 1602 is substantially planar. When the pockets 1802 and 1806 are sufficiently pressurized (e.g., when the pressure within each of pocket 1802 and 1806 is greater than the ambient pressure of the environment outside the pocket 1804, by a predetermined threshold amount), the portions of the membrane region 1608 exposed by the pockets 1802 and 1806 are convexly deformed (e.g., so as to bow outward, away from the surface 1702 of pedestal 1700), causing the portion of the membrane region 1608 exposed by the pocket 1804 to be concavely deformed (e.g., so as to bow inwardly, toward the surface 1702 of pedestal 1700). In this case, the connections between the membrane region 1608 and the ribs 1808 and 1810 act as annular fulcrums, permitting convex deformations of the membrane region 1608 at locations corresponding the pockets 1802 and 1806 to induce concave deformation of the membrane region 1608 at a location corresponding the pocket 1804. The geometry of the mirror 1800 can be thus configured to ensure that, as the shape of the reflective surface 1602 changes, the coefficient for the fringe Zernike term $Z_9$ changes so as to compensate for spherical aberration in the beam of laser energy.

Figure 19:
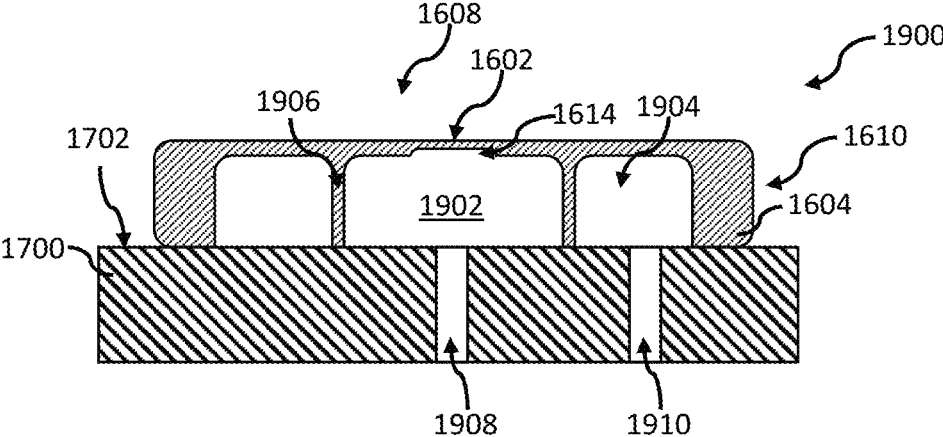

In another embodiment, and with reference to FIG. 19, a membrane-type deformable mirror can be provided as mirror 1900. Mirror 1900 can be provided as similarly discussed with respect to mirror 1800; however, mirror 1900 includes only a single annular rib 1906 to define a pair of pockets (i.e., pocket 1902 and pocket 1904). Pocket 1904 is annular in shape, and extends along the perimeter of pocket 1902. The pockets 1902 and 1904 (and, thus, the rib 1906) can be formed by any suitable technique (e.g., as discussed above with respect to mirror 1800).

When mirror 1900 is suitably coupled to a pedestal 1700 (e.g., via an adhesive, one or more welds, one or more clamps, one or more screws, or the like or any combination thereof), the peripheral region 1610 of the mirror 1900 and the rib 1906 are biased against or adhered to a surface 1702 of the pedestal 1700. As a result, a plurality of seals are formed, which extend along the peripheries of the pockets 1902 and 1904.

As shown in FIG. 19, the pedestal 1700 is provided with a first bore 1908 and a second bore 1910. The first bore 1908 is in fluid communication with the pocket 1902 and the second bore 1910 is in fluid communication with the pocket 1904. Control of the pressure within pockets 1902 and 1904 can be effected using one or more hoses (e.g., connected to each of the first bore 1908 and the second bore 1910) and one or more control elements (e.g., connected to a hose) as exemplarily described above. In one embodiment, the pressure within pocket 1902 can be controlled independently of the pressure within the pocket 1910, or vice-versa. In another embodiment, the pressure within pocket 1902 can be controlled in a manner that is dependent upon the pressure within the pocket 1904, or vice-versa. For example, the first bore 1908 can be coupled to a different control element than the second bore 1910. In another example, the first bore 1908 and the second bore 1910 can be commonly coupled to the same control element which, in turn, is operable to pressurize or depressurize the pocket 1902 relative to the pocket 1904, or vice-versa, or is operable to commonly pressurize or depressurize the pocket 1902 and the pocket 1904.

When the pockets 1902 and 1904 are not sufficiently pressurized (e.g., when the pressure within the pockets 1902 and 1904 is equal to the ambient pressure of the external environment outside the pockets 1902 and 1904), the reflective surface 1602 is substantially planar. When the pockets 1902 and 1904 are sufficiently pressurized (e.g., when the pressure within each of pocket 1902 and 1904 is greater than the ambient pressure of the environment outside the pockets 1902 and 1904, by a predetermined threshold amount), the portions of the membrane region 1608 exposed by the pockets 1902 and 1904 are convexly deformed (e.g., so as to bow outward, away from the surface 1702 of pedestal 1700). In this case, the connection between the membrane region 1608 and the rib 1906 acts as an annular fulcrum, permitting the aforementioned convex deformations of the membrane region 1608 to induce the aforementioned concave deformation of the membrane region 1608 at the rib 1906. The geometry of the mirror 1900 can be thus configured to ensure that, as the shape of the reflective surface 1602 changes, the coefficient for the fringe Zernike term $Z_9$ changes so as to compensate for spherical aberration in the beam of laser energy.

It will be appreciated that any of the aforementioned membrane-type deformable mirrors, formed and constructed in the manner described above, can be modified in any suitable manner known in the art such that the shape of the reflective surface 1602, once deformed, can take on a wide variety of shapes—not just shapes defined by combinations of the radially-symmetric fringe Zernike polynomials discussed above. For example, the pockets of the membrane-type deformable mirrors described with respect to FIGS. 16, 18 and 19 are radially-symmetric. If a membrane-type deformable mirror is modified to have a pocket that is non-radially-symmetric, then the shape of the reflective surface 1602, once deformed, will not be radially-symmetric.

ii. Embodiments Concerning Use of Optical Relay Systems, Generally

Generally, wavefront aberrations induced by thermal lensing within a transmissive optical component occur at a specific location within the transmissive optical component, which can be approximated by a plane herein referred to as the "object plane" or the "first plane." Ideally, the wavefront aberrations are corrected at the object plane (i.e., where they are created). However this is usually not physically possible. Accordingly, the object plane is re-imaged to another plane (hereinafter referred to as the "image plane," or "second plane") located outside the transmissive optical component, and a wavefront compensation optic is located at the image plane to compensate for wavefront aberrations (e.g., in the manner discussed above).

Accordingly the beam path assembly can, in some embodiments, include an optical relay system arranged within the beam path 114 to relay or re-image the object plane to the wavefront compensation optic (i.e., to place the image plane onto the wavefront compensation optic). Generally, the optical relay system can include any number of optical components (e.g., one or more mirrors, one or more lenses, or the like or any combination thereof). The configuration and arrangement of optical components within the optical relay system can be provided, as is known in the art, in order to ensure that the size of the image of an object at the image plane is different from (e.g., larger than, or smaller than) the size of the actual object at the object plane.

a. Example Embodiments Concerning Optical Relay Systems

Figure 20:
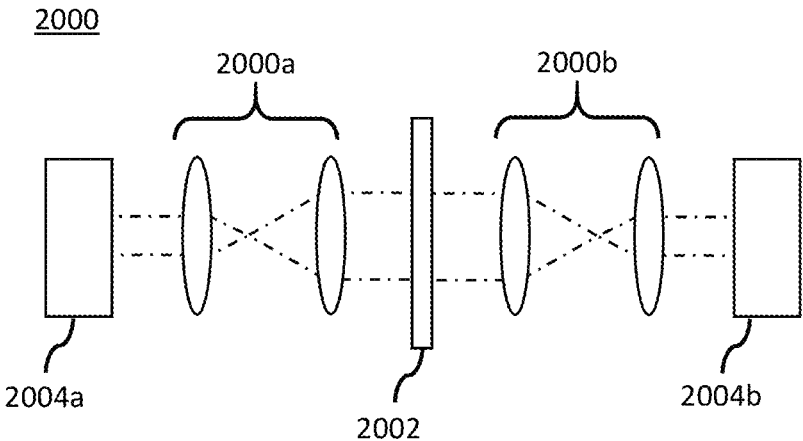
FIGS. 20, 21, 22, 23 and 24 illustrate optical relay systems, according to some embodiments.

Referring to FIG. 20, an optical relay system, such as optical system 2000, can include a first optical relay 2000*a*, a second optical relay 2000*b*, or a combination of the first optical relay 2000*a* and second optical relay 2000*b*. The optical relay system 2000 is incorporated within a beam path assembly that includes a wavefront compensation optic 2002 and one or both of a first optical component 2004*a* and a second optical component 2004*b*. Generally, at least one of the first optical component 2004*a* and the second optical component 2004*b* represents an optical component that can distort the wavefront of an incident beam of laser energy due to thermal lensing (e.g., as discussed above). Thus, the wavefront compensation optic 2002 can be configured to compensate for actual wavefront distortion accumulated by the beam of laser energy as a result of thermal lensing within the first optical component 2004*a*, to compensate for expected wavefront distortion to be accumulated by the beam of laser energy as a result of thermal lensing within the second optical component 2004*b*, or a combination thereof. The wavefront compensation optic 2002 can be provided as a static wavefront compensation optic, a dynamic wavefront compensation optic, or the like or any combination thereof. Generally, however, the wavefront compensation optic 2002 is transmissive to a beam of laser energy incident thereto, and is configured to transmit the incident beam of laser energy.

As exemplarily illustrated, each of the first optical relay 2000*a* and the second optical relay 2000*b* is provided as a set of lenses. Although FIG. 20 illustrates each of the first optical relay 2000*a* and the second optical relay 2000*b* as not including any optical component between the lenses, there may, in other embodiments, be one or more optical components (e.g., a mirror, etc.) interposed between the lenses of one or both of the first optical relay 2000*a* and the second optical relay 2000*b*. The first optical relay 2000*a* is arranged and configured to relay an image of the beam of laser energy at a first object plane (i.e., at a plane within the first optical component 2004*a*) onto a first image plane (i.e., at a plane located at or within the wavefront compensation optic 2002) such that the relayed image of the beam of laser energy is larger at the first image plane than it is at the first object plane. The second optical relay 2000*b* is arranged and configured to relay an image of the beam of laser energy at a second object plane (i.e., at a plane within the wavefront compensation optic 2002, which may be the same as the first image plane) onto a second image plane (i.e., at a plane located at or within the second optical component 2004*b*) such that the relayed image of the beam of laser energy is smaller at the second image plane than it is at the second object plane. In one embodiment, the first optical relay 2000*a* and the second optical relay 2000*b* are arranged and configured such that the size of the relayed image of the beam of laser energy at the second image plane is the same as the size of the image of the beam of laser energy at the first object plane. In other embodiments, the first optical relay 2000*a* and the second optical relay 2000*b* may be arranged and configured such that the size of the relayed image of the beam of laser energy at the second image plane is larger than, or smaller than, the size of the image of the beam of laser energy at the first object plane.

Figure 21:
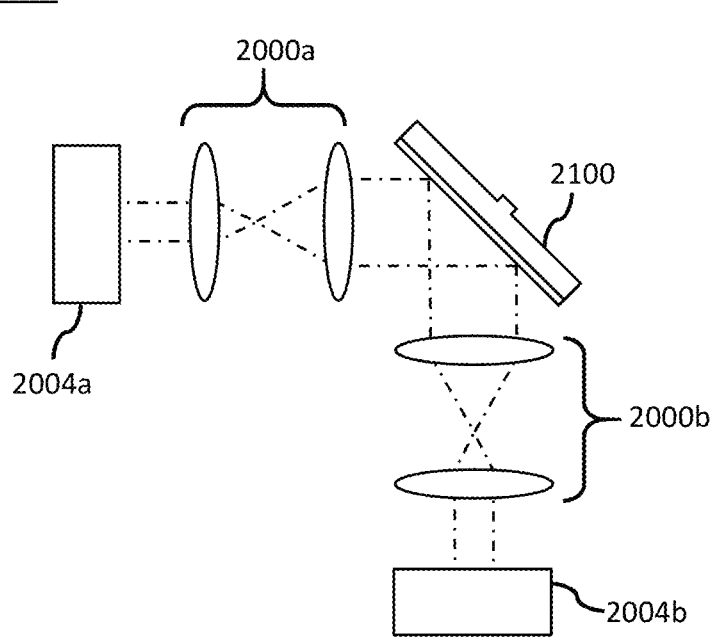

Referring to FIG. 21, the aforementioned optical relay system 2000 may be incorporated within a beam path assembly that includes one or both of the first optical component 2004*a* and the second optical component 2004*b*, but includes a wavefront compensation optic 2100 instead of wavefront compensation optic 2002. Like the wavefront compensation optic 2002, the wavefront compensation optic 2100 can be configured to compensate for actual wavefront distortion accumulated by the beam of laser energy as a result of thermal lensing within the first optical component 2004a, to compensate for expected wavefront distortion to be accumulated by the beam of laser energy as a result of thermal lensing within the second optical component 2004b, or a combination thereof. Moreover, the wavefront compensation optic 2100 can be provided as a static wavefront compensation optic, a dynamic wavefront compensation optic, or the like or any combination thereof. However in the illustrated embodiment, the wavefront compensation optic 2100 is configured to reflect the beam of laser energy incident thereto (as opposed to transmitting the incident beam of laser energy). In this embodiment, the wavefront compensation optic 2100 can be a membrane-type deformable mirror provided in any suitable manner (e.g., exemplarily described above).

According to the embodiments exemplarily shown in FIGS. 20 and 21, the first optical relay 2000a and the second optical relay 2000b are provided wholly separate components. That is, the first optical relay 2000a and the second optical relay 2000b do not physically incorporate a common component (e.g., a lens, a mirror, etc.). In other embodiments, however, the first optical relay 2000a and the second optical relay 2000b can incorporate one or more common components (e.g., a lens, a mirror, or the like or any combination thereof). For example, and with reference to FIG. 22, an optical relay system, such as optical relay system 2200, can include a first optical relay 2200a and a second optical relay 2200b. In this case, the first optical relay 2200a incorporates a first lens 2202 and a second lens 2204, and the second optical relay 2200b incorporates the second lens 2204 and a third lens 2206. The optical relay system 2200 is incorporated within a beam path assembly that includes a wavefront compensation optic (e.g., the aforementioned wavefront compensation optic 2100) and one or both of the first optical component 2004a and the second optical component 2004b.

The first optical relay 2200a is arranged and configured to relay an image of the beam of laser energy (e.g., propagating along beam path 114) at a first object plane (i.e., at a plane within the first optical component 2004a) onto a first image plane (i.e., at a plane located at or within the wavefront compensation optic 2100) such that the relayed image of the beam of laser energy is larger at the first image plane than it is at the first object plane. The second optical relay 2200b is arranged and configured to relay an image of the beam of laser energy at a second object plane (i.e., at a plane within the wavefront compensation optic 2100, which may be the same as the first image plane) onto a second image plane (i.e., at a plane located at or within the second optical component 2004b) such that the relayed image of the beam of laser energy is smaller at the second image plane than it is at the second object plane. In one embodiment, the first optical relay 2200a and the second optical relay 2200b are arranged and configured such that the size of the relayed image of the beam of laser energy at the second image plane is the same as the size of the image of the beam of laser energy at the first object plane. In other embodiments, the first optical relay 2200a and the second optical relay 2200b may be arranged and configured such that the size of the relayed image of the beam of laser energy at the second image plane is larger than, or smaller than, the size of the image of the beam of laser energy at the first object plane.

Figure 22:
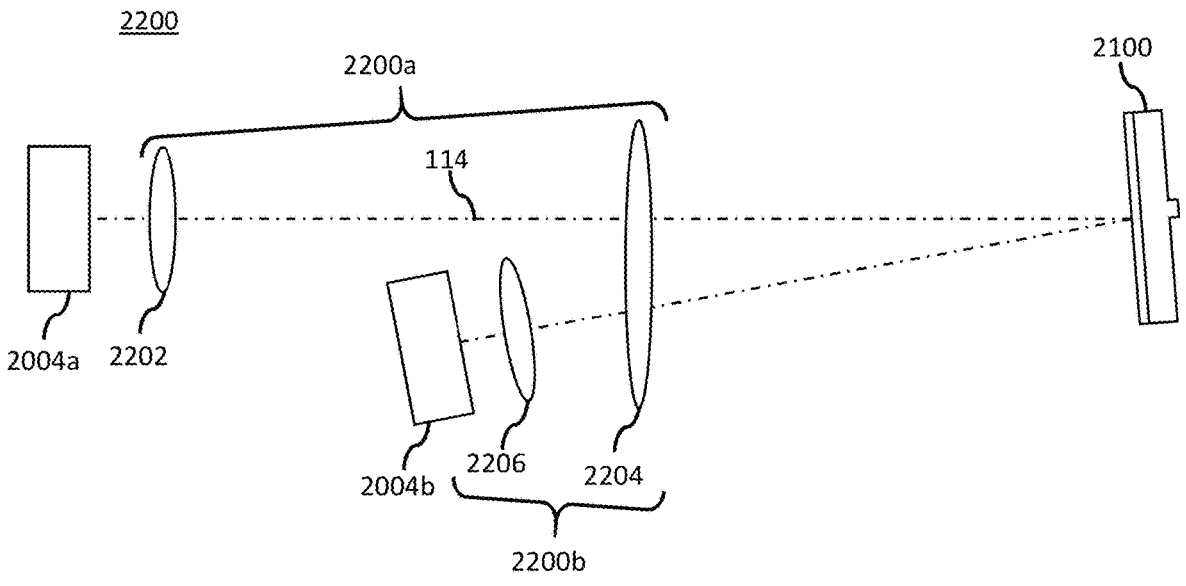

Although FIG. 22 illustrates each of the first optical relay 2200a and the second optical relay 2200b as not including any optical component between the lenses, there may, in other embodiments, be one or more optical components (e.g., a mirror, etc.) interposed between the lenses of one or both of the first optical relay 2200a and the second optical relay 2200b. For example, and with reference to FIG. 23, the aforementioned optical relay system 2200 may be modified (thus yielding optical relay system 2300) to incorporate a plurality of mirrors (e.g., mirrors 2302 and 2304) located along the beam path 114 between the second lens 2204 and the third lens 2206.

Generally, one or both of the first optical component 2004a and the second optical component 2004b shown in any of FIGS. 20, 21, 22, 23 and 24 can be provided as one or more of any of the aforementioned transmissive optical components, a laser gain medium, or the like or any combination thereof. In one embodiment, at least one of the first optical component 2004a and the second optical component 2004b is provided as an AO cell (e.g., formed of crystalline Ge, GaAs, $PbMoO_4$, $TeO_2$, crystalline quartz, glassy $SiO_2$, $As_2S_3$, $LiNbO_3$, etc.), or the like, of any of the AOD systems discussed above. For example, the first optical component 2004a can be provided as an AO cell of the aforementioned first AOD 402 and the second optical component 2004b can be provided an AO cell of the aforementioned second AOD 404. Thus, the first optical component 2004a can be considered as being part of the first AOD 402 and the second optical component 2004b can be considered as being part of the second AOD 404. In one specific example, the AO cells of the first AOD 402 and the second AOD 404 can both be formed of the same material (e.g., Ge, GaAs, $PbMoO_4$, $TeO_2$, quartz, $SiO_2$, $As_2S_3$, $LiNbO_3$, or the like or any combination thereof). In such a case, and although not illustrated, one or more additional optical components such as a phase retarder may be provided (e.g., for purposes discussed above) so as to be arranged within the beam path (e.g., within the beam path 114 shown in any of FIG. 22 or 23 or within the beam path 114' shown in FIG. 24) between the first optical component 2004a and the second optical component 2004b. For example, one or more phase retarders, such as those discussed above, may be arranged within the beam path at a location between the first optical component 2004a and the first lens 2202, at a location between the second optical component 2004b and the third lens 2206, at a location between the first lens 2202 and the third lens 2206, or the like or any combination thereof.

Figure 23:
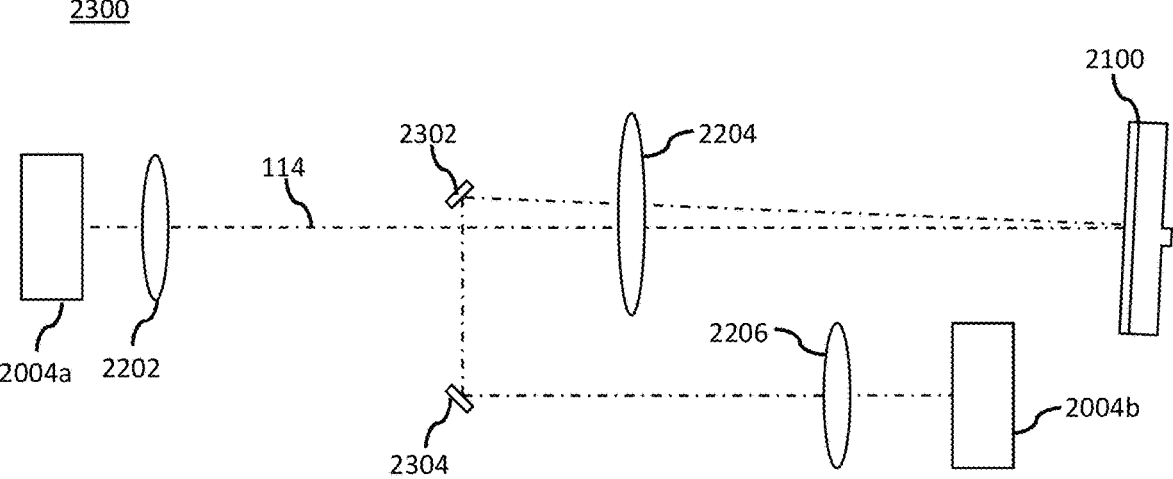

When the first optical component 2004a and the second optical component 2004b are provided as AO cells of the aforementioned first AOD 402 and second AOD 404, respectively, the beam path 114 shown in FIG. 23 as propagating from the first optical component 2004a may correspond to the first-order beam 114' propagating from the first AOD 402 (e.g., as shown in FIG. 4) and a beam dump (not shown) may be provided to absorb the zeroth-order beam (also not shown) that would also propagate from the first optical component 2004a. In another embodiment, the zeroth-order beam may be allowed to propagate from the first optical component 2004a to the second optical component 2004b (e.g., as shown in FIG. 24).

Figure 24:
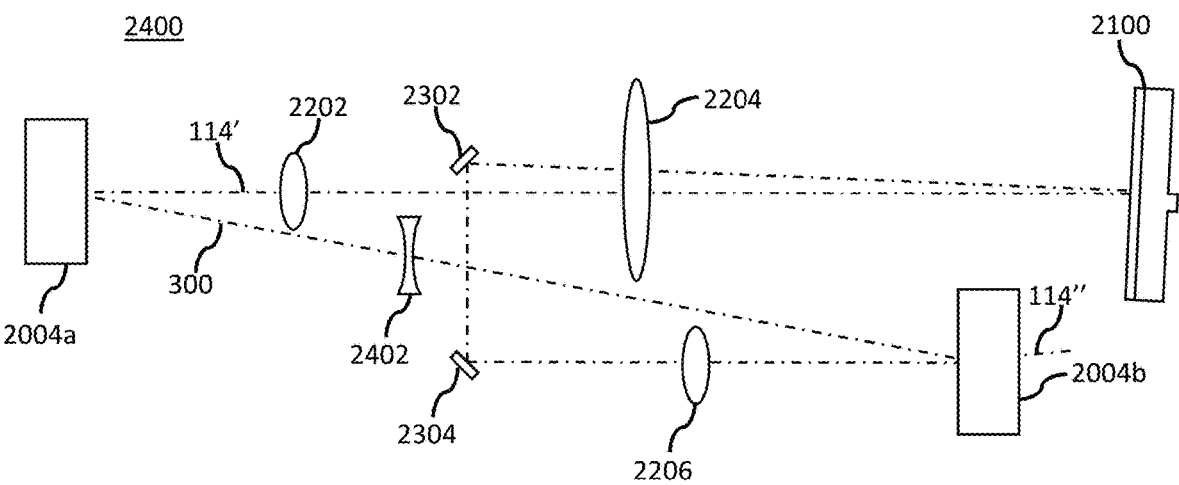

Referring to FIG. 24, the arrangement and configuration of the lenses 2202, 2204 and 2206, in addition to the arrangement and configuration of the mirrors 2302 and 2304, is provided such that the magnitude and direction of the angular difference between the first order beam path 114 and the zeroth-order beam path 300 within the second optical component 2004b are the same (or at least substantially the same) as they would be if all intervening optics were removed and the second optical component 2004*b* was simply arranged at the optical output of the first optical component 2004*a*. This can be useful in facilitating the capture and absorption (i.e., trapping) of laser energy propagating along unwanted beam paths from the second optical component 2004*b* (e.g., using a beam dump system as exemplarily described above).

As exemplarily shown in FIG. 24, the zeroth-order beam path 300 does not follow the same sequence of optical components as the first-order beam path 114'. That is, the zeroth-order beam path 300 doesn't propagate through the optical relay system 2300 and doesn't get reflected by the wavefront compensation optic 2100, whereas the first-order beam path 114' does. Thus, the thermal lensing effects accumulated by the first-order beam in the first optical component 2004*a* (which can include focusing effects, among other distortions, as discussed above) are compensated for by the time the first-order beam reaches the second optical component 2004*b*, whereas the thermal lensing effects accumulated by the zeroth-order beam in the first optical component 2004*a* (which can also include focusing effects) remain uncompensated for by the time the zeroth-order beam reaches the second optical component 2004*b*. As a result, the zeroth-order beam propagating from the first optical component 2004*a* would be significantly smaller than the first-order beam by the time the two beams reach the second optical component 2004*b*. To compensate for this difference, the optical relay system 2300 may be modified (thus yielding the optical relay system 2400) to include a lens 2402 (e.g., a single diverging lens) arranged within the zeroth-order beam path 300 propagating from the first optical component 2004*a* to adjust the size zeroth-order beam that ultimately propagates to the second optical component 2004*b*. In one embodiment, the position and/or orientation of the lens 2402 may be adjustable so as to shift the location where the zeroth-order beam is incident upon the second optical component 2004*b*.

While the embodiment discussed with respect to FIG. 24 provides a zeroth-order beam path 300 that does not follow the same sequence of optical components as the first-order beam path 114', it will be appreciated that, in an alternative embodiment, the zeroth-order beam path 300 can follow the same sequence of optical components as the first-order beam path 114'. For example, one or more optical elements (e.g., one or more mirrors) may be provided to direct the zeroth-order beam path 300, upon exiting the first optical component 2004*a*, through the first lens 2202 along a direction at least generally parallel with the first-order beam path 114' (e.g., so that the zeroth-order beam path 300 propagates sequentially through the second lens 2204, to the wavefront correction optic 2100, to the mirror 2302, to the mirror 2304, through the third lens 2206, and to the second optical component 2004*b*). In this case, the lens 2402 may be omitted from the beam path assembly. In another example, the size and arrangement of one or more of the first lens 2202, the second lens 2204, wavefront correction optic 2100, mirror 2302, mirror 2304 and third lens 2206 may be adjusted so as to be in both the zeroth-order beam path 300 and the first-order beam path 114'.

E. Embodiments Concerning Mounting of Optical Components

Any of the aforementioned optical components, such as a lens, window, phase retarder, filter, mirror, etc., can be held in position within the beam path assembly using an optical mount. The optical mount, in turn, is typically coupled to a frame or wall of the apparatus 100, an optical breadboard incorporated within the apparatus 100, or the like. Often, the mount is configured to apply one or more compressive forces to the optical component to hold and maintain the position the optical component under a range of environmental conditions. Nevertheless, the optical surfaces of some optical components can be very sensitive to mechanical stress, so much so that even a relatively small compressive force can undesirably deform the optical surface. As used herein, an "optical surface" can refer to a reflective surface (e.g., when the optical component is a mirror), a refractive surface (e.g., when the optical component is a lens, or the like).

One particular class of optical components having optical surfaces that can be especially susceptible to undesirable deformation are membrane-type deformable mirrors. Accordingly, and in one embodiment exemplarily shown in FIG. 25, a mount 2500 for retaining a membrane-type deformable mirror may include a pedestal, such as the pedestal 1700 shown and discussed with respect to FIG. 17, and a mount plate 2502 coupled to the pedestal 1700. The mount plate 2502 is coupled to the pedestal 1700 at a coupling portion 2504 thereof. In one embodiment, the coupling portion 2504 is threaded, and the mount plate 2502 includes an internally-threaded bore configured to mate with the threaded coupling portion 2504. In other embodiments, the coupling portion 2504 is fixed within the bore of the mount plate 2502 by any other coupling means (e.g., adhesive, welding, on or more clamps, one or more screws, etc.). The mount plate 2502 can be coupled to any suitable or known fixed or adjustable optical mount assembly (not shown) in any manner known in the art (e.g., via one or more screws, clamps, springs, adhesives, etc.). In embodiments in which the coupling portion 2504 is screwed into the threaded bore of the mount plate 2502, the mount 2500 can also include a locking nut 2506. The locking nut 2506 can be screwed into the threaded bore of the mount plate 2502 to help lock the coupling portion 2504 within the threaded bore of the mount plate 2502.

In the illustrated embodiment, the membrane-type deformable mirror 1600 is coupled to the pedestal 1700 such that no stress (or no significant stress) is induced within the membrane region 1608 of the mirror 1600. Further, the bore 1704 is shown as extending from the surface 1702 through the entire length of the coupling portion 2504 through which a fluid (e.g., air) can travel through the bore 1704 to pressurize or depressurize the pocket 1606 in the manner discussed above. To facilitate the transfer of fluid through the bore 1704, a fitting 2508 may be inserted into one end of the bore 1704. The fitting 2508 may be configured to be coupled to a hose (e.g., to a first end of a hose, such as a pneumatic hose, a hydraulic hose, etc., as discussed above) in any suitable or known manner.

Figure 17:
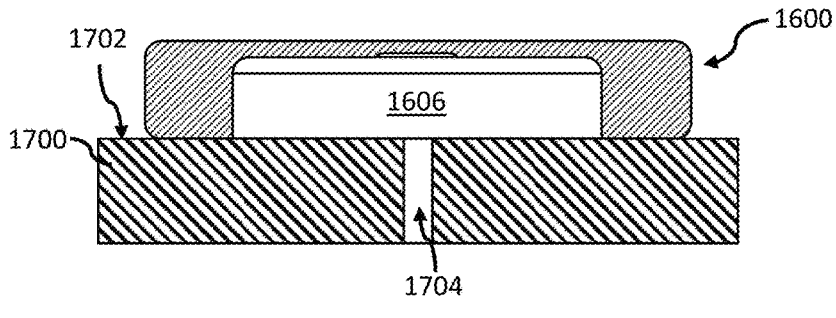
FIG. 17 schematically illustrates a cross-section view of the wavefront compensation optic shown in FIG. 16 coupled to a pedestal, according to one embodiment.
Figure 25:
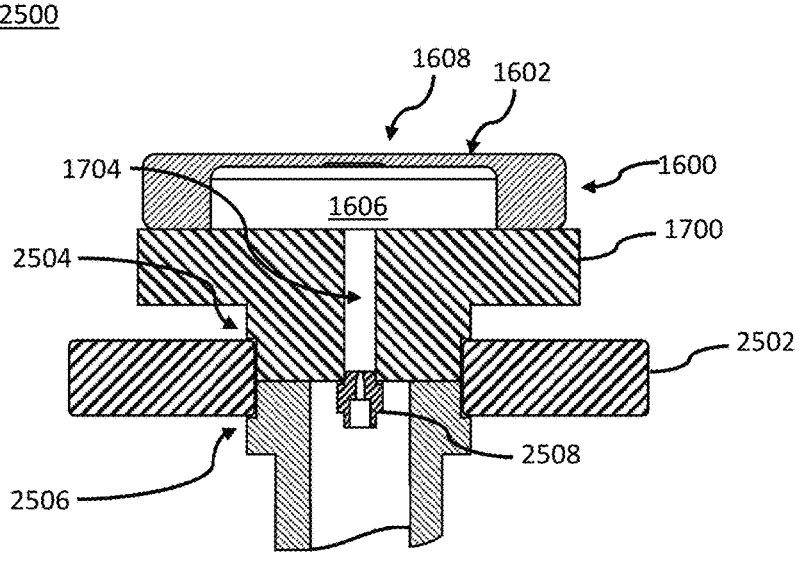
FIG. 25 illustrates an optical mount, according to one embodiment.

Although FIG. 25 illustrates the mount 2500 as being coupled to the pedestal 1700 shown in FIG. 17 (i.e., for securing the mirror 1600), it will be appreciated that the mount 2500 may be coupled to any other pedestal to secure the mirror 1600 or any other membrane-type deformable mirror. For example, the mount 2500 may be coupled to the pedestal 1700 shown in FIG. 18 (i.e., for securing the mirror 1800) or to the pedestal 1700 shown in FIG. 19 (i.e., for securing the mirror 1900). Furthermore, although the mount 2500 has been discussed above as including a pedestal for use in securing a membrane-type deformable mirror, it will be appreciated that the mount 2500 may include any other suitable pedestal for use in securing any other optical component.

F. Embodiments Concerning Compensation for Wavelength Dispersion, Generally

It should be recognized that AODs are spectrally-dispersive elements and, consequently, the angle by which a beam of laser energy is deflected by the AOD will be dependent upon the wavelength of the beam of laser energy. If the spectral linewidth of a beam of laser energy incident upon the AOD is too large, then diffraction of the incident beam within the AOD will yield a deflected beam of laser energy that can be undesirably spatially distorted (which can result in an undesirably distorted, e.g., elongated, process spot at the workpiece 102) or spatially decomposed into many beamlets of different wavelengths or spectral linewidths. For laser-processing applications such as those discussed above, it thus is desirable that the beam of laser energy ultimately incident upon an AOD in the first positioner 106 have a spectral linewidth that is suitably narrow to minimize or avoid the aforementioned deleterious effects of intra-AOD diffraction events on wide-linewidth beams of laser energy. Spectral linewidth can be measured based on, for example, the full-width at half-maximum (FWHM) of the optical power spectral density in the beam of laser energy).

The spectral linewidth of beams of laser energy produced by many conventional laser sources 104 operative to generate laser output within the ultra-violet, visible, or NIR ranges of the electromagnetic spectrum is suitably narrow for laser-processing applications. Laser sources 104 such as high-power CW gas lasers (e.g., carbon dioxide or carbon monoxide CW lasers with an average power greater than about 300 W) and other low-power CW or pulsed gas lasers (e.g., with an average power less than about 300 W) can, in some cases, generate laser pulses having spectral linewidths in the SWIR, MWIR or LWIR ranges that are suitably narrow for laser-processing applications. In these cases, the narrow spectral linewidth output by such gas lasers is achieved by incorporating one or more spectrally-selective devices (e.g., an etalon or a grating) within the laser resonator of the laser source 104.

In some embodiments, however, the spectral linewidth of the beam of laser energy ultimately incident upon an AOD will not be suitably narrow for laser-processing applications. For example, a beam of laser energy generated by a gas laser (e.g., a high- or low-power CW or pulsed carbon dioxide or carbon monoxide gas laser) lacking an adequate spectrally-selective device can generate a beam of laser energy having an undesirably wide spectral linewidth. When an AOD (e.g., incorporating an AO cell formed of crystalline germanium) is used to deflect such a beam, the AOD will yield a deflected beam of laser energy that can be undesirably spatially distorted or spatially decomposed as discussed above. In such embodiments, the beam path assembly can include one or more wavelength dispersion compensators (each also referred to herein simply as a "dispersion compensator") disposed in the beam path 114. Generally, a dispersion compensator can be provided as a prism, a grating, or the like or any combination thereof. It will be appreciated that the configuration of the dispersion compensator will vary depending upon one or more factors such as the wavelengths in the beam of laser energy propagating along the beam path 114, the beam size of the beam of laser energy, and the like. For example, when the beam of laser energy propagating along the beam path 114 has wavelengths in the infrared range of the electromagnetic spectrum (e.g., in the MWIR or LWIR ranges, spanning wavelengths in the range from 3 μm (or thereabout) to 15 μm (or thereabout), or the like), the dispersion compensator may be provided as a dispersion prism formed of a material such as fused silica, silicon, calcium fluoride, magnesium fluoride, germanium, zinc selenide, zinc sulfide, potassium bromide, sapphire, sodium chloride, or the like.

i. Example Embodiments Concerning Dispersion Compensators

Figure 26:
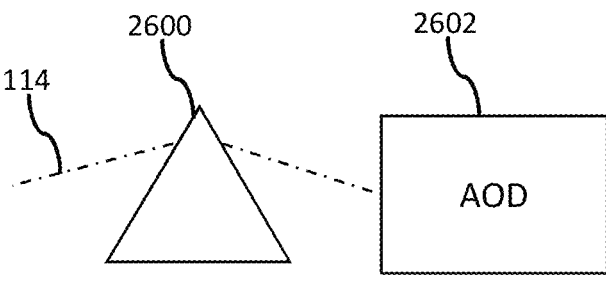
FIGS. 26, 27, 28 and 29 schematically illustrate beam path assemblies incorporating dispersion compensators, according to some embodiments.

In one embodiment, and with reference to FIG. 26, the dispersion compensator 2600 is disposed in the beam path 114 at a location optically upstream of an AOD 2602. Generally, the dispersion compensator 2600 should be oriented so as to disperse the beam of laser energy in a plane that is parallel (or at least generally or substantially parallel to) the plane of deflection of the AOD 2602. In the embodiment illustrated in FIG. 26, the AOD 2602 is an AOD of the first positioner 106 (e.g., the first AOD 402 or the second AOD 404).

Figure 27:
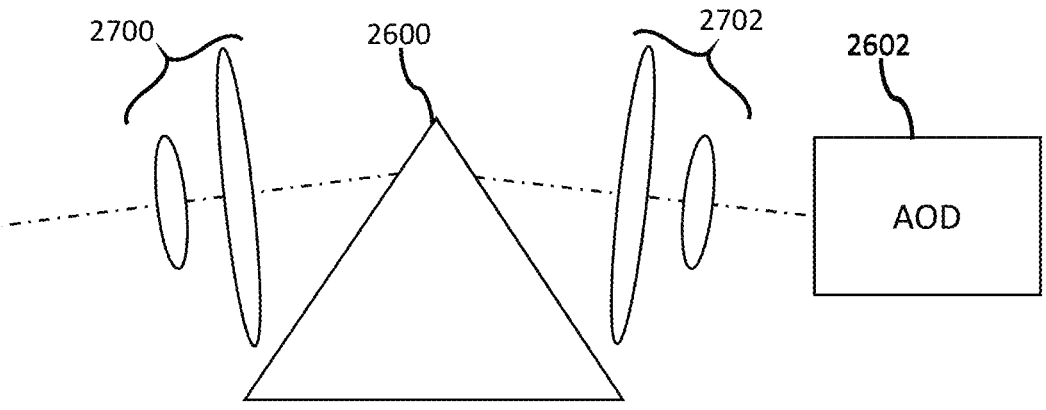

In another embodiment, and with reference to FIG. 27, the dispersion compensator 2600 is disposed in the beam path 114 at a location optically upstream of an AOD 2602, and between components of an optical relay system. For example, the optical relay system may include a first beam expander 2700 arranged at a location optically upstream of the dispersion compensator 2600, and a second beam expander 2702 arranged at a location optically downstream of the dispersion compensator 2600. The first beam expander 2700 is arranged and configured to magnify the beam of laser energy propagating along the beam path 114 (e.g., from a first beam size to a second beam size, greater than the first beam size) and the second beam expander 2702 is arranged and configured to minify (or "demagnify") the beam of laser energy propagating along the beam path 114 from the dispersion compensator 2600 (e.g., from the second beam size, or thereabout, to the first beam size, or to a third beam size). The third beam size may be less than the second beam size, and either less than or greater than the first beam size. As with the embodiment illustrated in FIG. 26, the AOD 2602 illustrated in FIG. 27 is an AOD of the first positioner 106 (e.g., the first AOD 402 or the second AOD 404). If the beam size magnification provided by the first beam expander 2700 is sufficiently large, then the design specifications of the dispersion compensator 2600 can be beneficially relaxed (generally reducing the cost for producing the dispersion compensator 2600).

In some cases, the first-order beam of laser energy diverges as it propagates along beam path 114'. Accordingly, the beam size of a first-order beam of laser energy at a first location along the first-order beam path 114' (e.g., at an optical input of a second positioner 108) can be greater than the beam size of the beam of laser energy at a surface of the AOD 2602 (e.g., when the AOD 2602 is the aforementioned first AOD 402). In such a case, and with reference to FIG. 28, the dispersion compensator 2600 can be disposed in the beam path 114 at a location optically downstream of an AOD 2602. In the embodiment illustrated in FIG. 28, the AOD 2602 is the second AOD 404 of the first positioner 106; accordingly, the beam path 114 corresponds to the first-order beam path 114". Accordingly, the illustrated distance "d" (also referred to herein as "path length") represents the magnitude of the length along the beam path 114 (e.g., the first-order beam path 114") between the optical output of the second AOD 404 and the optical input of the second beam positioner 108 (e.g., second positioner 108a or second positioner 108b). Generally, the distance "d" can be in a range from 1 m (or thereabout) to 5 m (or thereabout). It will be appreciated, however, that the distance "d" can be shortened if, for example, one or more defocusing elements (e.g., one or more suitable lenses, mirrors, etc.) are inserted into the beam path 114.

Figure 28:
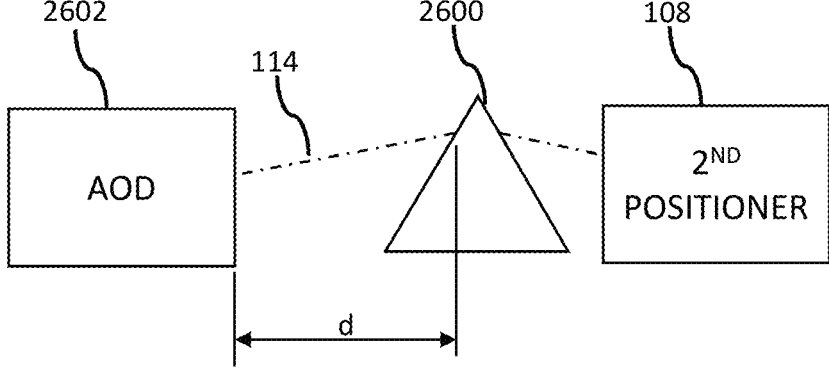

In the embodiments illustrated in FIGS. 26 to 28, the dispersion compensator 2600 is provided as a dispersive prism (e.g., an equilateral dispersive prism), but it will be appreciated that any other suitable prism geometry (e.g., a right-angle prism), or another type of dispersion compensator such as a grating, may be used.

In embodiments in which the apparatus 100 includes a plurality of second positioners 108 (e.g., second positioners 108a and 108b, as discussed above with respect to FIG. 1), the beam path assembly of the apparatus 100 may include a corresponding plurality of dispersion compensators 2600. For example, and with reference to FIG. 29, the beam path assembly may include a first dispersion compensator 2600a and a second dispersion compensator 2600b. The first dispersion compensator 2600a is arranged in a beam path 114 that has been deflected within the first primary angular range 116a and the second dispersion compensator 2600b is arranged in a beam path 114 that has been deflected within the second primary angular range 116b. In embodiments in which the beam path 114 is a beam path that has been deflected by the first positioner 106 (i.e., as discussed above with respect to FIG. 4), the beam path 114 corresponds to the aforementioned first-order beam path 114″.

Figure 29:
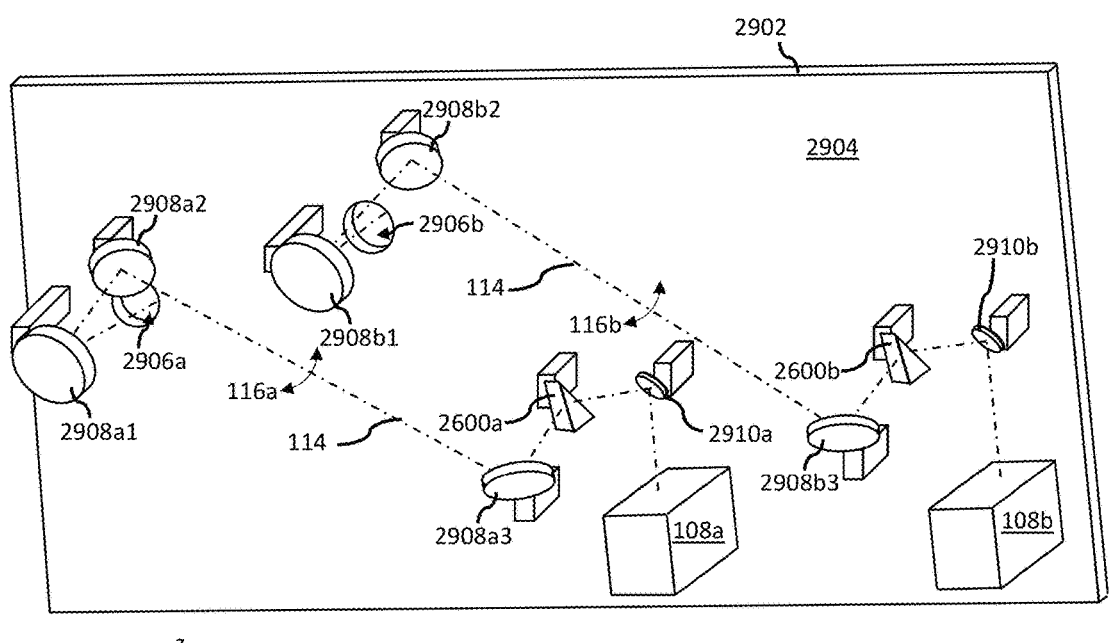

In the embodiment illustrated in FIG. 29, the first dispersion compensator 2600a and second dispersion compensator 2600b are each attached to an optical wall 2902 (e.g., to a first side 2904 thereof). Likewise, the second positioners 108a and 108b may also be attached to the first side 2904 of the optical wall 2902, but this need not be the case. The beam path 114, as deflected by the first positioner 106, may be deflected within the first primary angular range 116a or the second primary angular range 116b. When deflected within the first primary angular range, the beam path 114 is relayed through an optical port (i.e., a first optical port 2906a), formed in the optical wall 2902, where it is thereafter guided (e.g., reflected by a set of first mirrors, such as mirrors 2908a1, 2908a2, and 2908a3, each generically referred to as a "first mirror 2908a") to the first dispersion compensator 2600a. Likewise, when deflected within the second primary angular range 116b, the beam path 114 is relayed through an optical port (i.e., a second optical port 2906b) formed in the optical wall 2902, where it is thereafter guided (e.g., reflected by a set of second mirrors such as mirrors 2908b1, 2908b2, and 2908b3, each generically referred to as a "second mirror 2908b") to the second dispersion compensator 2600b. Upon exiting the first dispersion compensator 2600a, the beam path 114 is guided (e.g., reflected by a mirror 2910a) to the second positioner 108a. Likewise, upon exiting the second dispersion compensator 2600b, the beam path 114 is guided (e.g., reflected by a mirror 2910b) to the second positioner 108b.

In the embodiment illustrated in FIG. 29, each of the mirrors 2908a, 2908b, 2910a and 2910b is attached to the first side 2904 of the optical wall 2902. It will be appreciated, however, that such optical components may be provided in the beam path 114 using any other suitable technique. It will further be appreciated that the beam path assembly illustrated in FIG. 29 may be provided differently (e.g., with a different arrangement of the mirrors 2908a, 2908b, 2910a and 2910b, with a different arrangement of second positioners 108, with more or fewer mirrors than illustrated, or the like or any combination thereof). In one embodiment, the orientation of the first dispersion compensator 2600a (e.g., relative to the first mirror 2908a3)) is different from the orientation of the second dispersion compensator 2600a (e.g., relative to the first mirror 2908b3) to account for differences in dispersion introduced in the first-order beam of laser energy when the first positioner 106 is operated to deflect the beam path 114 within the first primary angular range 116a versus when the first positioner 106 is operated to deflect the beam path 114 within the second primary angular range 116b.

G. Additional Embodiments Concerning the Beam Path Assembly

Although not illustrated in FIG. 29, the apparatus 100 may include one or more mirrors arranged at a second side of the optical board 2902 (opposite the first side 2904), between an optical output of the first positioner 106 and the first optical port 2906a, to guide the beam path 114 deflected within the first primary angular range 116a through the first optical port 2906a. Likewise, the apparatus 100 may include one or more mirrors arranged at the second side of the optical board 2902, between an optical output of the first positioner 106 and the second optical port 2906b, to guide the beam path 114 deflected within the second primary angular range 116b through the second optical port 2906b. Exemplary embodiments concerning a beam path assembly at the second side of the optical board 2902 are discussed with respect to FIG. 30.

Figure 30:
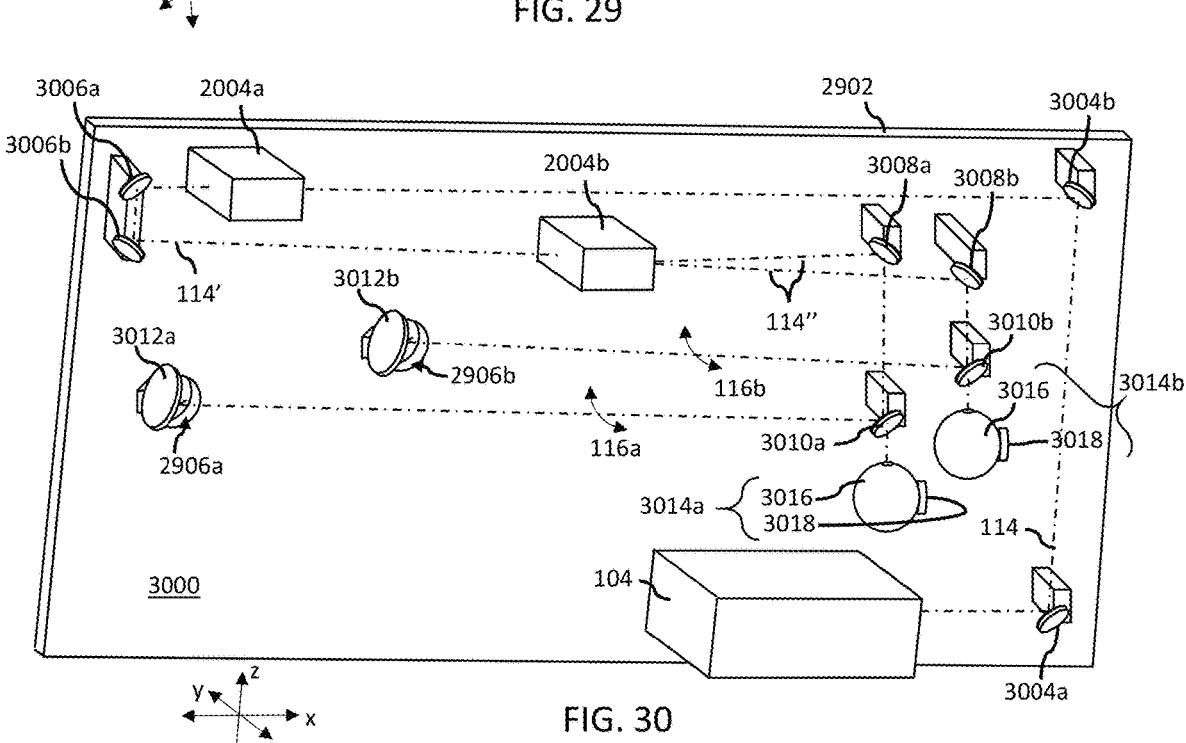
FIG. 30 schematically illustrates a beam path assembly for guiding a beam path from a laser source to the first and second optical ports shown in FIG. 29, according to one embodiment.

Referring to FIG. 30, the second side of the optical board 2902 is identified at 3000. Also illustrated are the first optical port 2906a, second optical port 2906b, the first optical component 2004a, the second optical component 2004b, and the aforementioned laser source 104. In the embodiment shown in FIG. 30, the first optical component 2004a is provided as an AO cell of the first AOD 402 (e.g., as discussed above) and the second optical component 2004b is provided as an AO cell of the second AOD 404 (e.g., as discussed above). Thus, the first optical component 2004a can be considered as being part of the first AOD 402 and the second optical component 2004b can be considered as being part of the second AOD 404.

As exemplarily illustrated in FIG. 30, a plurality of mirrors may be provided to facilitate guiding of the beam path 114 from the laser source 104 to the first optical port 2906a and the second optical port 2906b. For example, a first set of mirrors 3004a and 3004b may be provided to guide the beam path 114 from the laser source 104 to the first optical component 2004a, a second set of mirrors 3006a and 3006b may be provided to guide the beam path 114 from the first optical component 2004a to the second optical component 2004b, a third set of mirrors 3008a, 3010a and 3012a may be provided to guide the beam path 114 (i.e., when deflected within the first primary angular range 116a) from the second optical component 2004a to the first optical port 2906a, and a fourth set of mirrors 3008b, 3010b and 3012b may be provided to guide the beam path 114 (i.e., when deflected within the second primary angular range 116b) from the second optical component 2004a to the second optical port 2906b. In the beam path assembly shown in FIG. 30, the mirror 3008a can be provided as a pick-off mirror.

Optical components such as the first optical component 2004a, second optical component 2004b and mirrors 3004a, 3004b, 3006a, 3006b, 3008a, 3008b, 3010a, 3010b, 3012a and 3012b may be attached to the second side 3000 of the optical board 2902 by any suitable technique either discussed herein or otherwise known in the art. It will be appreciated, however, that such optical components may be provided in the beam path 114 using any other suitable technique. It will further be appreciated that the beam path assembly illustrated in FIG. 30 may be provided differently (e.g., with a different arrangement of the mirrors 3004a, 3004b, 3006a, 3006b, 3008a, 3008b, 3010a, 3010b, 3012a and 3012b, with a different arrangement of optical components 2004*a* and 2004*b*, with more or fewer mirrors than illustrated, or the like or any combination thereof). For example, the first optical component 2004*a* may be arranged in the beam path 114 at a location between the mirror 3006*b* and the second optical component 2004*b*. In another example, the second optical component 2004*b* may be arranged in the beam path 114 at a location between the first optical component 2004*a* and the mirror 3006*a*.

i. Discussion Concerning First and Second Optical Components

In one embodiment, the first optical component 2004*a* is oriented relative to the second optical component 2004*b*, i.e., in the beam path assembly shown in FIG. 30, such that the second rotation axis associated with the second AOD 404 that incorporates the second optical component 2004*b* is parallel to (or at least substantially parallel to) the first rotation axis associated with the first AOD 402 that incorporates the first optical component 2004*a*. In this case, the mirrors 3006*a* and 3006*b* are oriented so as to ensure that the plane of deflection of the first AOD 402, when projected onto the second AOD 404, is different from (e.g., orthogonal to, or oblique to) the plane of deflection of the second AOD 404. See, e.g., Int'l. Pub. No. WO 2019/060590 A1 for examples of how the plane of deflection may be rotated.

In another embodiment, the first optical component 2004*a* is oriented relative to the second optical component 2004*b*, i.e., in the beam path assembly shown in FIG. 30, such that the second rotation axis associated with the second AOD 404 that incorporates the second optical component 2004*b* is orthogonal to (at least substantially orthogonal to, or oblique to) the first rotation axis associated with the first AOD 402 that incorporates the first optical component 2004*a*. In this case, the mirrors 3006*a* and 3006*b* are oriented so as to ensure that the plane of deflection of the first AOD 402, when projected onto the second AOD 404, remains orthogonal to (at least substantially orthogonal to, or oblique to) the plane of deflection of the second AOD 404. See, e.g., Int'l. Pub. No. WO 2019/060590 A1 for examples of how the plane of deflection may be prevented from rotating.

ii. Discussion Concerning Additional Optical Components

Although not illustrated, one or more other optical components (e.g., beam traps, beam dump systems, beam expanders, beam shapers, beam splitters, apertures, filters, collimators, lenses, mirrors, prisms, polarizers, phase retarders, DOEs, ROEs, or the like or any combination thereof) may be provided within the beam path assembly shown in FIG. 30 to focus, expand, collimate, shape, polarize, filter, split, combine, crop, absorb, or otherwise modify, condition, direct, etc., the beam of laser energy as it propagates along beam path 114 (e.g., from the laser source 104 to one or both of the optical ports 2906*a* and 2906*b*). What follows below is a brief discussion of additional optical components that may be incorporated into the beam path assembly shown in FIG. 30. It will be appreciated that the beam path assembly may include one or more or all of these additional optical components, in any combination.

In one embodiment, an optical component such as a beam expander, collimator, or the like or any combination thereof may be arranged in the beam path 114 at a location between the mirror 3004*b* and the first optical component 2004*a*.

In another embodiment, one or more beam traps or beam dump systems may be provided to capture or absorb laser energy propagating along any unwanted beam path from the first optical component 2004*a*, from the second optical component 2004*b*, or a combination thereof. For example, a first beam trap or beam dump system may be arranged at a location between the mirror 3006*b* and the second optical component 2004*b* to selectively trap laser energy propagating along all beam paths other than the first-order beam path 114′ (and, optionally, the zeroth-order beam path 300 (not illustrated)) from the first optical component 2004*a*. Likewise, a second beam trap or beam dump system may be arranged at a location between the second optical component 2004*b* and the mirror 3008*a* to trap laser energy propagating along beam paths other than the first-order beam path 114″ from the second optical component 2004*b*. In one embodiment, the first beam dump system is provided as the integrated beam dump system 700 and the second beam dump system is provided as the integrated beam dump system 1000.

In another embodiment, a wavefront compensation optic, such as wavefront compensation optic 2002 or 2100, or the like or any combination thereof, may be provided (e.g., arranged at a location in the beam path 114 between the first optical component 2004*a* and the second optical component 2004*b*, i.e., at a location in the beam path 114′) to compensate for actual wavefront distortion or expected wavefront distortion (e.g., as discussed above).

In another embodiment, one or more optical components forming an optical relay system, such as the optical relay system 2000, 2200, 2300 or 2400 discussed above with respect to any of FIGS. 20, 21, 22, 23 and 24, may be provided with the wavefront compensation optic to facilitate compensation of wavefront distortion (e.g., as discussed above).

In another embodiment, one or more phase retarders (e.g., as discussed above) may be arranged in the beam path 114, as exemplarily shown in FIG. 30, to rotate the plane of polarization of the beam of laser energy that is incident upon the second optical component 2004*b* to ensure that the plane of polarization of the beam of laser energy is parallel or perpendicular to (or at least substantially parallel or perpendicular to) the diffraction axis of the second optical component 2004*b* (e.g., depending upon wavelength of the beam of laser energy and upon the material from which the second optical component 2004*b* is formed, as discussed above). If necessary, one or more phase retarders may be likewise arranged in the beam path 114 to rotate the plane of polarization of the beam of laser energy that is incident upon the first optical component 2004*a* to ensure that the plane of polarization of the beam of laser energy is parallel or perpendicular to (or at least substantially parallel or perpendicular to) the diffraction axis of the first optical component 2004*a* (e.g., depending upon wavelength of the beam of laser energy and upon the material from which the first optical component 2004*a* is formed, as discussed above). In one example embodiment, the first optical component 2004*a* and second optical component 2004*b* are formed of an AO cell material such as crystalline germanium, and the beam of laser energy incident upon the first optical component 2004*a* and the second optical component 2004*b* is characterized as having a wavelength in a range from 9 µm (or thereabout) 11 µm (or thereabout) and an average power in a range from 20 W (or thereabout) to 20 kW (or thereabout). In such an example embodiment, one of the mirrors 3006*a* and 3006*b* may be provided as a reflective phase retarder (e.g., configured to impart a 180 degree phase shift), or both of the mirrors 3006*a* and 3006*b* may be provided as a reflective phase retarder (e.g., configured to impart a 90 degree phase shift). It will nevertheless be appreciated that the first optical component 2004*a* and second optical component 2004*b* may be formed of any other suitable AO cell material and the beam of laser energy incident upon the first optical component 2004*a* and the second optical component 2004*b* can be characterized as having any other suitable wavelength (e.g., in the UV or visible ranges of the electromagnetic spectrum) and power characteristics (e.g., in terms of average power, peak power, etc.) sufficient to process a workpiece (e.g., as discussed above).

iii. Embodiments Concerning Laser Sensor Systems

Optionally, the apparatus 100 further include ones or more laser sensor systems, such as laser sensor systems 3014a and 3014b. In this embodiment, the mirrors 3010a and 3010b are provided as partially-transmissive mirrors configured to reflect a majority of light in the incident beam of laser energy and transmit a small amount of the light (e.g., 2% or thereabout), and laser sensor system is arranged to receive the light transmitted by a corresponding partially-transmissive mirror. For example, the laser sensor system 3014a is arranged to receive light transmitted by mirror 3010a and the laser sensor system 3014b is arranged to receive light transmitted by mirror 3010b.

Generally, each laser sensor system 3014a and 3014b includes a photodetector configured to sense or measure laser energy or power transmitted thereto, and generate sensor data based on the sensing or measurement. The sensor data can be output to the controller 122 by any suitable means, where it can be thereafter be processed to support various functions of the apparatus 100, such as real-time pulse energy control (e.g., to compensate for changes in laser power), system calibrations (e.g., to compensate for transmission changes in the AOD systems of the first positioner 106 vs. RF power and frequency, etc.), or the like or any combination thereof.

Because the laser sensor systems 3014a and 3014b are located optically downstream of the first optical component 2004a and the second optical component 2004b, each an AOD of the first positioner 106, readings taken by the photodetector can vary depending upon the position or angle of the beam of energy incident thereto. Thus, movement of an incident beam of laser energy over the photodetector can cause a reading error, which can result in erroneous power control, system calibrations, etc. To reduce or eliminate the spatial and directional sensitivity associated with the photodetector, each of the laser sensor systems may include a beam expander and/or diffuser arranged so as to expand and/or diffuse the beam of laser energy before the beam of laser energy strikes the photodetector.

In another embodiment, each laser sensor system 3014a and 3014b may be provided with an integrating sphere 3016 arranged optically upstream of the photodetector to reduce the spatial and directional sensitivity associated with the photodetector. The integrating sphere 3016 may be provided as an alternative to, or to supplement, the aforementioned use of the beam expander/diffuser. Generally, and as is known in the art, the integrating sphere 3016 is an optical component that includes a hollow spherical (or at least substantially spherical) cavity, the interior surface of which is coated with a diffuse reflective coating. The integrating sphere 3016 includes a collection port (illustrated, but not labeled) and a detection port. The integrating sphere 3016 is arranged such that light propagating from a partially-transmissive mirror (i.e., from mirror 3010a or 3010b) can enter into the cavity of the corresponding integrating sphere 3016 through the collection port. Light incident on any point on the interior surface of the cavity is scattered and, ultimately, exits the integrating sphere 3016 at the detection port so as to be incident upon the photodetector (identified, for this embodiment, at 3018).

H. Embodiments Concerning AOD Driving Techniques i. Embodiments Concerning Beam Branching As noted above, FIG. 4 generically illustrates deflection of a beam path 114, incident upon the multi-axis AOD system 400, within a primary angular range 116. In order to implement the deflection scheme discussed above with respect to FIG. 3, the first AOD 402 can be operated or driven by an applied first RF drive signal having a drive frequency that falls within one of a plurality of first frequency ranges and the second AOD 404 can be operated or driven by an applied second RF drive signal having a drive frequency that falls within a corresponding one of a plurality of second frequency ranges. For example, and with reference to FIGS. 1, 4 and 31, in order to deflect the beam path 114 incident upon the multi-axis AOD system 400 within the first primary angular range 116a (to the second positioner 108a), the first RF drive signal applied to the first AOD 402 can have a first drive frequency, f1, that falls within a first frequency range 3102a and the second RF drive signal applied to the second AOD 404 can have a second drive frequency, f2, that falls within a corresponding second frequency range 3104a. In order to deflect the beam path 114 incident upon the multi-axis AOD system 400 within the second primary angular range 116b (to the second positioner 108b), the first RF drive signal applied to the first AOD 402 can have a first drive frequency, f1, that falls within a first frequency range 3102b and the second RF drive signal applied to the second AOD 404 can have a second drive frequency, f2, that falls within a corresponding second frequency range 3104b.

Generally, the first frequency range 3102a does not overlap with, and is not contiguous with, the first frequency range 3102b. Likewise, the second frequency range 3104a does not overlap with, and is not contiguous with, the second frequency range 3104b. Accordingly, a "gap" exists between first frequency range 3102a and the first frequency range 3102b and also between the second frequency range 3104a and the second frequency range 3104b. Generally, the gap between the first frequency range 3102a and the first frequency range 3102b (i.e., the "first frequency range gap") may be larger than, smaller than or equal to the gap between the second frequency range 3104a and the second frequency range 3104b (i.e., the "second frequency range gap"). Any of the first frequency range gap and the second frequency range gap may have a width of 0.3 MHz, 0.5 MHz, 0.7 MHz, 0.9 MHz, 1 MHz, 2 MHz, 5 MHz, 10 MHz, etc., or between any of these values.

Generally, the first frequency range 3102a, first frequency range 3102b, second frequency range 3104a and second frequency range 3104b span a range of frequencies. For example, the frequency range spanned by any of the first frequency range 3102a, first frequency range 3102b, second frequency range 3104a and second frequency range 3104b may be equal to 3 MHz, 5 MHz, 7 MHz, 9 MHz, 10 MHz, 12 MHz, 15 MHz, 20 MHz, etc., or between any of these values. The first frequency range 3102a may be larger than, smaller than or equal to the first frequency range 3102b. Likewise, the second frequency range 3104a may be larger than, smaller than or equal to the second frequency range 3104b. The first frequency range 3102a may be larger than, smaller than or equal to the second frequency range 3104a. Likewise, the first frequency range 3102b may be larger than, smaller than or equal to the second frequency range 3104b.

As shown in FIG. 31, in response to an applied first RF drive signal having a first drive frequency, f1, that is within the first frequency range 3102a, the first AOD 402 will rotate an incident beam of laser energy about the first rotation axis, thereby deflecting the beam path 114, by an angle within a first AOD angular range 406a. Similarly, in response to an applied first RF drive signal having a first drive frequency, f1, that is within first frequency range 3102b, the first AOD 402 will rotate the incident beam of laser energy about the first rotation axis, thereby deflecting the beam path 114, by another angle within a first AOD angular range 406b. As will be appreciated, each of the first AOD angular ranges 406a and 406b represents a specific embodiment of the aforementioned "first AOD angular range 406," and can thus be generically referred to as a "first AOD angular range 406."

Likewise, in response to an applied second RF drive signal having a second drive frequency, f2, that is within the second frequency range 3104a, the second AOD 404 will rotate an incident beam of laser energy about the second rotation axis, thereby deflecting the beam path 114', by an angle within a second AOD angular range 408a. Similarly, in response to an applied second RF drive signal having a second drive frequency, f2, that is within the second frequency range 3104b, the second AOD 404 will rotate the incident beam of laser energy about the second rotation axis, thereby deflecting the beam path 114', by another angle within a second AOD angular range 408b. As will be appreciated, each of the second AOD angular ranges 408a and 408b represents a specific embodiment of the aforementioned "second AOD angular range 408," and can thus be generically referred to as a "second AOD angular range 408."

Upon driving the first AOD 402 (i.e., by applying a first driving frequency, falling within either the first frequency range 3102a or the first frequency range 3102b, to the first AOD 402) and driving the second AOD 404 (i.e., by applying a second driving frequency, falling within either the second frequency range 3104a or the second frequency range 3104b, to the second AOD 404) as discussed above, the resultant scan field of the multi-axis AOD system 400 is effectively divided into a plurality of sub-scan fields (i.e., a first sub-scan field 3106a and a second sub-scan field 3106b).

a. Additional Discussion Concerning Deflection and Dispersion

As discussed above, AODs are spectrally-dispersive elements, capable of distorting (e.g., elongating) the process spot ultimately delivered to the workpiece 102. The degree to which the process spot is distorted can, at least partly, be characterized as proportional to the spectral linewidth of the beam of laser energy and to the deflection produced by the AOD (or by the total combined deflection produced by multiple AODs). Spectral dispersion caused by, for example, the total combined deflection of the first AOD 402 and the second AOD 404, is proportional to $\sqrt{f_1^2 + f_2^2}$, where $f_1$ is the first drive frequency and $f_2$ is the second drive frequency.

While a dispersion compensator 2600 such as a prism can compensate for spectral dispersion as discussed above, a given prism, in combination with a given beam size, can only compensate for a fixed amount of spectral dispersion. Accordingly, the act of driving an AOD to deflect a beam of laser energy can still produce some distortion of the process spot at the workpiece 102. The amount of distortion imparted to a process spot at the workpiece 102 can be kept sufficiently low (e.g., so as to not adversely affect processing of the workpiece 102) by balancing the size of first sub-scan field 3106a and the second sub-scan field 3106b with the spectral linewidth of the beam of laser energy while orienting the first dispersion compensator 2600a (e.g., relative to the first mirror 2908a3) so as to optimally compensate for spectral dispersion arising from deflection at or near the center of the first sub-scan field 3106a and orienting the second dispersion compensator 2600b (e.g., relative to the first mirror 2908b3) so as to optimally compensate for spectral dispersion arising from deflection at or near the center of the second sub-scan field 3106b.

In one embodiment, drive frequencies defining the centers of the first sub-scan field 3106a and the second sub-scan field 3106b (i.e., in terms of $f_1$ and $f_2$) can be selected such that $\sqrt{f_1^2 + f_2^2}$ for the first sub-scan field 3106a is equal to (or at least substantially equal to) $\sqrt{f_1^2 + f_2^2}$ for the second sub-scan field 3106b. For example, $f_1$ for the first sub-scan field 3106a can be equal to (or at least substantially equal to) $f_2$ for the second sub-scan field 3106b. Likewise, $f_2$ for the first sub-scan field 3106a can be equal to (or at least substantially equal to) $f_1$ for the second sub-scan field 3106b. When $\sqrt{f_1^2 + f_2^2}$ for the first sub-scan field 3106a is equal to (or at least substantially equal to) $\sqrt{f_1^2 + f_2^2}$ for the second sub-scan field 3106b, the magnitude of spectral dispersion imparted to beam of laser energy deflected within the first sub-scan field 3106a is equal to (or at least substantially equal to) the magnitude of spectral dispersion imparted to beam of laser energy deflected within the second sub-scan field 3106b, but the orientation of the spectral dispersion is different. Thus, the first dispersion compensator 2600a can have the same configuration as the second dispersion compensator 2600b, but the orientation of the first dispersion compensator 2600a (e.g., relative to the first mirror 2908a3) is different from the orientation of the second dispersion compensator 2600b (e.g., relative to the first mirror 2908b3). That is, the orientation of the first dispersion compensator 2600a (e.g., relative to the first mirror 2908a3) can correspond to the orientation of the spectral dispersion imparted to beam of laser energy deflected at or near the center of the first sub-scan field 3106a and the orientation of the second dispersion compensator 2600b (e.g., relative to the first mirror 2908b3) can correspond to the orientation of the spectral dispersion imparted to beam of laser energy deflected at or near the center of the second sub-scan field 3106b.

b. Additional Discussion Concerning Sub-Scan Fields

In the embodiment illustrated in FIG. 31, the first frequency ranges 3102a and 3102b are selected in coordination with the second frequency ranges 3104a and 3104b to produce a pair of square-shaped sub-scan fields 3106a and 3106b that are spatially offset from one another in a first direction (e.g., by an angle corresponding to the first frequency range gap) and in a second direction (e.g., by an angle corresponding to the second frequency range gap). If the first frequency range gap is equal to the second frequency range gap, then the closest points between the sub-scan fields 3106a and 3106b (i.e., the lower-right corner of the first sub-scan field 3106a and the upper-left corner of the second sub-scan field 3106b, as illustrated in FIG. 31) is 41% larger than either the first frequency range gap or the second frequency range gap. Also, the closest points between the sub-scan fields 3106a and 3106b are, in fact, points, rather than lines. Accordingly, if there are beam distortions that occur due to the beam clipping on a pick-off mirror (e.g., mirror 3008a) used to selectively reflect a beam of laser energy deflected within the first sub-scan field 3106a (i.e., within the first primary angular range 116a) relative to a beam of laser energy deflected within the second sub-scan field 3106b (i.e., within the second primary angular range 116b), then such distortions will occur far less often if they only occur in one corner of a sub-scan field, rather than along an entire edge of the sub-scan field. Nevertheless, it will be appreciated that the size of one or both of the first frequency range gap and the second frequency range gap can be increased or decreased, independently or in a coordinated manner, as desired depending on the sensitivity (or insensitivity) of workpiece processing to such distortions.

Although discussion has been made above concerning an arrangement of sub-scan fields consisting of a pair of equally-sized, square-shaped sub-scan fields 3106a and 3106b that are spatially offset from one another in a first direction (e.g., by an angle corresponding to the first frequency range gap) and in a second direction (e.g., by an angle corresponding to the second frequency range gap) as shown in FIG. 31, it will be appreciated that other embodiments are also contemplated.

For example, the arrangement of the sub-scan fields 3106a and 3106b may be different from the arrangement shown in FIG. 31 (e.g., as shown in FIG. 32). In other examples, the frequency ranges within which the AODs are driven may be selected to produce more than two square-shaped sub-scan fields, to produce one or more sub-scan fields having a shape other than that of a square (e.g., a rectangle, circle, oval, triangle, hexagon, etc.), to produce sub-scan fields of different sizes, or the like or any combination thereof.

In another example, and with reference to FIG. 33, the first AOD 402 can be driven by an applied first RF drive signal having a drive frequency that falls within a first frequency range 3300 and the second AOD 404 can be driven by an applied second RF drive signal having a drive frequency that falls within a corresponding one of the aforementioned plurality of second frequency ranges 3104a and 3104b. Thus, in order to deflect the beam path 114 incident upon the multi-axis AOD system 400 within the first primary angular range 116a (to the second positioner 108a), the first RF drive signal applied to the first AOD 402 can have a first drive frequency, f1, that falls within a first frequency range 3300 and the second RF drive signal applied to the second AOD 404 can have a second drive frequency, f2, that falls within the second frequency range 3104a. In order to deflect the beam path 114 incident upon the multi-axis AOD system 400 within the second primary angular range 116b (to the second positioner 108b), the first RF drive signal applied to the first AOD 402 can have a first drive frequency, f1, that falls within the first frequency range 3300 and the second RF drive signal applied to the second AOD 404 can have a second drive frequency, f2, that falls within the second frequency range 3104b. Upon driving the first AOD 402 (i.e., by applying a first driving frequency, falling within the first frequency range 3300, to the first AOD 402) and driving the second AOD 404 (i.e., by applying a second driving frequency, falling within either the second frequency range 3104a or the second frequency range 3104b, to the second AOD 404) as discussed above, the resultant scan field of the multi-axis AOD system 400 is effectively divided into a plurality of sub-scan fields (i.e., a first sub-scan field 3302a and a second sub-scan field 3302b). It will also be appreciated that the AODs of the multi-axis AOD system 400 can be similarly driven by applied drive frequencies falling within ranges as exemplarily illustrated in FIG. 34.

Driving the AODs of the multi-axis AOD system 400 according to the drive frequency ranges shown in FIG. 33 or FIG. 34 can be useful in correcting or otherwise at least partially compensating for telecentricity errors noticed, for example, when the second positioner 108 includes a galvanometer mirror system. In such an application, frequencies within one or more sub-ranges of the first frequency range 3300 (e.g., within a first sub-range 3304a, within a second sub-range 3304b, or the like or any combination thereof) can be applied to the first AOD 402 (e.g., as shown in FIG. 33) to correct for telecentricity errors present along one axis (e.g., the X-axis), or can be applied to the second AOD 404 (e.g., as shown in FIG. 34) to correct for telecentricity errors present along another axis (e.g., the Y-axis).

ii. Embodiments Concerning Pulse Slicing

As discussed above, the first positioner 106 can be operated to effect pulse slicing, i.e., temporally-dividing a common laser pulse (also referred to herein as a "mother laser pulse") into at least two laser pulses. Temporally-divided portions of a common, mother laser pulse are also referred to herein as "pulse slices." One embodiment of pulse slicing is exemplarily illustrated in FIG. 35, in which a mother laser pulse 3500 is temporally-divided into two pulse slices. Specifically, during a first slice period, p1, the mother laser pulse 3500 is divided into a first pulse slice 3500a and during a second slice period, p2, the mother laser pulse 3500 is divided into a second pulse slice 3500b. As will be appreciated, the pulse duration of a pulse slice generally corresponds to the duration of the slice period in which it was temporally-divided from its mother laser pulse. Thus, for example, the first pulse slice 3500a can be characterized as having a pulse duration that is equal to the first slice period, p1, and the second pulse slice 3500b can be characterized as having a pulse duration that is equal to the second slice period, p2.

Consecutive slice periods can occur continuously (i.e., with one slice period beginning immediately after a preceding slice period), can occur intermittently (i.e., with one slice period beginning subsequent to a delay immediately after a preceding slice period), or a combination thereof. In the case of consecutive slice periods occurring intermittently, it will be appreciated that the duration of the delay can be characterized as an integer multiple of the positioning period of the first positioner 106 (where the integer can be any integer such as 1, 2, 3, 4, 5, 10, 20, 50, 100, etc., or between any of these values). The embodiment shown in FIG. 35 is an example where consecutive slice periods p1 and p2 occur intermittently. The total amount of time between the beginning of an initial slice period and the end of a last slice period to be applied to a common, mother laser pulse is less than or equal to the pulse duration (i.e., based on the full-width at half-maximum (FWHM) of the optical power in the pulse versus time) of the mother laser pulse. Thus, a mother laser pulse can be generally characterized as having a pulse duration that is greater than the positioning period of the first positioner 106. In some embodiments, the pulse duration of mother laser pulse is greater than, equal to, or less than 1 μs, 2 μs, 5 μs, 10 μs, 15 μs, 20 μs, 25 μs, 30 μs, 40 μs, 50 μs, 100 μs, 300 μs, 500 μs, 900 μs, 1 ms, 2 ms, 5 ms, 10 ms, 20 ms, 50 ms, 100 ms, 300 ms, 500 ms, 900 ms, 1 s, etc., or between any of these values.

In one embodiment, the duration of each slice period (and, thus, the pulse duration of each pulse slice) is an integer multiple of the positioning period of the first positioner 106 (e.g., where the integer is 1, 2, 3, 5, 10, 20, 50, 100, 150, 200, 300, etc., or between any of these values etc.). In some embodiments, the duration of each slice period, is greater than, equal to or less than 200 μs, 125 μs, 100 μs, 50 μs, 33 μs, 25 μs, 20 μs, 13.3 μs, 12.5 μs, 10 μs, 4 μs, 2 μs, 1.3 μs, 1 μs, 0.2 μs, 0.1 μs, 0.05 μs, 0.025 μs, 0.02 μs, 0.013 μs, 0.01 μs, 0.008 μs, 0.0067 μs, 0.0057 μs, 0.0044 μs, 0.004 μs, etc., or between any of these values. Generally, the duration of one or more slice periods of a mother laser pulse can be equal, or different from, to the duration of one or more other slice periods of the same mother laser pulse. For example, although FIG. 35 illustrates the first slice period, p1, as being equal to the second slice period, p2, the duration of the first slice period, p1, may be greater than or less than the duration of the second slice period, p2.

Outside of slice periods, the first positioner 106 can be operated, in any manner known in the art, to attenuate an incident beam of laser energy such that the beam of laser energy propagating along the beam path 114, as ultimately deflected by the first positioner 106, has insufficient energy to process a workpiece 102. Additionally or alternatively, outside of slice periods, the first positioner 106 can be operated so as to deflect the beam path 114 to a beam trap, beam dump system, or the like or any combination thereof, as is either discussed herein or otherwise known in the art. In embodiments in which the first positioner 106 is provided as any AOD system discussed herein, outside of the slice periods, one or more of the AODs in the AOD system may, optionally, be driven (or not driven, as the case may be) to transmit the beam of laser energy into a zeroth-order beam path (e.g., zeroth-order beam path 200 or 300), one or more higher-order beam paths (e.g., a second-order beam path, a third-order beam path, etc.), to a beam trap, to beam dump system (e.g., an integrated beam dump system 700 or 1000, etc.), or the like or any combination thereof.

As mentioned above, pulse slicing can be implemented in conjunction with beam branching, or can be implemented separately from beam branching. Accordingly, the operation of the first positioner 106 can be controlled to deflect different pulse slices to different angles within the same primary angular range 116 (e.g., so as to deflect different pulse slices to the same second positioner 108), to deflect different pulse slices to angles within different respective primary angular ranges 116 (e.g., so as to deflect different pulse slices to different respective ones of the second positioners 108), or any combination thereof. For example, the operation of the first positioner 106 can be controlled to deflect the first pulse slice 3500a and the second pulse slice 3500b to different angles within the first primary angular range 116a (e.g., so as to deflect the first pulse slice 3500a and the second pulse slice 3500b to the second positioner 108a). In another example, the operation of the first positioner 106 may be controlled to deflect the first pulse slice 3500a by an angle within the first primary angular range 116a (e.g., so as to deflect the first pulse slice 3500a to the second positioner 108a) and to then deflect the second pulse slice 3500b by an angle within the second primary angular range 116b (e.g., so as to deflect the second pulse slice 3500b to the second positioner 108b). Thus, pulse slice 3500a, having the optical power profile shown in FIG. 35A, can propagate to the second positioner 108a and the pulse slice 3500b, having the optical power profile shown in FIG. 35B, can propagate to the second positioner 108b. When any pulse slice is deflected within any primary angular range 116, the operation of the first positioner 106 may be controlled to deflect the beam path 114 (and, thus, the pulse slice propagating therealong) to within any selected primary angular range 116 for any suitable or desired manner (e.g., to compensate for positioning errors of a second positioner corresponding to the selected primary angular range 116, to impart relative movement between a process spot and the workpiece 102a along a process trajectory during processing of a workpiece 102, or the like or any combination thereof).

Although FIG. 35 illustrates temporally-dividing a laser pulse 3500 into only two pulse slices (i.e., the first pulse slice

3500a and the second pulse slice 3500b), it will be appreciated that the laser pulse 3500 may be temporally-divided into more than two pulse slices (e.g., into 3 pulse slices, 5 pulse slices, 8 pulse slices, 10 pulse slices, 25 pulse slices, 30 pulse slices, 50 pulse slices, etc., or the like or between any of these values, etc.). For example, and with reference to FIG. 36, the laser pulse 3500 may be temporally-divided into four pulse slices 3600a, 3600b, 3600c and 3600d. In one embodiment, operation of the first positioner 106 is controlled such that consecutively-divided pulse slices are deflected within different primary angular ranges 116. For example, the pulse slice 3600a can be deflected to the first primary angular range 116a, and then the pulse slice 3600b can be deflected to the second primary angular range 116b, and then the pulse slice 3600c can be deflected to the first primary angular range 116a, and then the pulse slice 3600d can be deflected to the second primary angular range 116b. In other embodiments, however, operation of the first positioner 106 is controlled such that consecutively-divided pulse slices are deflected within either the same or different primary angular ranges 116. For example, the pulse slice 3600a can be deflected to the first primary angular range 116a, and then the pulse slices 3600b and 3600c can be deflected to the second primary angular range 116b, and then the pulse slice 3600d can be deflected to the first primary angular range 116a.

Although pulse slicing has been discussed above with respect to a single mother laser pulse (i.e., laser pulse 3500), it will be appreciated that the first positioner 106 may be operated to effect pule slicing with respect to a sequence of consecutively-propagating mother laser pulses. In the sequence, consecutive mother laser pulses may be temporally-divided in any desired manner, and two consecutive mother laser pulses may be temporally-divided in the same manner or in a different manner.

Figure 37:
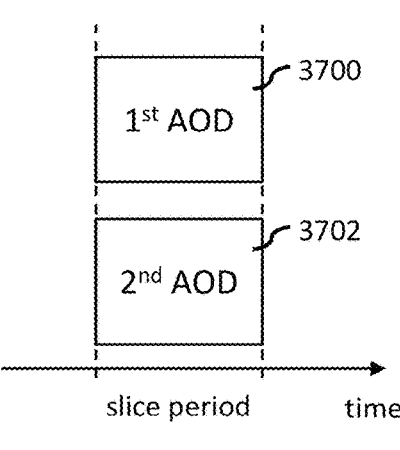
Figure 38:
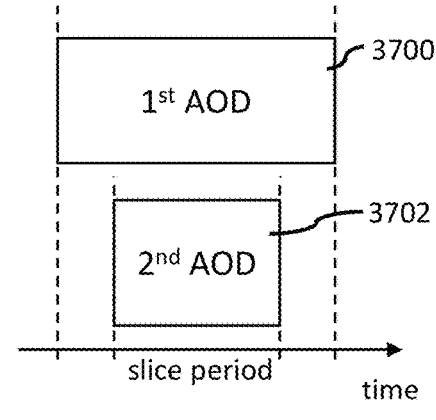
Figure 39:
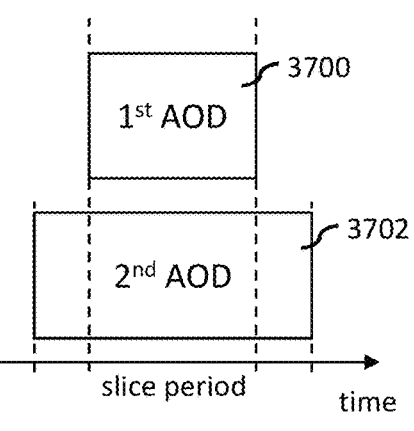
Figure 40:
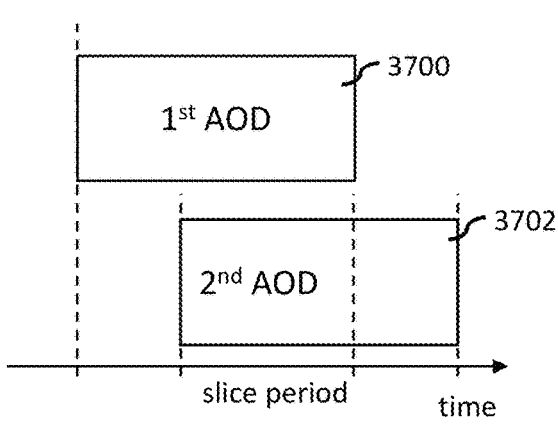
Figure 41:
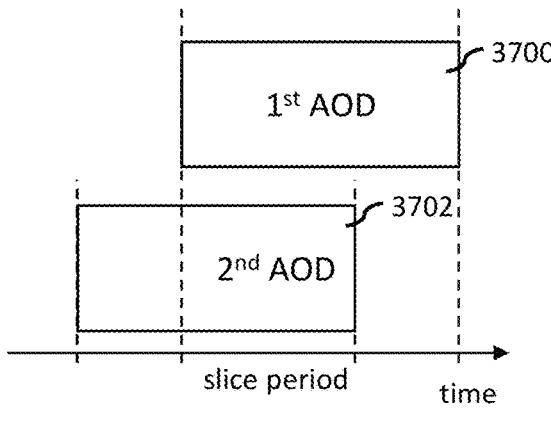

In an embodiment in which the first positioner 106 is provided as a multi-cell AOD system, pulse slicing can be effected by coordinated operation or driving of at least two AODs within the multi-cell AOD system. For example, and with reference to FIG. 37, in an embodiment in which the multi-cell AOD system is provided as the aforementioned AOD system 400, the first AOD 402 and the second AOD 404 may be operated (e.g., as discussed above) for the duration of a slice period to deflect the beam path 114 to within one or more of the primary angular ranges 116. The horizontal extent of block 3700 indicates the duration over which the first AOD 402 is operated to deflect a beam of laser energy incident thereto, and the horizontal extent of block 3702 indicates the duration over which the second AOD 404 is operated to deflect a beam of laser energy incident thereto. In FIG. 37, the horizontal extent of blocks 3700 and 3702 are equal to a slice period (e.g., the aforementioned first slice period, p1, second slice period, p2, etc.).

In other embodiments, however, one or both of the first AOD 402 and the second AOD 404 may be operated for a duration longer than a slice period to deflect the beam path 114 to within one or more of the primary angular ranges 116, but are operated such that the periods in which they are driven overlap for a duration equal to a slice period. See, e.g., FIGS. 38, 39, 40 and 41.

iii. Discussion Concerning Diffraction Efficiency

As used herein, the term "diffraction efficiency" refers to the proportion of energy in a beam of laser energy incident upon an AOD that gets diffracted within the AO cell of the AOD into the first-order beam. Diffraction efficiency may thus be represented as the ratio of the optical power in the first-order beam produced by the AOD to the optical power of the incident beam of laser energy incident upon the AOD. Generally, the amplitude of an applied RF drive signal can have a non-linear effect on the diffraction efficiency of the AOD, and the diffraction efficiency of an AOD can also change as a function of the frequency of the RF drive signal applied to drive the AOD. In view of the above, and in embodiments in which the first positioner 106 is provided as the aforementioned AOD system 400, the first RF drive signal applied to drive the first AOD 402 can be characterized as having an amplitude (also referred to herein as a "first amplitude") and the second RF drive signal applied to drive the second AOD 404 can be characterized as having an amplitude (also referred to herein as a "second amplitude").

Generally, the first amplitude can be selected or otherwise set based on one or more factors such as the first drive frequency of the first RF drive signal, the first frequency range within which the first drive frequency is found, the desired diffraction efficiency at which the first AOD 402 is to be driven by the first RF drive signal, the peak optical power of the beam of laser energy to be deflected during the period when the first AOD 402 is to be driven by the first RF drive signal, the average optical power of the beam of laser energy to be deflected during the period when the first AOD 402 is to be driven by the first RF drive signal, or the like or any combination thereof. Likewise, the second amplitude can be selected or otherwise set based on one or more factors such as the second drive frequency of the second RF drive signal, the second frequency range within which the second drive frequency is found, the desired diffraction efficiency at which the second AOD 404 is to be driven by the second RF drive signal, the peak optical power of the beam of laser energy to be deflected during the period when the second AOD 404 is to be driven by the second RF drive signal, the average optical power of the beam of laser energy to be deflected during the period when the second AOD 404 is to be driven by the second RF drive signal, or the like or any combination thereof. If the AOD system 400 is to be operated to effect pulse slicing (e.g., as discussed above), then the first amplitude, the second amplitude, or a combination thereof, can optionally be selected or otherwise set based on the desired pulse duration of pulse slice to be temporally divided out of a beam of laser energy.

In embodiments in which the AOD system 400 is driven to effect beam branching (e.g., as discussed with respect to any of FIG. 3, 31, 32, 33 or 34), the first RF drive signal can be characterized as having a first amplitude, a1a, when the first RF drive signal has a first drive frequency, f1, in the first frequency range 3102a. Similarly, when the first RF drive signal has a first drive frequency, f1, in the first frequency range 3102b, the first RF drive signal can be characterized as having a first amplitude, a1b. In this case, the first amplitude, a1a, can be higher than the first amplitude a1b. Alternatively, the first amplitude, a1a, can be lower than, or equal to, the first amplitude, a1b. Likewise, when the second RF drive signal has a second drive frequency, f2, in the second frequency range 3104a, the second RF drive signal can be characterized as having a second amplitude, a2a, and when the second RF drive signal has a second drive frequency, f2, in the second frequency range 3104b, the second RF drive signal can be characterized as having a second amplitude, a2b. In this case, the second amplitude, a2a, is lower than the second amplitude, a2b. Alternatively, the second amplitude, a2a, can be greater than, or equal to, the second amplitude, a2b.

If the AOD system 400 is to be operated to effect beam branching (e.g., as discussed above), then the first amplitude of the first RF drive signal can be selected such that the optical power in the beam of laser energy propagating along a first-order beam path 114' that has been deflected within the first AOD angular range 406a is greater than, less than, or at least substantially equal to the optical power in the beam of laser energy propagating along a first-order beam path 114' that has been deflected within the first AOD angular range 406b. While the first-order beam path 114' is deflected within either of the first AOD angular ranges 406a or 406b, the first amplitude of the first RF drive signal can be varied or can otherwise be maintained at a constant (or at least substantially constant) level. Likewise, the second amplitude of the second RF drive signal can be selected such that the optical power in the beam of laser energy propagating along a first-order beam path 114" that has been deflected within the second AOD angular range 408a is greater than, less than, or at least substantially equal to the optical power in the beam of laser energy propagating along a first-order beam path 114" that has been deflected within the second AOD angular range 408b. While the first-order beam path 114" is deflected within either of the second AOD angular ranges 408a or 408b, the second amplitude of the second RF drive signal can be varied or can otherwise be maintained at a constant (or at least substantially constant) level.

IV. CONCLUSION

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A system, comprising:
   a first optical component operative to transmit a beam of laser energy, wherein the first optical component is susceptible to thermal lensing induced by the transmitted beam of laser energy;
   a wavefront compensation optic configured to correct wavefront aberrations in the beam of laser energy transmitted by the first optical component and attributable to the thermal lensing; and
   an optical relay system arranged and configured to relay an image of the first optical component to the wavefront compensation optic,
   wherein the optical relay system is configured such that a size of the image of the first optical component at the wavefront compensation optic is different from a size of the image of the first optical component at the first optical component.

2. The system of claim 1, wherein the size of the image of the first optical component at the wavefront compensation optic is larger than the size of the image of the first optical component at the first optical component.

3. The system of claim 1, wherein the wavefront compensation optic is configured to transmit the beam of laser energy.

4. The system of claim 1, wherein the wavefront compensation optic is configured to reflect the beam of laser energy.

5. The system of claim 1, wherein the wavefront compensation optic includes a static wavefront compensation optic.

6. The system of claim 1, wherein the wavefront compensation optic includes a dynamic wavefront compensation optic.

7. The system of claim 1, further comprising:

a second optical component operative to transmit the beam of laser energy, wherein the optical relay system is arranged and configured to relay an image of the first optical component at the wavefront compensation optic to the second optical component.

8. The system of claim 7, wherein the optical relay system is configured such that the size of the image of the first optical component at the wavefront compensation optic is the same as a size of the image of the first optical component at the second optical component.

9. The system of claim 7, wherein the wavefront compensation optic is configured to reflect the beam of laser energy, and the optical relay system includes:

a first optical relay including two lenses, wherein the first optical relay is configured to relay the image of the first optical component to the wavefront compensation optic, and a second optical relay including two lenses, wherein the second optical relay is configured to relay the image of the first optical component at the second plane wavefront compensation optic to the second optical component.

10. The system of claim 9, wherein the first optical relay and the second optical relay share a common lens.

11. The system of claim 9, wherein the optical relay system further comprises at least one mirror arranged between two lenses of the second optical relay.

12. The system of claim 9, wherein the first optical component includes an acousto-optic (AO) cell operative to transmit a first beam of laser energy along a first-order beam path and to transmit a second beam of laser energy along a zeroth-order beam path, the second optical component is arranged such that the zeroth-order beam path of the AO cell of the first optical component is incident upon the second optical component, and the optical relay system includes a lens arranged in the zeroth-order beam path of the first optical component and wherein the lens is not part of the first optical relay or the second optical relay.

13. The system of claim 12, wherein the second optical component includes an acousto-optic (AO) cell.

14. The system of claim 7, wherein the first optical component includes an acousto-optic (AO) cell operative to transmit a first beam of laser energy along a first-order beam path and to transmit a second beam of laser energy along a zeroth-order beam path, and the second optical component is arranged such that the zeroth-order beam path of the AO cell of the first optical component is incident upon the second optical component.

15. The system of claim 14, further comprising at least one optical component arranged and configured to direct the zeroth-order beam path through the optical relay system.

16. The system of claim 7, further comprising a beam dump arranged between the first optical component and the second optical component, wherein the first optical component includes an acousto-optic (AO) cell operative to transmit a first beam of laser energy along a first-order beam path and to transmit a second beam of laser energy along a zeroth-order beam path, wherein the zeroth-order beam path is terminated by the beam dump, and wherein the second optical component is arranged such that the first-order beam path of the AO cell of the first optical component is incident upon the second optical component.

* * * * *